US006964335B1

(12) United States Patent
Harris

(10) Patent No.: US 6,964,335 B1
(45) Date of Patent: Nov. 15, 2005

(54) DISC-MEDIA STORAGE CASE AND PRINTED-MEDIA STORAGE TRAY

(75) Inventor: Charles D. Harris, Farmers Branch, TX (US)

(73) Assignee: Digital Disc Corporation, Dallas, TX (US)

( * ) Notice: Subject to any disclaimer, the term of this patent is extended or adjusted under 35 U.S.C. 154(b) by 55 days.

(21) Appl. No.: 09/870,078

(22) Filed: May 30, 2001

(51) Int. Cl.$^7$ .............................................. B65D 85/30
(52) U.S. Cl. .................................. 206/308.1; 206/232
(58) Field of Search ...................... 206/308.1, 309.313, 206/232; 312/9.11, 9.16, 9.19, 9.24, 9.26, 312/9.27, 9.47, 9.48, 9.58, 9.63, 9.64

(56) References Cited

U.S. PATENT DOCUMENTS

| | | | |
|---|---|---|---|
| 4,356,918 A | * | 11/1982 | Kahle et al. .............. 206/308.3 |
| 4,586,603 A | * | 5/1986 | Long et al. .............. 206/308.3 |
| 4,664,454 A | | 5/1987 | Schatteman et al. |
| 4,699,268 A | | 10/1987 | Oishi |
| 4,702,533 A | | 10/1987 | Seifert |
| 4,728,157 A | | 3/1988 | David, Jr. |
| 4,763,962 A | | 8/1988 | Ackeret |
| 4,863,031 A | | 9/1989 | Tanaka et al. |
| 4,932,522 A | * | 6/1990 | Milovich ................. 206/308.1 |
| 5,096,064 A | | 3/1992 | Rufo, Sr. et al. |
| 5,097,946 A | * | 3/1992 | Emrich .................... 206/308.1 |
| 5,265,721 A | | 11/1993 | Castritis |
| 5,346,295 A | | 9/1994 | Richter |
| D351,963 S | | 11/1994 | Lim |
| 5,425,450 A | | 6/1995 | Lin |
| 5,458,236 A | * | 10/1995 | Schoettle et al. ........... 206/232 |
| 5,549,199 A | * | 8/1996 | Lindsay ................... 206/308.1 |
| 5,590,768 A | | 1/1997 | Hilton et al. |
| 5,655,656 A | | 8/1997 | Gottlieb |
| 5,662,216 A | | 9/1997 | Nesbitt et al. |
| 5,676,246 A | | 10/1997 | Gloger |
| 5,697,497 A | | 12/1997 | Mallery |
| 5,706,939 A | | 1/1998 | Yu |
| 5,706,943 A | | 1/1998 | Yu |
| 5,713,464 A | * | 2/1998 | Chang ...................... 206/1.5 |
| D392,836 S | | 3/1998 | Cheris et al. |
| 5,788,068 A | | 8/1998 | Fraser et al. |

(Continued)

FOREIGN PATENT DOCUMENTS

| | | |
|---|---|---|
| AU | 574301 | 4/1988 |
| AU | 577306 | 5/1988 |
| DE | 2307410 | 8/1974 |

(Continued)

*Primary Examiner*—Shian T. Luong
(74) *Attorney, Agent, or Firm*—Crutsinger & Booth, LLC

(57) ABSTRACT

A storage device for disc media is provided. The storage device includes at least a case for storing the disc media. The case generally includes a plurality of case walls defining a box-like shape, a cavity defined inside the case walls that is sufficient to accommodate the disc media, and an opening defined in a side of the case (which is arbitrarily referred to as the front side of the case), the opening being at least sufficient for inserting the disc media into the cavity. According to a first aspect of the invention, the storage device includes a tray for optionally storing printed media associated with the case and a structure for retaining the tray on the case. According to a second aspect of the invention, the storage device includes a structure for selectively controlling the release of the disc media from the case. These two aspects of the invention can be practiced independently, but most preferably and advantageously are practiced together.

16 Claims, 37 Drawing Sheets

U.S. PATENT DOCUMENTS

| | | |
|---|---|---|
| 5,799,783 A | 9/1998 | Cheris et al. |
| 5,819,930 A | 10/1998 | Yu |
| 5,944,180 A | 8/1999 | Koh et al. |
| 5,954,197 A | 9/1999 | Ditzig et al. |
| 5,954,198 A * | 9/1999 | Ikebe et al. ............... 206/232 |
| 5,996,785 A * | 12/1999 | Palmer et al. ........... 206/308.1 |
| 6,000,541 A | 12/1999 | Yu |
| 6,027,186 A * | 2/2000 | Liou ...................... 206/308.1 |
| 6,029,848 A | 2/2000 | Cha et al. |
| D421,856 S | 3/2000 | Kirihara et al. |
| 6,036,008 A | 3/2000 | Hutton |
| 6,082,836 A | 7/2000 | Marshall et al. |
| 6,216,863 B1 | 4/2001 | Williamson et al. |

FOREIGN PATENT DOCUMENTS

| | | |
|---|---|---|
| DE | 3008513 A1 | 9/1981 |
| EP | 0181835 A2 | 10/1985 |
| EP | 0358780 B1 | 3/1989 |
| EP | 0355011 B1 | 8/1989 |
| FR | 2644439 | 3/1989 |
| JP | 62-082576 A | 4/1987 |
| JP | 63-263680 | 10/1988 |
| WO | WO-99/01869 | 1/1999 |
| WO | WO-00/30114 | 5/2000 |
| WO | WO-00/30115 | 5/2000 |

* cited by examiner

DISC-MEDIA STORAGE CASE AND PRINTED-MEDIA STORAGE TRAY

BACKGROUND OF THE INVENTION

This invention relates to a portable case for a disc media where the disc media can be inserted and removed edgewise through a side of the case. More particularly, according to one aspect, this invention also relates to a storage device that includes storage space for both a disc media and for a printed media, such as a graphics label and/or a booklet. More particularly still, this aspect of the invention relates to a storage device for both a disc media and printed media, where at least a portion of the printed media can be seen from a side or "spine" of the storage device. According to another aspect, this invention relates to case for disc media that includes an improved structure for selectively controlling the release of the disc media from the case. Furthermore, this invention also relates to designs for a storage device that improves and simplifies the manufacturing of such a storage device for a disc media, and, optionally, printed media. This invention also relates to methods of storing disc media.

Disc media are used for recording analog or digital data, including sounds, pictures, and any other type of information. Typically, disc media are circular having two planar surfaces, a relatively small height (or thickness). At least one of the two planar faces or surfaces of the disc media can be used as a data recording surface. Typically, the disc media have a central hole for positioning the disc media in a recording and/or playing device. Normally, nothing is recorded on a circumferential edge of the disc media, which provides a portion for handling the CD so that the recording surface or surfaces do not have to be touched. The outermost peripheral portion of the circumferential edge of the disc media may be ramped and rounded so avoid presenting sharp edges.

Currently standard examples of this type of disc media is optical disc media such as a compact disc ("CD)" or a digital video disc ("DVD"). As used herein, the term "CD" will be generally understood to include both CD and/or DVD, which have the same diameter. The standard CD has a diameter of 4.720 inches and a height (sometimes referred to as a thickness) of 0.050 inches, plus or minus about 0.015 inches. In addition, a standard CD or DVD typically has a circumferential edge that is about 0.050 to 0.070 inches wide.

The current standard CD case, sometimes known as a jewel case, has a bottom case wall, top case wall, and four side case walls. The bottom and top case walls have dimensions that are at least sufficiently large to accommodate the diameter of the CD and are spaced apart at least sufficiently to accommodate the thickness of the CD. The bottom and top case walls are typically rectangular, and two of the side case walls are longer than the other two side case walls. The standard CD case has an overall length of 5.600 inches, an overall width of 4.900 inches, and an overall height of 0.400 inches, plus or minus about 0.015 on each dimension.

The bottom and top case walls of the standard CD case are hinged to open the case in a clam-shell manner about a pivot axis defined along one of the shorter side case walls. Typically, a spine graphics label is printed on a sheet label material having a thickness in the range of about 0.005 to 0.010 inches. The spine graphics label is positioned in the CD case such that a portion of the labeling information can be seen through both the shorter side case walls of the CD case, which facilitates location of a particular CD case when a plurality of the CD cases are stacked together or lined up on a shelf. Hence, the shorter side case walls are sometimes referred to as the spines of the CD case, analogous to the spine of a bound book.

The standard spine graphics label for a standard CD case is a piece of rectangular sheet material. The rectangular sheet material typically has a length of about 6.200 inches and a width of about 4.800 inches. The sheet material is typically paper stock, but can be formed of any suitable sheet material for printing, such as plastic. Graphic and textual matter can be printed on one or both sides of the sheet material. The standard graphics label has two bend lines formed near and parallel to the shorter sides of the cut piece of rectangular sheet material, which are formed at about 0.300 inches from each of the shorter sides of the rectangular sheet material. These bend lines define a central, relatively-major rectangular area that is approximately the size of the length and width of the standard CD case and also define two relatively-smaller rectangular end portion areas that are approximately the size of the width and height of the standard CD case. This type of graphics label is generally U-shaped. Thus, this standard graphics label is positioned in the standard CD case such that one side of the relatively-major rectangular area of the graphics label is visible through a transparent top or bottom case wall of the CD case and the relatively-smaller end portions of the graphics label are visible through either of the shorter side case walls of the CD case.

The standard CD case also has a sufficient cavity space to accommodate a small booklet (sometimes referred to as a "libretto"), which can provide information about the CD. For example, a musical CD would typically have information about the songwriters, musicians, singers and other vocalists, their background or history, and the song lyrics. Similarly, a DVD could have information about the movie subject matter, producers, writers, actors, etc. A software CD could have booklet information about how to install the software on a computer other technical information. The desire to have additional space for such a booklet substantially contributes to the height of the standard CD case, which otherwise could be about half or even less.

Most of the commercially-available storage or shelving units for CD cases are specifically adapted to accommodate a plurality of such standard CD cases, usually such that at least one of the pair of shorter side case walls of each CD case is visible. Furthermore, the CD cases can be placed in the storage or shelving unit from either of the shorter ends, such that either of the two shorter side case walls is visible for displaying a standard spine graphics label. Therefore, although not otherwise necessary, it is desirable for a CD case, even an improved CD case, to continue to have the standard overall dimensions and the ability to accommodate conventionally configured-and-sized paper-media graphics labels.

U.S. Pat. No. 4,664,454 issued to Etienne A. M. Schatteman et al. on May 12, 1987, which is incorporated herein by reference in its entirety, discloses a storage device for record discs (conventional grooved record discs or optical compact discs). As described in the "Disclosure of Invention" thereof, the storage device provides "a storage compartment for holding a record disc in a fixed position solely by the edge of the record disc and preventing contact with the surfaces of the record disc and the walls of the storage compartment." This storage devices is primarily directed to the use for storage of CD discs in a record disc rack or record magazine for the storage of a plurality of discs, which may be used as a component of a record disc player or recorder by rolling along its bottom edge on a ramp surface leading to a ledge which bridges the walls of the compartment. This device does not address the problems of a jewel case. For example, it does not provide for the inclusion of any printed graphic label material with the CD discs or the manual handling of a CD jewel case.

U.S. Pat. No. 4,863,031 issued to Kimio Tanaka et al. on Sep. 5, 1989, which is incorporated herein by reference in its entirety, discloses a disc cartridge having peripheral disc support. As described in the Abstract thereof, "the disc cartridge includes steps or sheet-like members provided on the inner surface of the casing in a manner to be inwardly projected from the inner surface. The steps or sheet-like members are positioned so as to be engaged with a non-recording surface section of the disc to support the disc thereon, so that a clearance may be defined between the recording surface section of the disc and the inner surface of the casing."

U.S. Pat. No. 5,096,064 issued to George F. Rufo et al. on Mar. 17, 1992, which is incorporated herein by reference in its entirety, discloses an enclosure for optical discs with a temporary increasing width. As described in the Abstract thereof, " . . . the box-like structure has an access opening along its end . . . for permitting the insertion and removal therethrough of optical discs into and from the cavity; rigid projections projecting into the cavity from opposite side walls for reducing the side-to-side dimension of the cavity to less than the diameter of the disc at a location along the side walls, the location positioned between the access opening and the point along each side wall corresponding to the diameter of the disc when fully received within the cavity, whereby the spaced apart welds allow the side-to-side dimension of the cavity to temporarily enlarge under the influence of the force exerted by the disc on the rigid projections, the side-to-side dimension of the cavity returning to its original interior dimension after the width of the disc becomes less than the original diameter at the location . . . . " This is intended to prevent the disc from inadvertently slipping or falling out of the cavity.

U.S. Pat. No. 5,265,721 issued to Castritis on Nov. 30, 1993, which is incorporated herein by reference in its entirety, discloses an ejectable CD container. As described in the Abstract thereof, the container "allows the user to open the container and insert the disc into a compact disc container using only one hand . . . . The container includes a tray that holds the compact disc, and slides along two ridges in the container between a retracted position and an extended position. The user controls the sliding of the tray by sliding a knob mounted on the tray and protruding through the cover of the container. When the container is opened along one wall of the container, the tray is slid out of the container to its extended position so as to enable removal of the compact disc." The container also includes a paper label booklet support portion. However, it is not possible to see the booklet or any other labeling material for the disc from the sides of the case.

U.S. Pat. No. 5,425,450 issued to Shih-Hsien Lin on Jun. 20, 1995, which is incorporated herein by reference in its entirety, discloses a compact disc carrying case having an upper cover, a lower cover, and a disc holder. The upper cover is formed with a left side and a right side walls each having a flange at the lower edge and a groove 111 designed for keeping a song book, brochure, or the like (FIGS. 4A, 4B, 5). The lower cover includes a left side, a right side and a rear side walls. The left side and the right side walls have a longitudinal projection at the intermediate portion thereby forming a shoulder at the lower portion so that the longitudinal projection of the lower cover is engageable with the groove 111 of the upper cover, thereby enabling the lower cover to be slid out of the carrying case with respect to the upper cover. However, it is not possible to see the booklet or any other labeling material for the disc from the sides of the case.

U.S. Pat. No. 5,655,656 issued to Steven Gottlieb on Aug. 12, 1997, which is incorporated herein by reference in its entirety, discloses a sleeve package for compact discs. As described in the Abstract thereof, the package is "for a compact disc and a booklet of lyrics. The package comprises an outer container and an inner sleeve with the inner sleeve being divided into two compartments, one for the compact disc and a separate compartment for the booklet. The inner sleeve is capable of being received within the outer container in either of two positions, one for long term storage and a second for short term storage, the later providing easier access to the compact disc. A disc holding mechanism holds the disc in the inner sleeve." Furthermore, the detailed description states that the package is a paperboard container, which "allows for graphic material to be directly printed onto the surface of the package, even including printing on the spines or short-ends. This allows for efficient display of the titles and artists on the retail shelf space." However, this structure does not allow for the standard spine graphics label used with standard CD cases to be used and seen from the spines or short-ends of the case.

U.S. Pat. No. 5,662,216 issued to Alexander H. Nesbitt and Thomas A. Garland on Sep. 2, 1997, which is incorporated herein by reference in its entirety, discloses in the Abstract thereof: "A jewel case for a compact laser disc consists of a transparent hinged case and a disc holder received inside the case. The case is hingeably movable between a closed position wherein the case defined an interior cavity and an edge opening, and an open position wherein the interior cavity is exposed . . . . The disc can be mounted in the disc holder while the case is open, or can be inserted into the disc holder through the edge opening while the case is closed. A cam arrangement is provided for resiliently deflecting the arms outwardly to a deflected position to disengage the capture points from the side edges of the disc thereby releasing the disc from the holder." Again, this structure does not allow for the standard spine graphics label used with standard CD cases to be used and seen from the spines or short-ends of the case.

U.S. Pat. No. 5,676,246 issued to Klaus Willy Gloger on Oct. 14, 1997, which is incorporated herein by reference in its entirety, discloses in the Abstract thereof: "a container (100) having a recess (107) arranged to receive an object such as a compact disk (50). The recess (107) has a mouth (112) opening through a side wall (108) of the container (100) and an ejector (118) for ejecting the object from the recess (107)." However, the ejector is accessed and controlled through a portion of one of the shorter side walls of the container and the mouth for ejecting the CD is in the opposite shorter side wall. Again, this arrangement does not allow for the standard spine graphics label used with standard CD cases to be used and seen from the spines or short-ends of the case. Furthermore, this design is complicated and expensive to manufacture.

U.S. Pat. No. 5,944,180 issued to Koh, et al. on Aug. 31, 1999, which is incorporated herein by reference in its entirety, discloses in the abstract thereof: "a plastic box that has top and bottom walls and a front end which [is] open . . . A spring member inside the box adjacent its real wall has one part that is fixedly secured to the box, and a movable part than when released can directly engage the peripheral edge of the flat circular member. The movable part of the spring member is normally stored in a retracted position behind a rib that extend inwardly from the pat wall of the box. The top wall has a flexible portion behind the rib which is downwardly depressible for releasing the movable part of the spring member so that it will then engage the compact disc and eject it from the open front end of the box." This patent also mentions a "customary cover sheet", however this is not the same as a standard graphics label previously described herein, which is generally U-shaped and adapted to be positioned in the standard CD case such that one side of the relatively-major rectangular area of the graphics label is visible through a transparent top or bottom case wall of the CD case and the relatively-smaller end portions of the graphics label are visible through either of the shorter side case walls of the CD case. U.S. Pat. No. 5,944,180 does not recognize, for example, the desirability of being able to use a standard U-shaped graphics label or the benefits of having the front opening in one of the longer side case walls of the CD case.

These examples of prior efforts to improve CD case designs illustrate that there has been a long-felt need for an improved CD case that includes one or more of the following improvements: being less prone to damage and breakage; allowing easier access to the CD and without touching or otherwise contacting the recording surfaces; allowing the use of a graphics label to be seen through both of the two shorter side case walls of the CD case; allowing printed media, such as a graphics label and/or booklet information to be selectively stored with the CD case; and being compatible with the current standard CD case sizes.

SUMMARY OF THE INVENTION

In general, a storage device for disc media according to the invention includes at least a case for storing the disc media. The case generally includes a plurality of case walls defining a box-like shape, a cavity defined inside the case walls that is sufficient to accommodate the disc media, and an opening defined in a side of the case (which is arbitrarily referred to as the front side of the case), the opening being at least sufficient for inserting the disc media into the cavity.

According to a first aspect of the invention, the storage device includes a tray for optionally storing printed media associated with the case and a structure for retaining the tray on the case. According to a second aspect of the invention, the storage device includes a structure for selectively controlling the release of the disc media from the case. These two aspects of the invention can be practiced independently, but most preferably and advantageously are practiced together.

According to a more particular aspect of the invention, the structure of the tray is such that when the tray is positioned on the case, the tray does not prevent inserting the disc media into the cavity through an opening in the front side of the case. According to another, more particular aspect of the invention, the left side and right side of the case are preferably shorter than the back side and front side of the case. According to a still further and more particular aspect of the invention, the case further includes a structure for ejecting the disc media from the case. It is to be understood that these more particular aspects of the invention can also be practiced separately and independently of one another, but most preferably and advantageously are practiced together.

These and other aspects and advantages of the invention will become apparent to persons skilled in the art from the following drawings and detailed description of presently most-preferred embodiments of the invention.

BRIEF DESCRIPTION OF THE SEVERAL VIEWS OF THE DRAWING

The accompanying views of the drawing are incorporated into and form a part of the specification to illustrate several aspects and examples of the present invention, wherein like reference numbers refer to like parts throughout the figures of the drawing. These figures together with the description serve to explain the principals of the invention. The figures are only for the purpose of illustrating preferred and alternative examples of how the various aspects of the invention can be made and used and are not to be construed as limiting the invention to only the illustrated and described examples. The various advantages and features of the various aspects of the present invention will be apparent from a consideration of the drawings in which.

DETAILED DESCRIPTION OF PREFERRED EMBODIMENTS OF THE INVENTION

Non-Limiting Terms And Specific Examples

Figure 1:
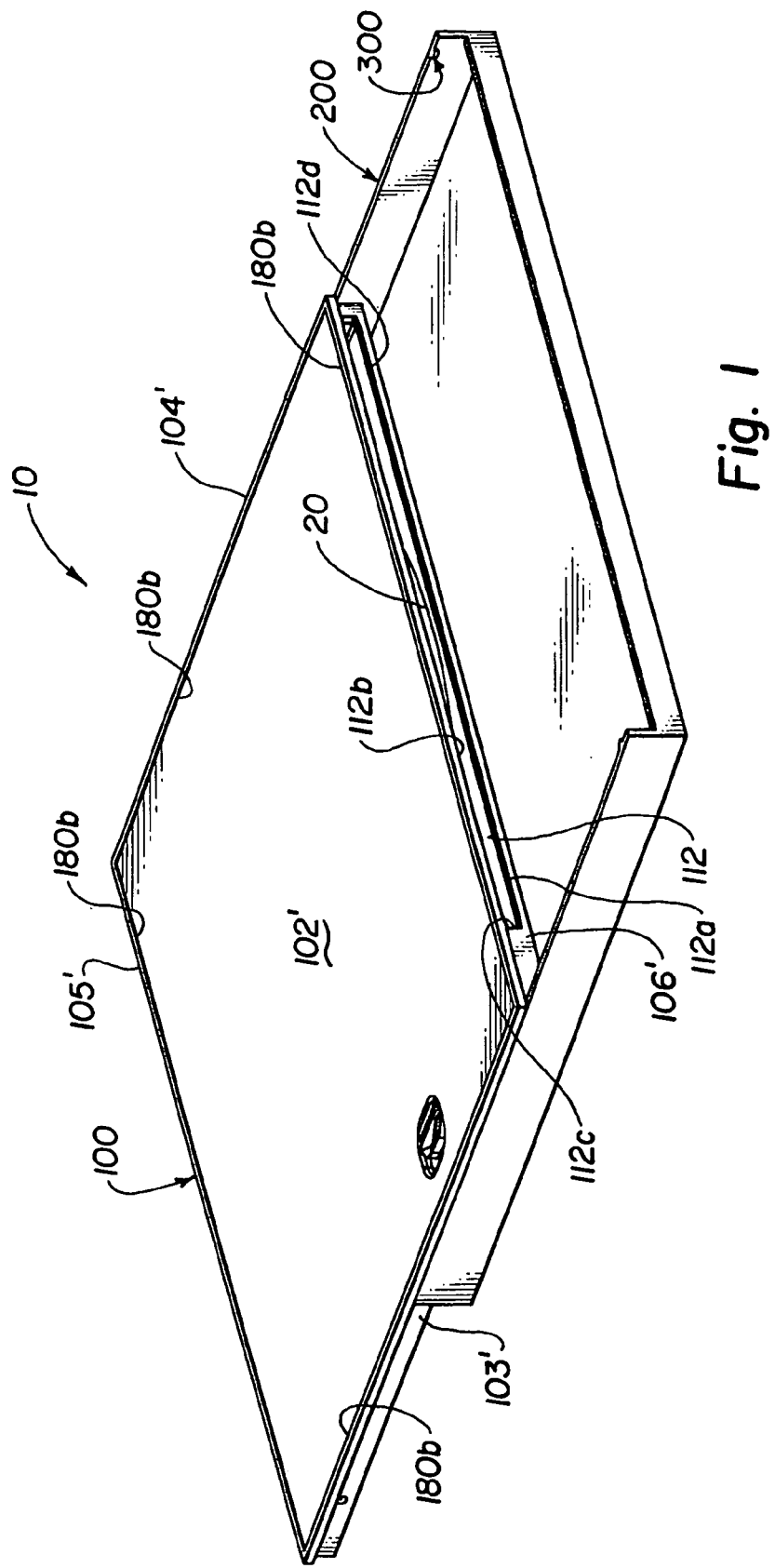
FIG. 1 is an isometric view from a top, front, and left-side perspective of a presently most-preferred embodiment of a storage device according to the invention that includes both a case for disc media and a tray for printed media, where the tray is shown partially removed from the case.

It is to be understood that, unless specially noted, that relational terms such as "base", "bottom", "lower", "lid", "top", "upper", "side", "front", "back", "left", "right", etc. are arbitrarily assigned for convenient reference to the orientation and perspective of the figures of the drawing. Furthermore, it is to be understood that relative terms such as "length", "width", "height", "thickness", etc. are also arbitrarily assigned for convenient reference to the orientation and perspective of the figures of the drawing. For the sake of consistency of usage, once a term is first arbitrarily assigned for reference to a structure in a particular figure, the term will then be used consistently to refer to like parts throughout the other figures of the drawing, even if the orientation of a structure shown in another figure is different for the purpose of showing another feature of the preferred embodiment(s) of the invention. For example, it is to be understood that, if the case were shown turned over, relational terms such as "bottom" and "top", etc. could be reversed. It is to be understood that, unless the context otherwise requires, the use of such arbitrarily-assigned relational or relative terms is not to be construed as unnecessarily limiting the invention.

The preferred embodiments of various aspects of this invention are particularly adapted for use with standard optical disc media such as a compact disc ("CD") or a digital video disc ("DVD"). Of course, the invention can also be adapted for use with other types of disc media or different sizes of disc media.

The preferred embodiments of various aspects of this invention are particularly adapted for use with the standard spine graphics label and/or booklet information typically used with such disc media products. Of course, the invention can also be adapted for use with other types of printed media.

The Storage Device

Figure 2:
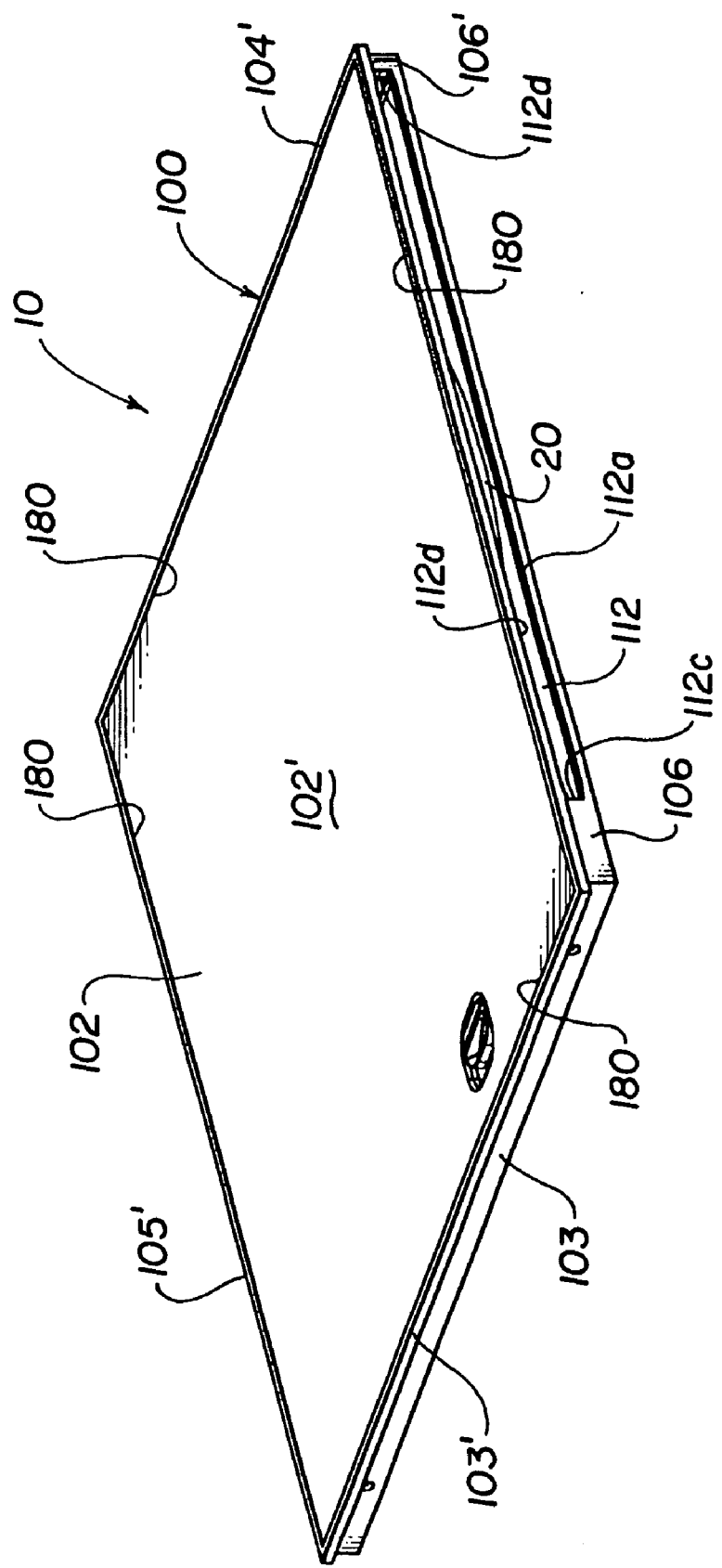
FIG. 2 is an isometric view from the top, front, and left-side perspective of the case according to FIG. 1 and showing the use of the case without the tray.

In general, and as shown in FIGS. 1 and 2, a storage device 10 for disc media 20 according to the invention includes at least a case for storing the disc media 20, the case generally identified in the drawing by the reference number 100. As will hereinafter be described in detail, the case 100 generally includes a plurality of case walls defining a box-like shape, a cavity defined inside the case walls that is sufficient to accommodate the disc media (not shown in FIGS. 1–2), and an opening 112 defined in a side of the case (which is arbitrarily referred to as the front side 106' of the case), the opening 112 being at least sufficient for inserting the disc media 20 into the cavity. In the presently most preferred embodiment, the opening 112 is a slot having a length of about 4.81 inches and a height of about 0.095 inches, which is adapted to allow for the passage of the diameter and height (or thickness) of a standard CD or DVD with ample clearance space.

According to a first aspect of the invention, as shown in FIG. 1, for example, the storage device 10 includes a tray for optionally storing printed media associated with the case, the tray generally identified in the drawing by the reference number 200, and a tray-retaining structure for retaining the tray on the case, such a tray-retaining structure generally identified in the drawing by the reference number 300 (only a portion of such a tray-retaining structure 300 being visible in FIG. 1). According to a more particular aspect of the invention, the structure of the tray 200 is such that, when the tray is positioned on the case, the tray 200 does not prevent inserting the disc media 20 into the cavity through an opening 112 in the front side 106' of the case 100. According to another, more particular aspect of the invention, the left side 103' and right side 104' of the case are shorter than the back side 105' and front side 106' of the case, where the opening 112 is arbitrarily considered to be in the front side 106' of the case 100. As will hereinafter be described in detail, an example of a tray retaining structure 300 includes at least one set of projecting and recess structures on the left-side tray wall and left-side case wall and at least one set of set of projecting and recess structures on each of the right-side tray wall and right-side case wall, the structures cooperating to retain the tray on the case. According to another, more particular aspect of the invention, tray 200 is selectively removable from the case 100, such that as illustrated in FIG. 2, for example, the case 10 can be used independently.

Figure 13:
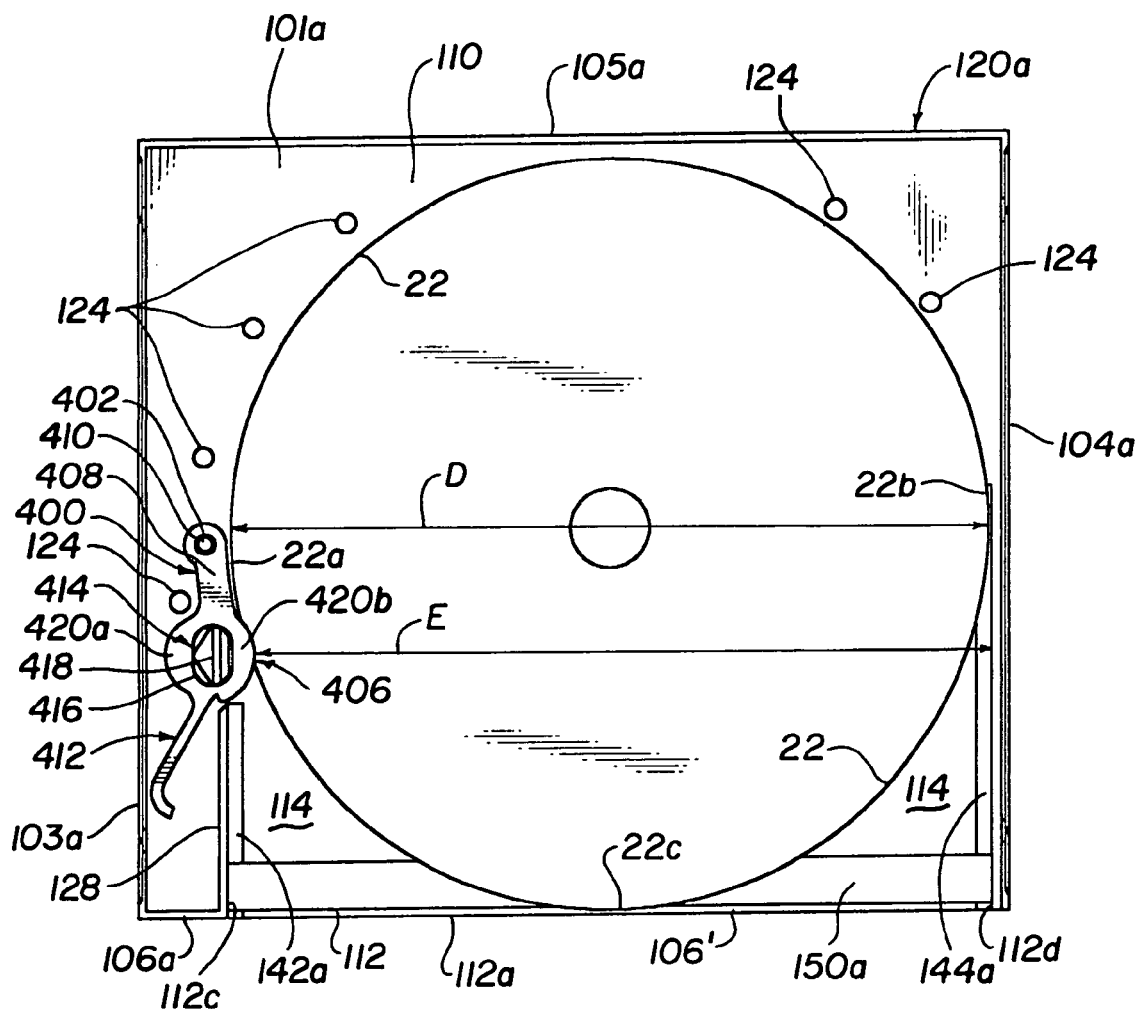
FIG. 13 is a top elevation view of an example of a presently most-preferred example of a release structure shown positioned on the base and with a CD being completely inserted into the case and retained inside the cavity by the release.

According to a second aspect of the invention, as shown in FIG. 13, for example, the case 100 of the storage device 10 further includes a disc-controlling structure for selectively controlling the release of the disc media 20 from the case, such a disc-controlling structure generally identified in the drawing by the reference number 400. As will hereinafter be described in detail, an example of the disc-controlling structure 400 includes a tab 406 adjacent the cavity that can be moved between a locking position that prevents the passage of the diameter of the disc media through the cavity toward the opening, a release position that permits the passage of the diameter of the disc media through the cavity toward the opening, and a tab-biasing structure for biasing the tab in the locking position. An example of a tab-biasing structure includes a tab spring 412 that is operatively connected between the case 100 and the tab 406 so that the tab spring 412 is relatively relaxed when the tab 406 is in the locking position and the tab spring 412 is relatively compressed when the tab 406 is in the release position.

According to a more particular aspect of the invention, when the disc media 20 is in the cavity, the tab-biasing structure can be overcome by gently jerking the case 100 in a forward and then a backward direction, such that the disc media tends to move forward toward the opening relative to the backward motion of the case, which relative momentum causes the disc media to move against the tab and overcomes the biasing of the tab.

According to a different, more particular aspect of the invention, a structure is provided that can be used to manually overcome the biasing of the tab 406 in the locking position, thereby allowing the disc media 20 to easily move past the tab 406. Thus, by manually overcoming the biasing of the tab 406 and moving the tab 406 to the release position, the disc media 20 can be released simply tilting the opening 112 of the case downward toward the ground, such that the relatively small force of gravity acting on the disc media 20 causes it to fall out of the cavity 110 through the opening 112. As the disc media falls out of the opening 112, a person's hand can catch and hold the disc media 20 by the circumferential edge 22. For example, an actuator 414 can be operatively connected to the tab 406. Preferably, the actuator 414 is positioned adjacent the left side or right side of the case, such that a person can grasp the case 100 along the left side 103' or right side 104' (whichever side is adjacent the actuator 414) and simultaneously manipulate the actuator 414 with the person's thumb on the same hand, all without interfering with the opening 112 in the front side 106' of the case 100. This does not require grasping the actuator across the length or width of the case 100, which can be difficult for the smaller hands of a woman or child.

According to another, more particular aspect of the invention, the disc-controlling structure 400 further includes a disc-ejecting structure for ejecting the disc media from the case, where such a disc-ejecting structure is generally identified in the drawing by the reference number 450. As will hereinafter be described in detail and illustrated with reference to the embodiments shown in FIGS. 14–15, FIGS. 16–22, and FIGS. 23–24, various examples of the disc-ejecting structure include an ejector spring operatively positioned in the case to store potential energy as the disc media is inserted through the opening into the cavity, which stored potential energy is used to assist in ejecting the disc media from the case with the means for manually overcoming the tab spring.

According to yet another, more particular aspect of the invention, the storage device can be adapted to accommodate more than one disc media, yet still have most of the advantages of the various aspects of the invention. FIGS. 37–40 illustrate an example embodiment of a dual disc-media storage device 10b. This device can be most preferably adapted to have the same overall height as a standard CD case, yet still have a tray 200 to accommodate at least a sheet label material label that can be seen from the two sides 103' and 104' without interfering with the opening in the front side 106' of the case.

One or more of these various aspects of the invention can be practiced independently of the others, but most preferably and advantageously most or all of these aspects of the invention are practiced together.

As will hereinafter be described in detail, a storage device according to the invention will have one or more of the following improvements and advantages, with the understanding that a storage device according to the invention is not necessarily required to provide any or all of the following particular advantages:

(a) providing a storage device for a disc media that is less prone to breakage and damage;
(b) providing a storage device for a disc media that allows the use of a graphics label to be seen from two sides of the case without interfering with the opening in the front side of the case;
(c) providing a storage device for a disc media wherein the left side and right side of the case are shorter than the front side of the case having the opening defined therein;
(d) providing a storage device that selectively can be used with or without a portion for storing printed media, such that the storage device can have smaller overall dimensions and allow a space savings relative to storing the printed media with the disc media;
(e) providing a storage device that can be easily operated by grasping the case along a left side or right side and simultaneously manipulated with the person's thumb on the same hand and without interfering with the opening in the front side of the case; and/or
(f) providing a storage device that is easier and cheaper to manufacture.

Figure 3:
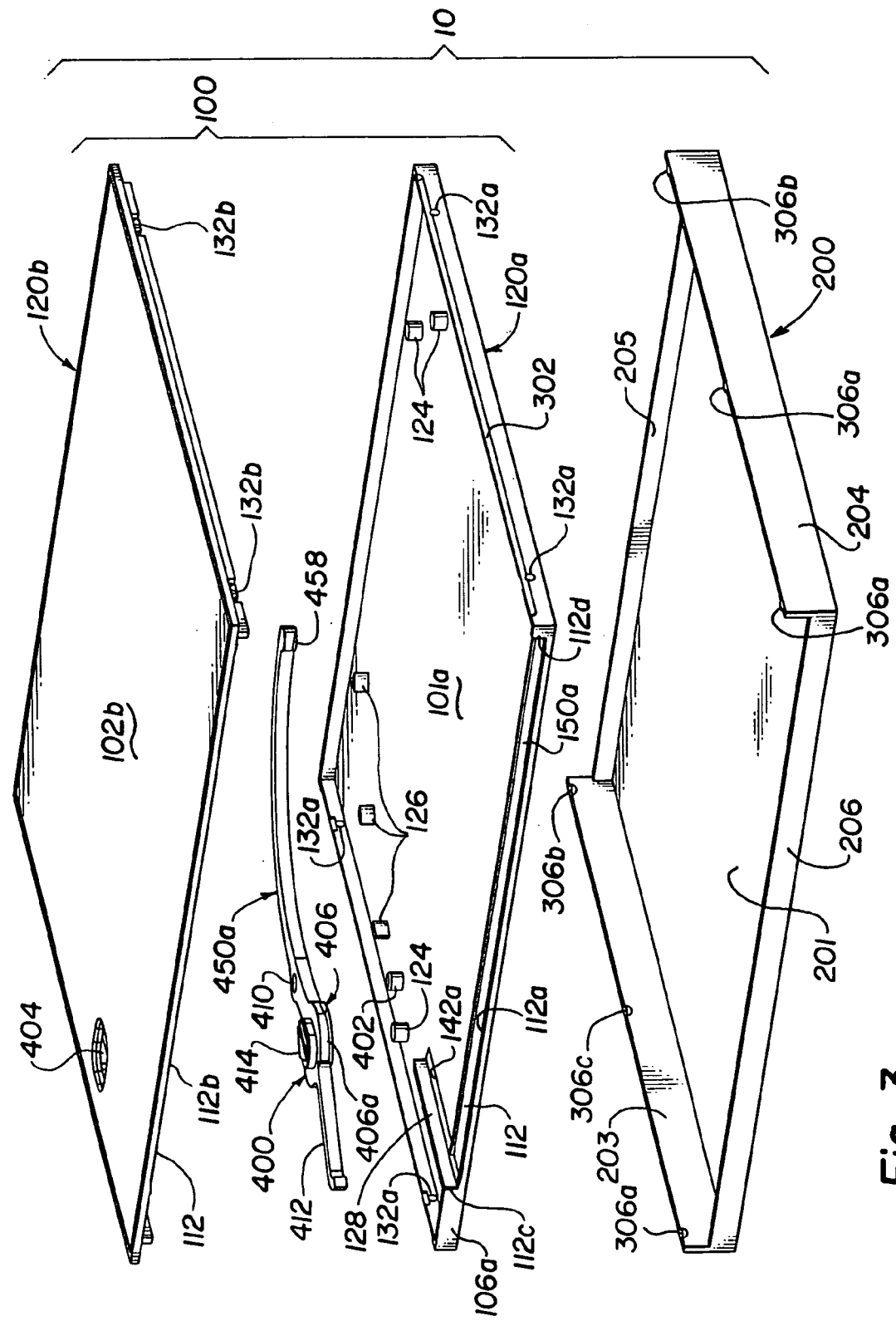
FIG. 3 is an exploded isometric view from the top, front, and right side of the storage device.
Figure 4:
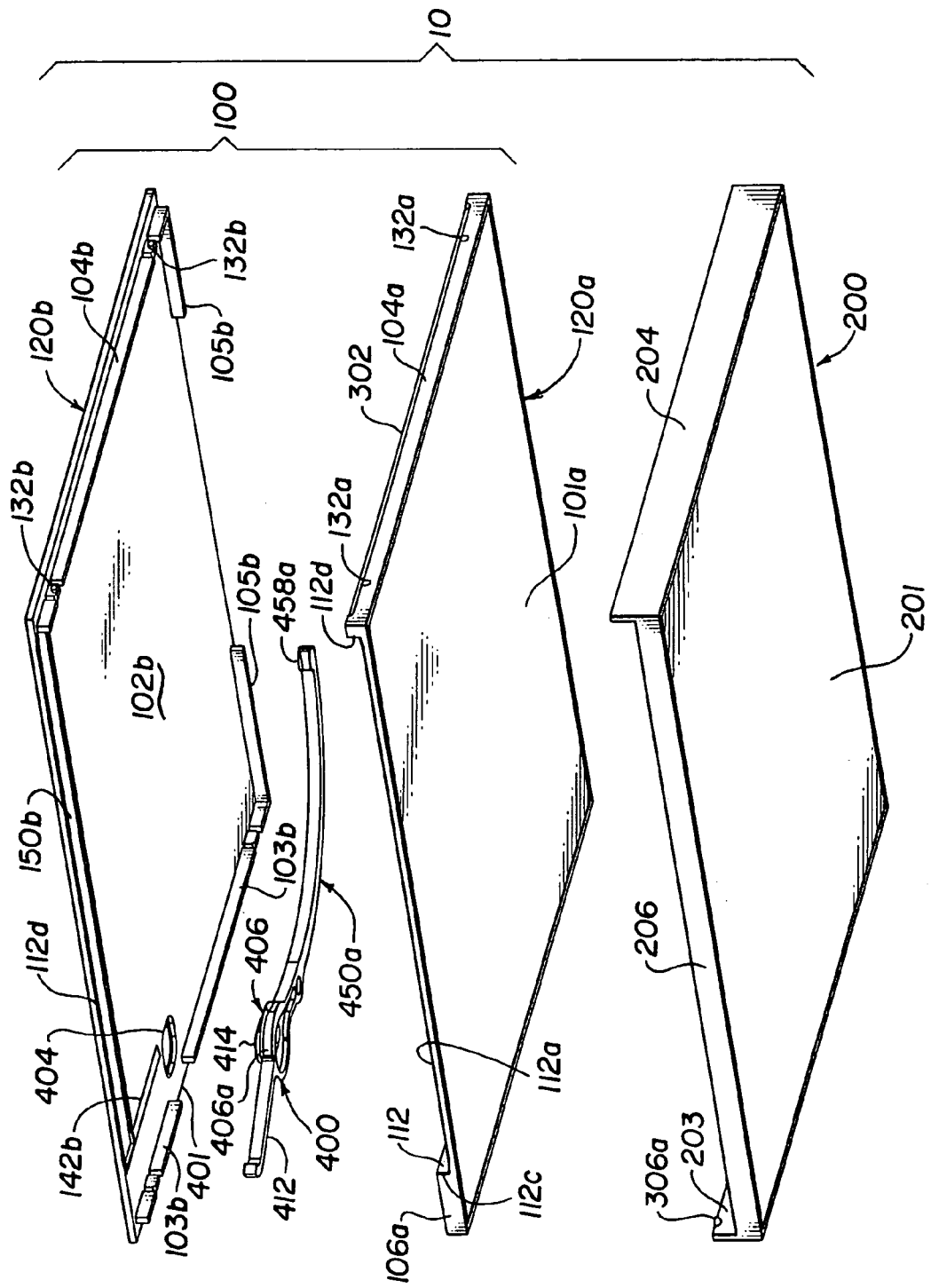
FIG. 4 is an exploded isometric view from the bottom, front, and right side of the storage device.
Figure 5:
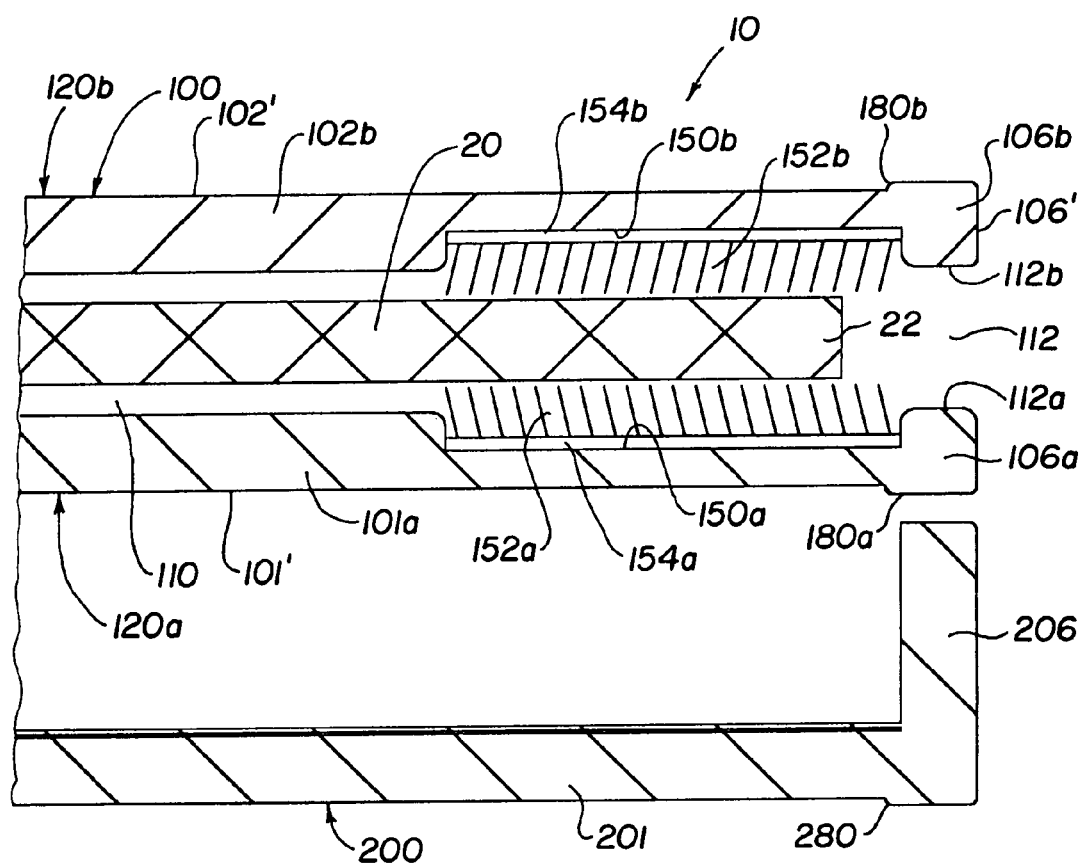
FIG. 5 is a detail cross-section view from a side of the storage device together with a CD positioned in the cavity of the case showing a pair of soft wipes near the CD opening in the case.
Figure 10:
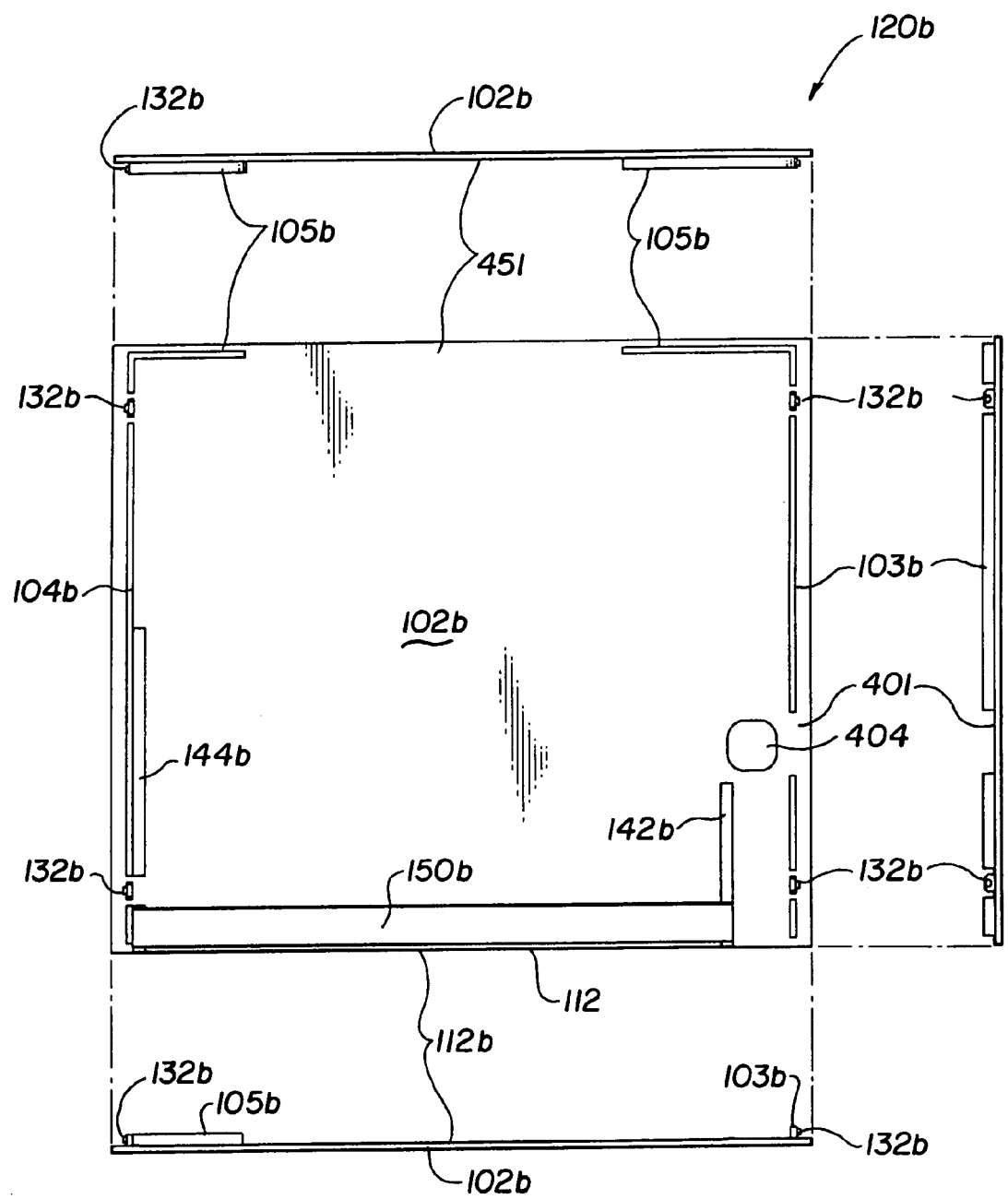
FIG. 10 is a bottom elevation view of the lid together with front, left side, and back elevation views projected from the bottom elevation view.
Figure 11:
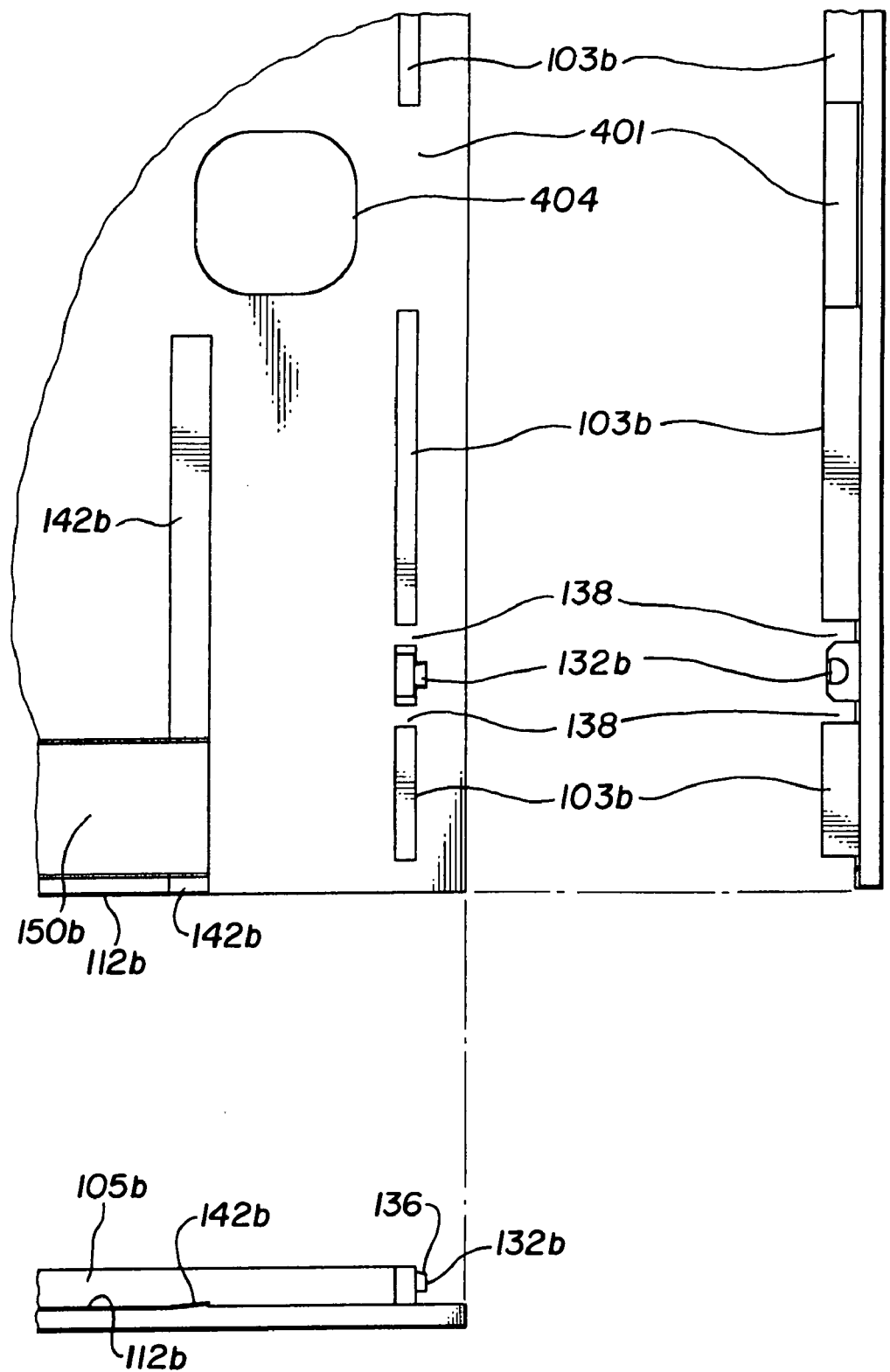
FIG. 11 is a detail bottom elevation view of the front, left-side corner of the lid, together with front and left-side elevation views projected from the bottom elevation view.
Figure 12:
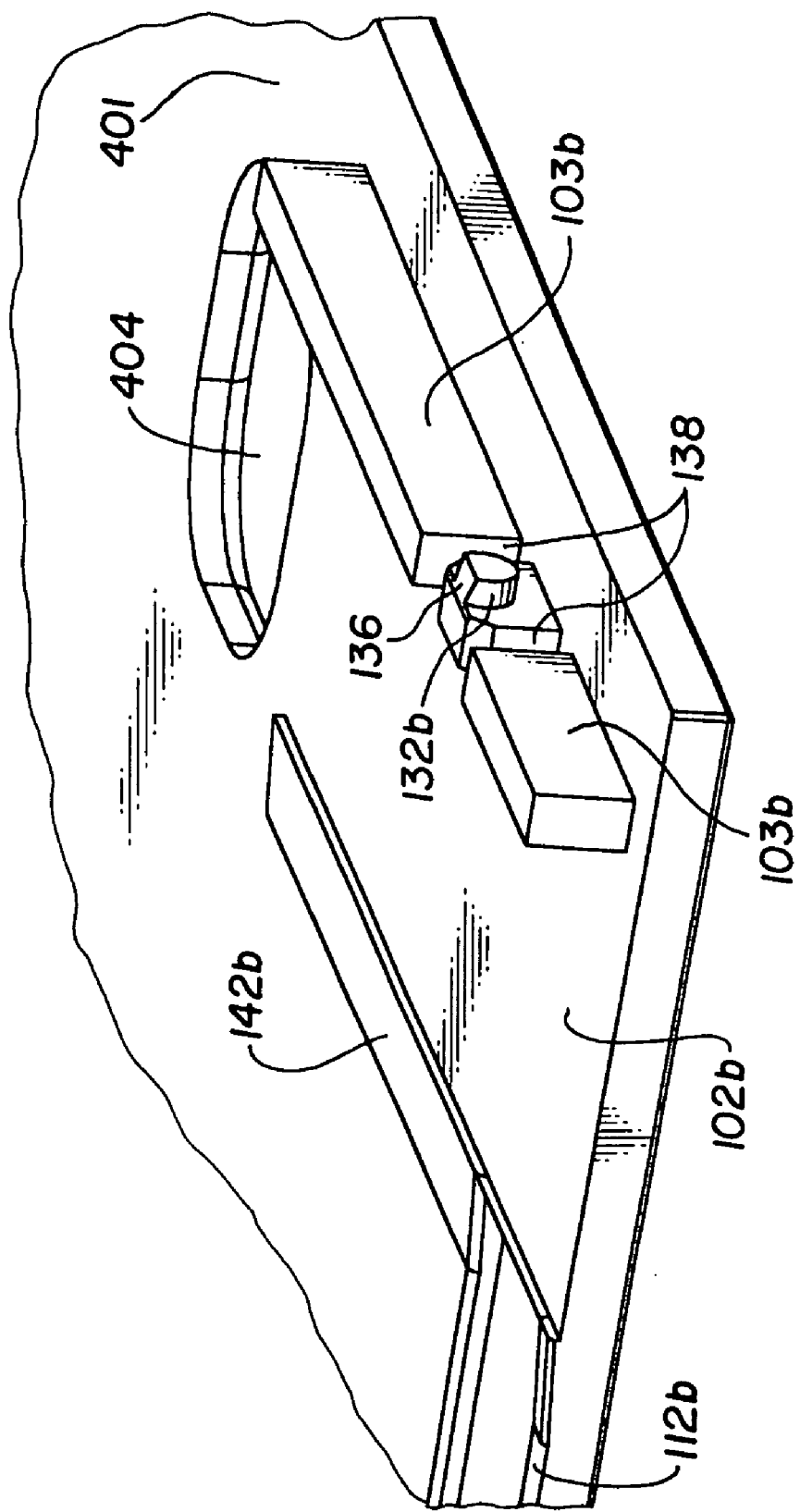
FIG. 12 is a detail isometric view from the bottom, front, and left side of the bottom, front, and left-side corner of the lid.
Figure 14:
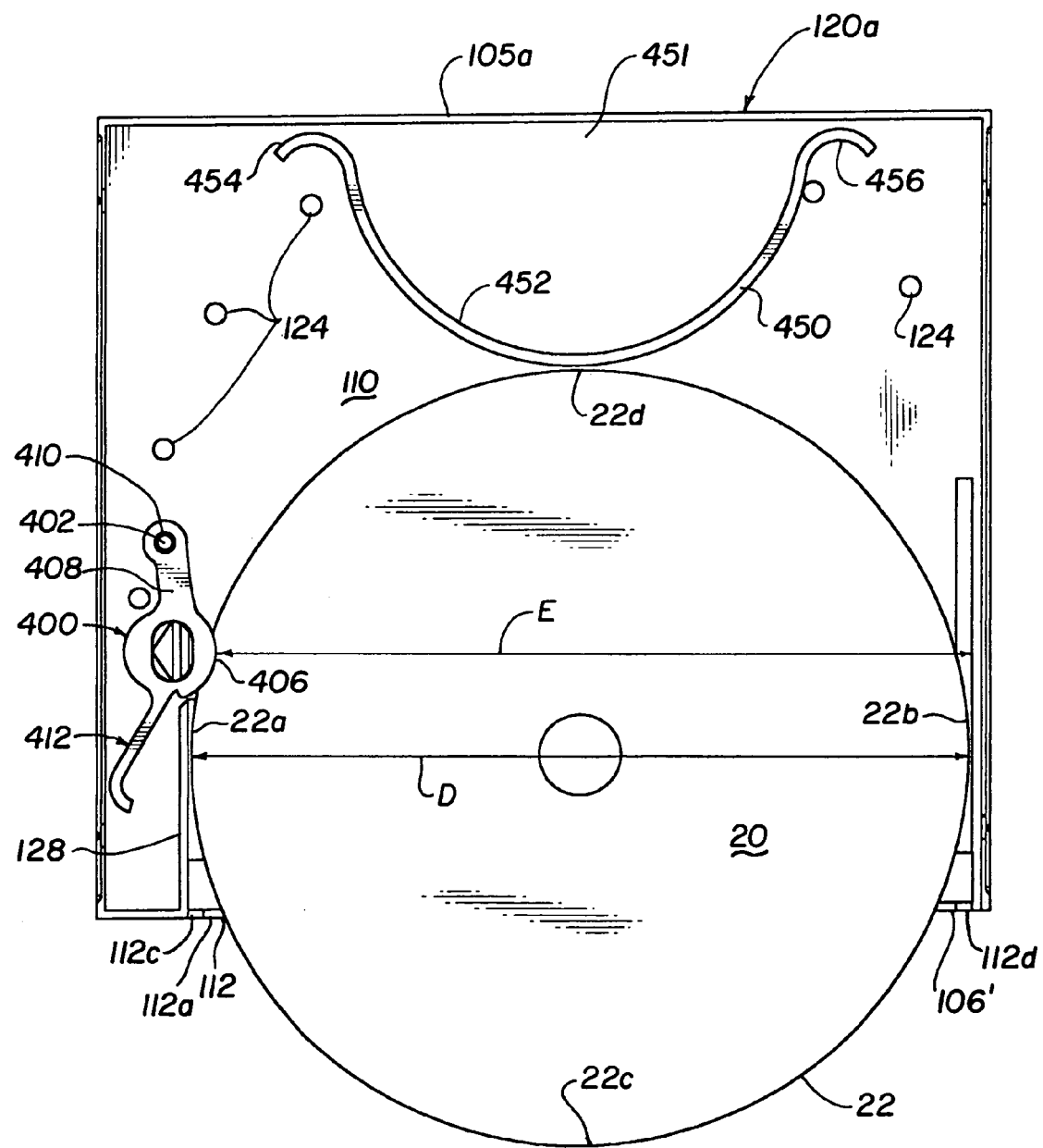
FIG. 14 is a top elevation view of the presently most-preferred example of a release structure and an example of a separate ejector spring structure shown positioned on the base and illustrating a CD being moved through the opening in the front side of the CD case.
Figure 15:
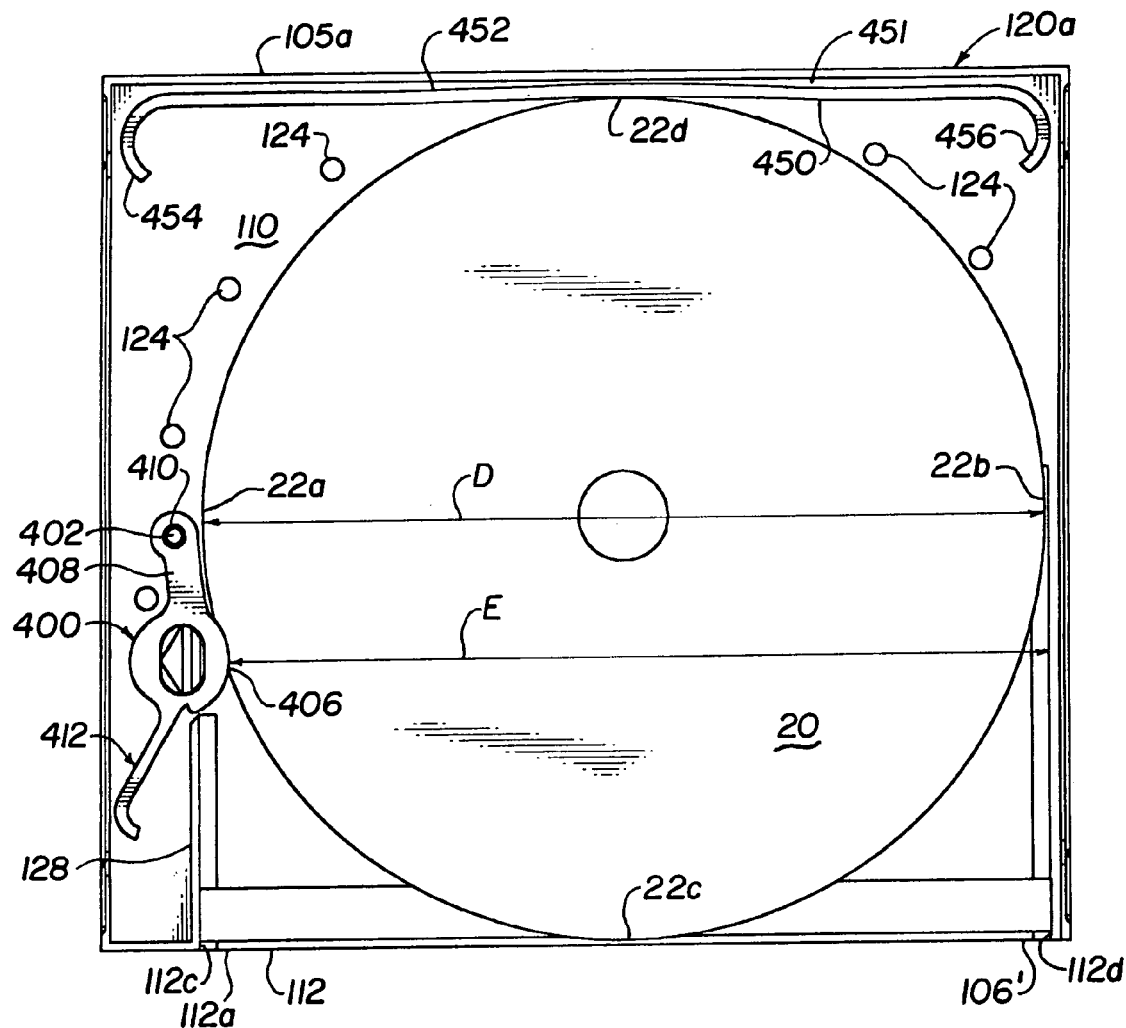
FIG. 15 is a top elevation view of the presently most-preferred example of a release structure and an example of a separate ejector spring structure shown positioned on the base and illustrating a CD being completely inserted into the cavity of the CD case and retained inside the cavity of the case against the separate ejector by the release.
Figure 23:
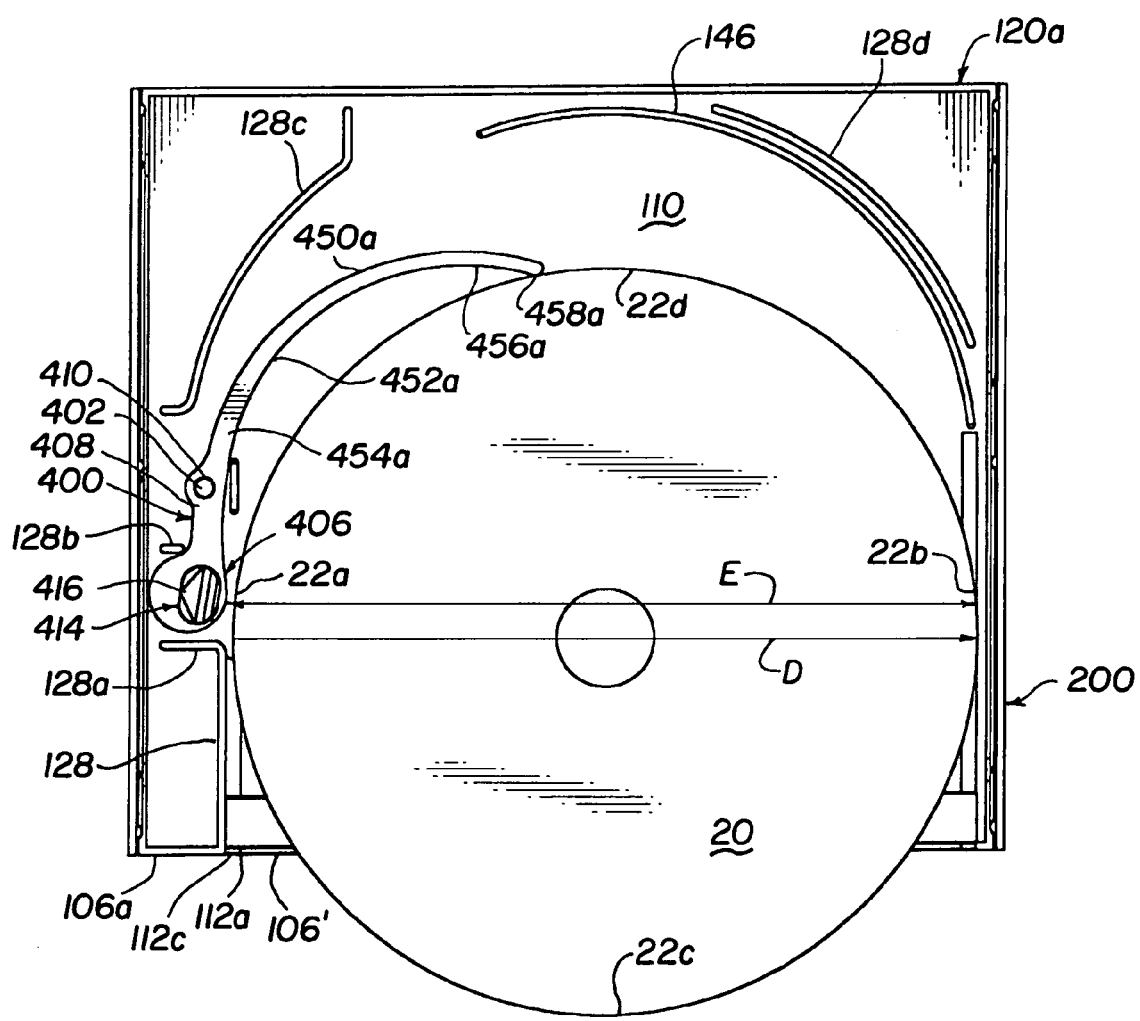
FIG. 23 is a top elevation view of a second, presently most-preferred example of a release with an ejector spring integrally formed thereon shown positioned on the base (and tray) and illustrating the diameter of a CD being moved through the opening in the front side of the CD.
Figure 24:
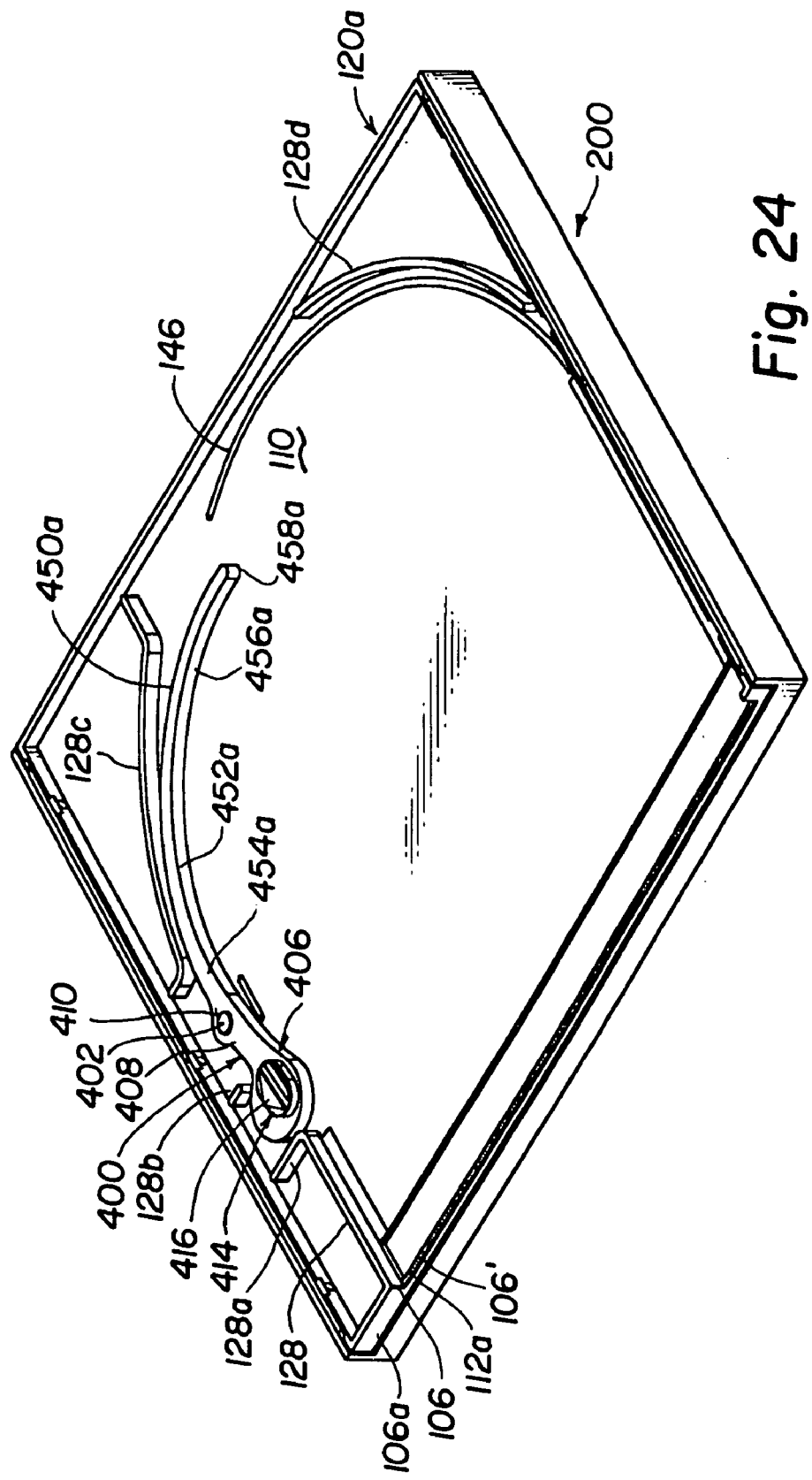
FIG. 24 is an isometric view from the top, front, and right side of the base (and tray) showing the second example of a release with an ejector spring integrally formed thereon positioned on the base.
Figure 33:
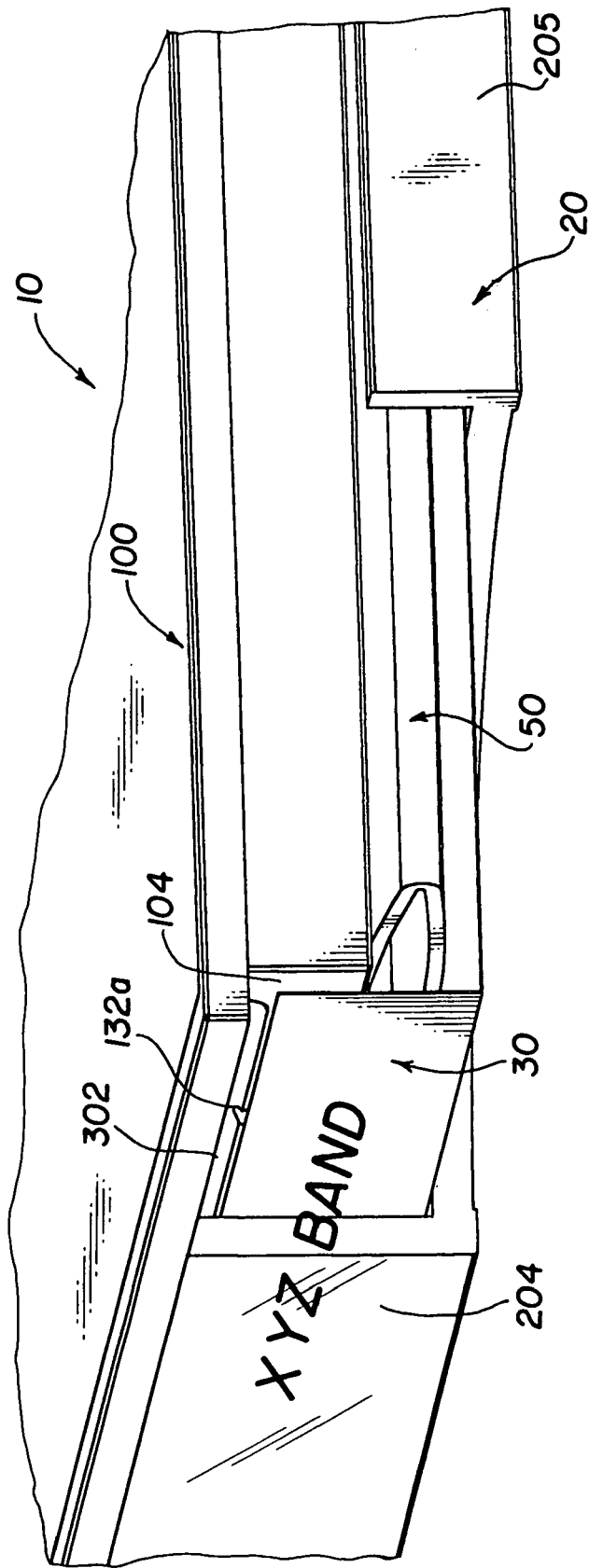
FIG. 33 is a detail isometric cut-away view from the top, front, and left side of the top, front, and left-side corner of the assembled base, lid, and tray showing how a spine graphics label can be positioned between the base and the tray and such that at least a portion of the spine graphics label is between the left-side case wall of the assembled CD case and the left-side case wall of the tray, and additionally showing how a booklet can be positioned between the bottom case wall of the CD case and the tray.
Figure 34:
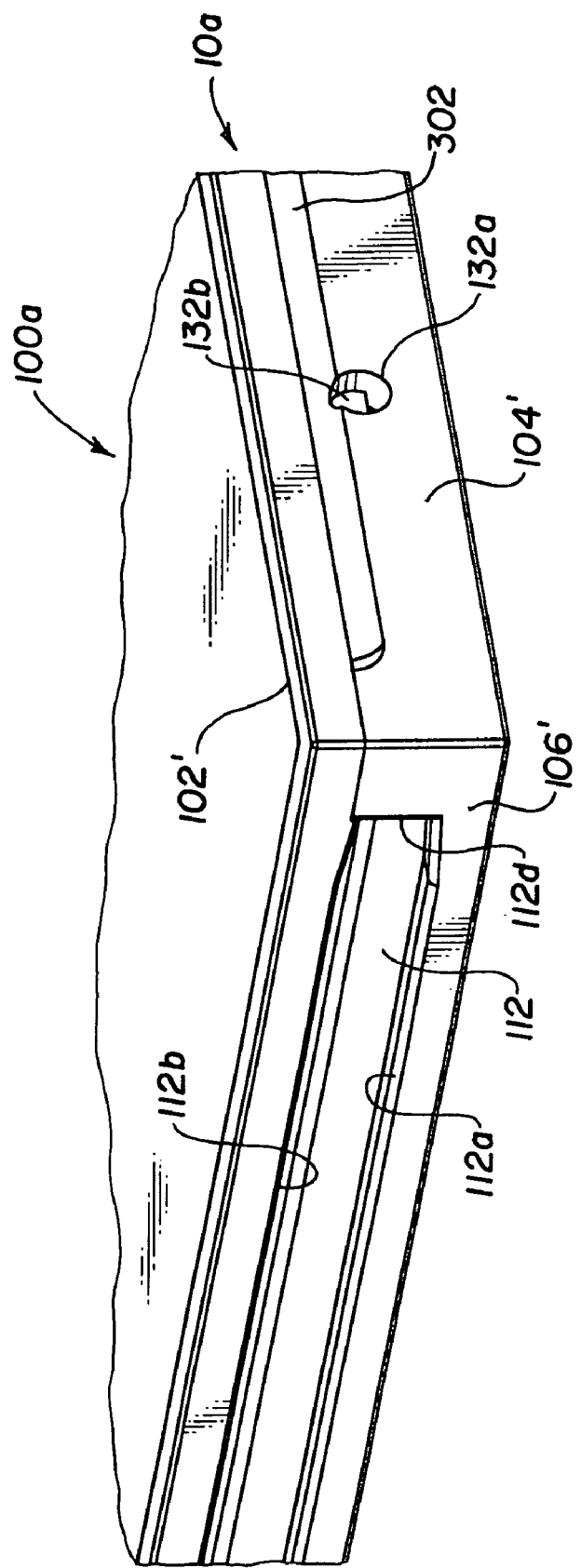
FIG. 34 is a detail isometric view from the top, front, and left side of the top, front, and left-side corner of the assembled base and lid according to an alternative embodiment of the invention, wherein the base and lid form a flat outer surface of the side case wall of the case.
Figure 35:
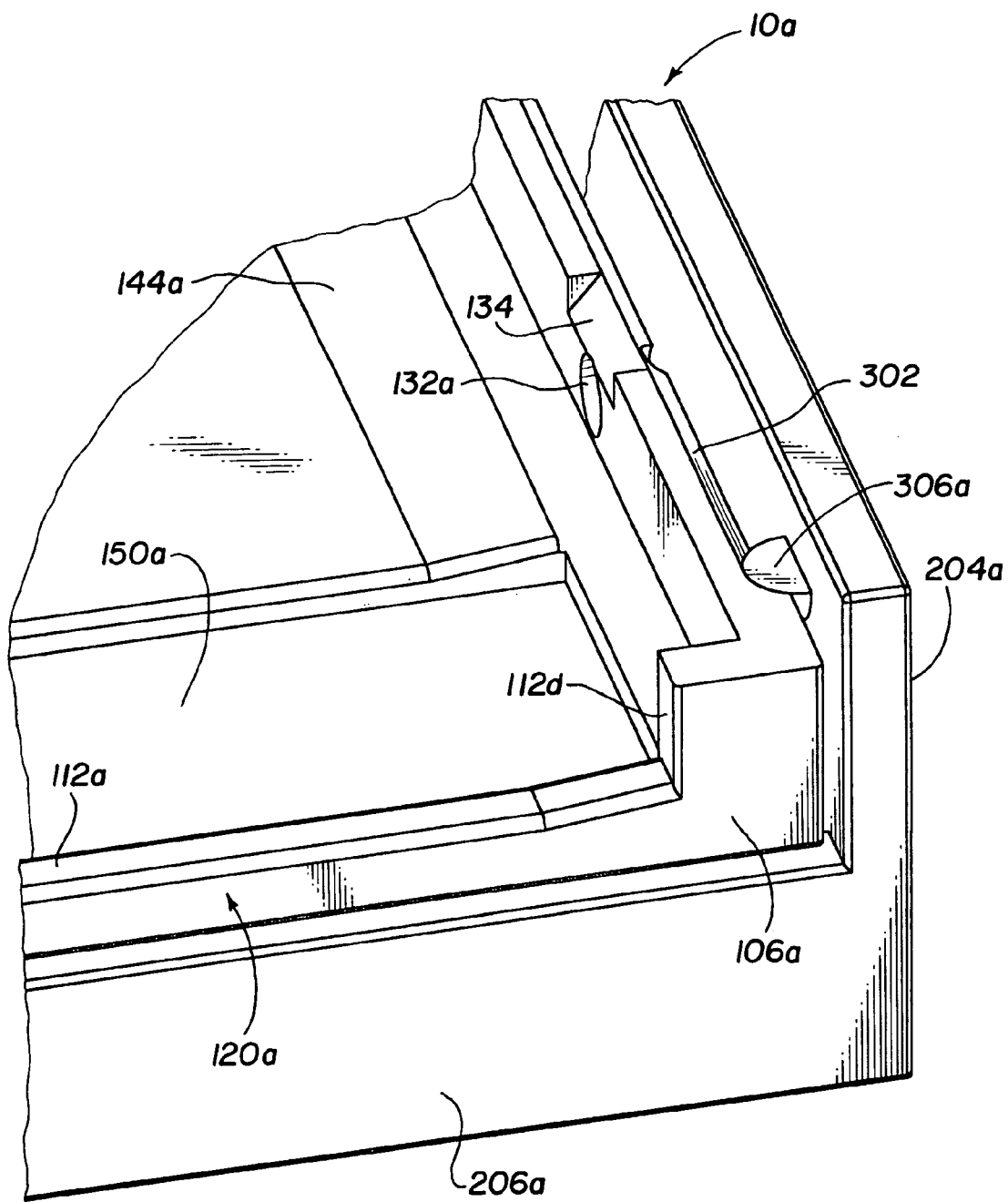
FIG. 35 is a detail isometric view from the top, front, and right side of the top, front, and left-side corner of the assembled base and tray (but without the lid) according to the alternative embodiment of the invention shown in FIG. 34, wherein the side tray walls of the tray completely overlap the side case walls of the case.
Figure 36:
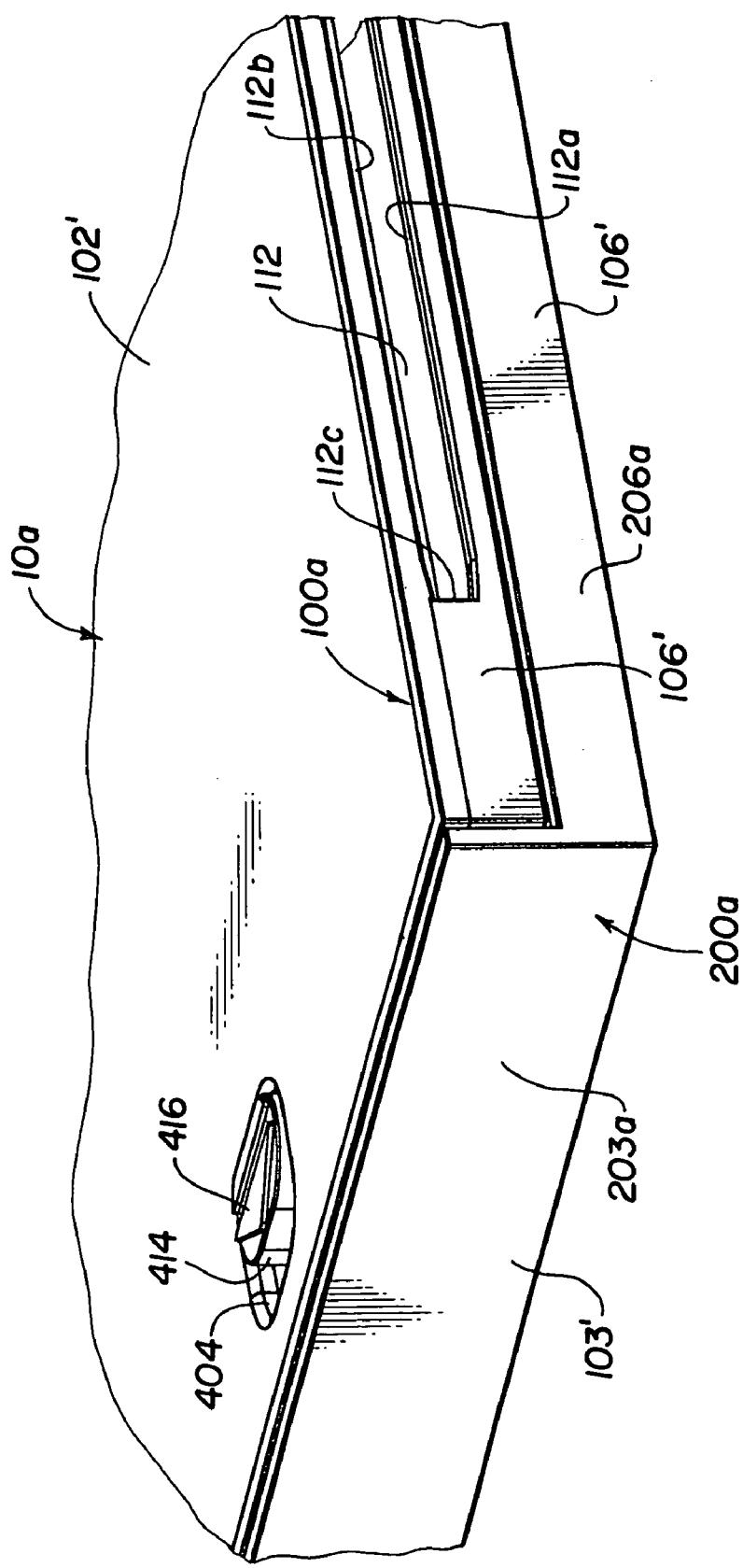
FIG. 36 is a detail isometric view from the top, front, and left side of the top, front, and left-side corner of the assembled base, lid, and tray according to an alternative embodiment of the invention shown in FIG. 34 and FIG. 35, wherein the base and lid form a CD case with rectangular top, bottom, and side case walls, and where the case assembled with the tray also have rectangular top, bottom, and sides.

These and other aspects and advantages of the invention are hereinafter described in detail with reference to presently most-preferred embodiments of the invention and with more particular reference to the drawing. In general, FIGS. 1–2 show an overview of the assembled storage device 10, showing the case 100 with the tray 200 in FIG. 1 and without the tray in FIG. 2;

FIGS. 3–4 show additional exploded views of the storage device 10;

FIG. 5 shows a cross-sectional detail of the positioning of wipes in the storage device 10;

FIGS. 6–9 illustrate the base of the case 100;

FIGS. 10–12 illustrate the lid of the case 100;

FIG. 13 illustrates an example of a disc-controlling structure generally identified in the drawing by the reference number 400;

FIGS. 14–15 illustrate an example of a disc-controlling structure generally identified in the drawing by the reference number 400 and including a separate ejector spring 450;

FIGS. 16–22 illustrate another example of a disc-controlling structure generally identified in the drawing by the reference number 400 and including an ejector spring 450a integrally formed thereon;

FIGS. 23–24 illustrate yet another example of a disc-controlling structure generally identified in the drawing by the reference number 400 and including an ejector spring 450a integrally formed thereon;

FIGS. 25–28 illustrate the tray 200 of the storage device;

FIGS. 29–32 show exploded views of the storage device 10 including the positioning of the disc media 20, a spline graphics label 30, and a booklet 50;

FIG. 33 illustrates in detail the assembly and positioning of printed media in one embodiment of the storage device 10;

FIGS. 34–36 illustrate the assembled structure of another embodiment of the storage device 10a, wherein the case 100 presents flat exterior side-wall surfaces either with or without the tray 200; and FIGS. 37–40 illustrate a dual disc-media storage device 10b according to a further aspect of the invention.

Materials and Manufacturing Considerations

A storage device 10 according to the invention is preferably made of a suitable plastic material, such as crystal polystyrene, polyethylene, and nylon. Plastic is a durable, lightweight material and can be used to make parts that are colored, opaque, frosted, or transparent, as desired. Suitable plastic materials can be selected for having an appropriate compromise between brittleness and resiliency, whereby the same plastic material can be used for making structural walls or springs. Plastics can also be made to have frosted or colored portions, which can add desirable aesthetic appeal.

Furthermore, plastic parts can be conveniently manufactured by injection molding, which can be a highly cost-effective manufacturing process. Most preferably, as will hereinafter be described in detail, the parts are designed to take into account manufacturing considerations, such as ease of injection molding. For example, the parts are designed to be easily removed from the mold and with fewest extracting motions required.

It should be understood, of course, that the function of a single structure described herein can sometimes be performed by more than one part, or the functions of two different structures can be performed by a single or integrally formed part. Especially from a manufacturing perspective, it is highly preferred to design the storage device to minimize the total number of parts required to manufacture the storage device. It is not only the costs associated with making additional parts, but also the costs of assembly. The fewest possible number of steps and manipulations required to assemble the storage device, the better.

According to the presently most-preferred embodiment of the invention, the parts have been designed to simplify both injection molding and assembly considerations, although such part efficiencies are not necessarily required to practice every aspect of the invention.

The Case as a Whole

Referring to FIG. 2, in general, the case 100 includes bottom, top, left-side, right-side, and back-side case walls 101, 102, 103, 104, and 105, respectively, defining a generally rectangular, box-like shape having a bottom, top, left side, right side, back side, and front side, 101', 102', 103', 104', 105', and 106', respectively. The case may also have a front-side case wall 106, which can further define the front side 106'. Only the case walls 102, 103, and 106 are visible in FIG. 2 (the others are shown in various other figures). It is important to recognize that the case walls preferably present planar sides, but are not required to. For example, in a first embodiment of a storage device 10 illustrated in the drawing, the left-side, right-side, back-side, and front-side case walls 103, 104, 105, and 106 present sides 103', 104', 105', and 106', respectively, each having stepped profiles. As will hereinafter be described in detail, the stepped sides are adapted to cooperate with the tray 200 to form an overall more perfectly rectangular, box-like shape when assembled with the tray 200. It is to be understood, however, that the sides of the case 100 can have any desirable and convenient profile, including having planar surfaces presenting flat profiles.

The case 100 also includes a cavity 110 defined inside the case walls 101–105, the cavity 110 being at least sufficient to accommodate the disc media 20. The case 100 further includes an opening 112 defined in the front side 106', the opening 112 communicating with the cavity 110 and the opening 112 being at least sufficient for inserting the disc media 20 into the cavity 110. The opening 112 can be defined, for example, by bottom opening edge 112a, top opening edge 112b, left-side opening edge 112c, and right-side opening edge 112d. Most preferably, the opening 112 is tapered on both ends to help space the disc media 20 so only opposed portions of the circumferential edge 22 are in contact with the case, which helps prevent scratching of the recording surface of the disc media as it is inserted or removed from the case 100. According to the presently most-preferred embodiment of the invention, the opening 112 can be at least partially defined by the front-side case wall 106, but it is to be understood that it is within the scope of the invention for the opening 112 to be substantially the entire front side 106' of the case 100, such that the case 100 does not require a front-side case wall. Only the opening 112 and an edge portion of a disc media 20 are visible in FIG. 2 (the rest being shown in various other figures).

Preferably, the case 100 has the overall dimensions of a "half-height" (sometimes referred to as a "half-thick") standard CD case. More particularly, the case 100 has an overall length of 5.600 inches, an overall width of 4.900 inches, and an overall height of 0.200 inches, plus or minus about 0.015 on each dimension, wherein the left side 103' and the right side 104' of the case are shorter than the back side 105' and front side 106'. It is to be understood, of course, that except when it is desired for the case 100 to be compatible with standard CD case shelving units or storage boxes, the overall dimensions are not critical to the practice of the invention.

The left-side, right-side, and back-side case walls 103–105, respectively, support the bottom case wall 101 and top case wall 102 in spaced apart relation to each other. The internal spacing between the bottom case wall 101 and the top case wall 102 is sufficient to define the height of the cavity 110, preferably with at least a sufficient clearance so that a disc media 20, such as a CD or a DVD, can be positioned in the cavity 110 such that the bottom case wall 101 and top case wall 102 do not touch the bottom or top surfaces of the disc media. More particularly, according to the presently most-preferred embodiment of the storage device 10, the internal spacing between the top case wall 101 and the bottom case wall 102 is preferably about 0.095 inches, which provides ample clearance from both the bottom and top surfaces of a standard CD or DVD, which has a height (or thickness) of about 0.050 inches.

Referring now to FIGS. 3–4, the case 100 is preferably formed of two basic parts, arbitrarily referenced as a base 120a and a lid 120b. The base 120a and the lid 120b can be connected together to form the case 100. Preferably, the base 120a and the lid 120b can be simply snapped together by interlocking structures as will hereinafter be described in detail. This eliminates the need for gluing or sonic welding of parts for the manufacturing assembly process. Although less desirable from a manufacturing standpoint, the base 120a and the lid 120b can be assembled by other means, for example, the two parts can be adapted to be glued or spot welded together. The base 120a is described in detail with reference to FIGS. 6–9. The lid 120b is described in detail with reference to FIGS. 10–12.

The Base

Figure 6:
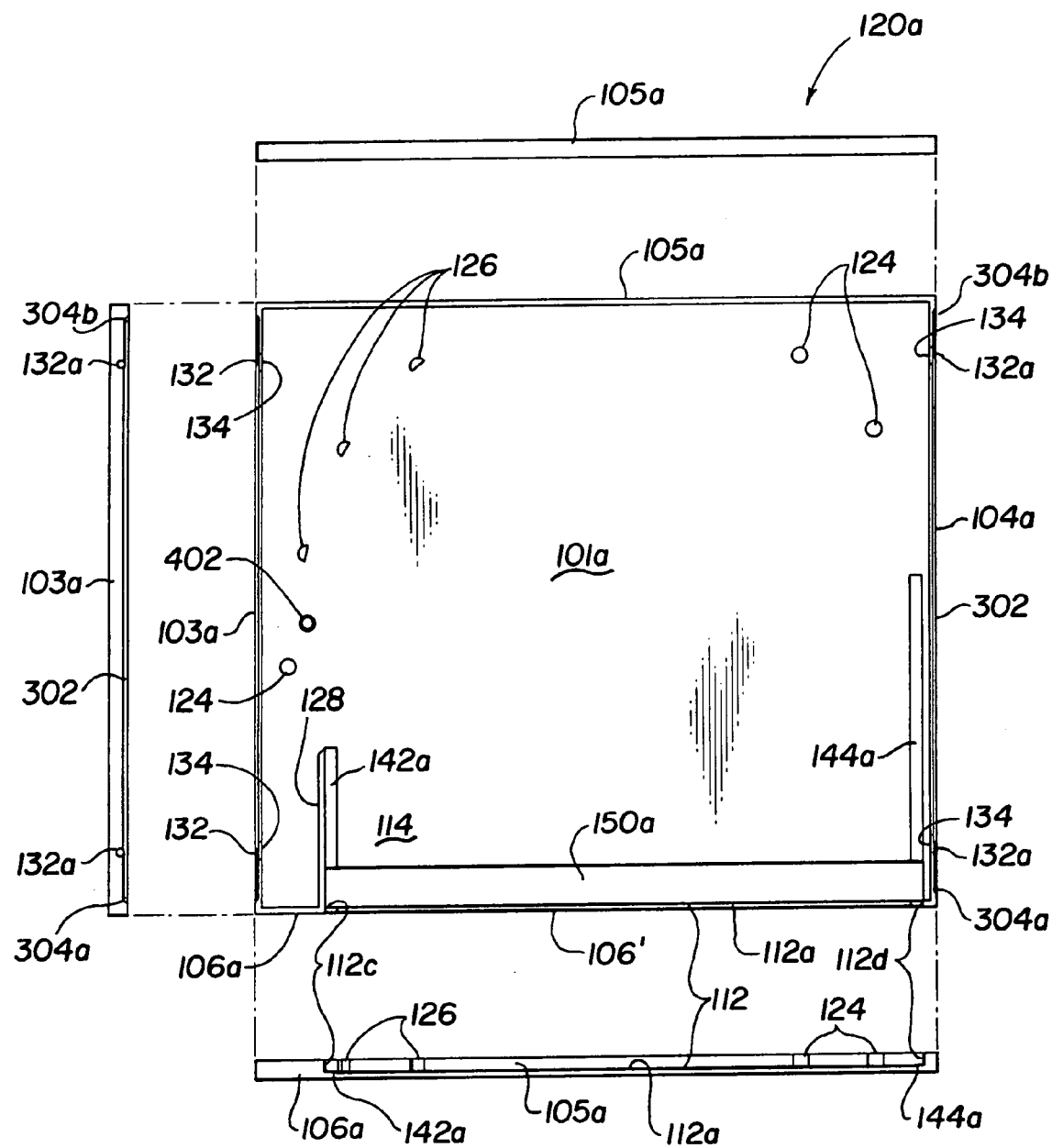
FIG. 6 is a top elevation view of the base together with front, left side, and back elevation views projected from the top elevation view.

Referring now to FIGS. 6–9, the base 120a of the case 100 will be described in detail. Referring first to FIG. 6, the base 120a preferably includes a bottom base wall 101a, a left-side base wall 103a, a right-side base wall 104a, a back-side base wall 105a, and a front-side base wall 106a. The side base walls 103a–106a are preferably formed along the outermost edges of the bottom base wall 101a.

The bottom base wall 101a and each of the side base walls 103a–106a is preferably about 0.050 inches thick. The bottom base wall 101a preferably has a rectangular shape with a length of about 5.470 inches and an overall width of about 4.900 inches. Note that this length is about 0.130 inches less than the overall length of the standard CD case. As will hereinafter be described in detail, the slightly shorter length is to accommodate the thicknesses of the left-side and right-side tray walls of a tray 200., which preferably have a thickness of 0.050 inches plus an additional clearance on each side of about 0.015 inches to allow for the insertion of a graphics label therebetween. Each of the left-side, right-side, back-side, and front-side base walls 103a–106a preferably stands an overall height of about 0.095 inches above the inner or upper surface of the bottom base wall 101a.

The base 120a also preferably includes a plurality of standoff pegs 124 and 126, which help define the cavity 110 of the case and help position a disc media in the cavity by providing a boundary for the circumferential edge of the disc media. In addition to the side base walls 103a–106a, the standoff pegs 124 and 126 adjacent the cavity 110 can help prevent the bottom case wall 101 and top case wall 102 of the assembled case 100 from being squeezed together into contact with the top and/or bottom surfaces of a disc media 20 that can be positioned in the cavity 110 of the assembled case 100. It is to be understood, of course, that the function of the standoff pegs 124 and 126 can be provided by any convenient shape, such as the cylindrical shapes of the standoff pegs 124 or semi-cylindrical shapes of the standoff pegs 126 illustrated in the presently most-preferred embodiment of the drawing, or any other shapes, such as elongated or curved wall portions. For example, the base 120a also preferably includes a standoff wall 128. This particular standoff wall 128 also helps define a path 114 communicating between the opening 112 and the cavity 110 so that a disc media 20 (not shown in FIG. 6) can be inserted or removed from the cavity 110. The standoff pegs 124 and 126 and the standoff wall 128 preferably have a height of about 0.095 inches above the inner or upper surface of the bottom case wall 101.

The base 120a and the lid 120b preferably include a structure that help assemble and hold the base 120a and the lid 120b together. Continuing to refer to FIG. 6, and also referring to the more detailed views of a representative corner portion of the base 120a shown in FIGS. 7–9, the left-side and right-side base walls 103a and 104a each preferably have at least two snap holes 132a formed therein. The snap holes 132a are spaced apart along the base walls 103a and 104a. The snap holes 132a each have an internal diameter of about 0.068 inches and as shown in the drawing preferably extend all the way through the left-side and right-side base walls 103a and 104b. As will hereinafter be described in detail, the snap holes 132a are adapted to cooperate with corresponding snap pins formed on the lid 120*b*, whereby the base 120*a* and the lid 120*b* can be snapped together.

As those of skill in the injection-molding arts will appreciate, the plurality of snap holes 132*a* are preferably located in each of the opposed side base walls of the base 120*a*, such as the left-side and right-side base walls 103*a* and 104*a*. Thus, when manufacturing the base 120*a* in a mold, after curing of the plastic material, the base 120*a* can be removed from the corresponding pins forming the snap holes 132*a* by slightly bending the opposed side base walls of the finished base 120*a* apart from one another, thereby pulling the snap holes 132*a* away from the pins of the mold used to form the base 120*a*.

Furthermore, a snap pin guide ramp 134 is preferably formed in the base side wall above each of the snap holes 132*a*. Each of the snap pin guide ramps 134 are downwardly and inwardly sloping surfaces, which help deflect and guide a snap pin on the lid 120*b* toward the snap hole 132*a*. Each snap pin guide ramp 134 is at least as wide as the diameter of the associated snap hole 132*a*.

It is to be understood, of course, that the number and configuration of the snap holes 132*a* is not critical to the practice of the invention. For example, the function of the snap holes can be provided by a structure in the form of slots or a single, elongated snap groove. Furthermore, for example, it is not critical that the snap holes 132*a* be on the base 120*a* instead of the lid 120*b*.

As will hereinafter be described in detail, the base 120*a* and the tray 200 preferably include a tray-retaining structure that helps assemble and hold the base 120*a* and the tray 200 together, which tray-retaining structure is generally identified in the drawing by the reference number 300. Continuing to refer to FIG. 6, and also referring to the more detailed views of a representative corner portion of the base 120*a* shown in FIGS. 7–9, the left-side and right-side base walls 103*a* and 104*a* of the base 120*a* each preferably includes an elongated groove 302 defined therein. As will hereinafter be described in detail, the groove 302 is one of the parts of the cooperating tray-retaining structure 300. The groove 302 preferably has a quarter-round radius of about 0.040 inches, and each of the forward and rearward ends 304*a* and 304*b*, respectively, of the groove 302 preferably terminates with a quarter-spherical radius of about 0.040 inches.

The groove 302 is preferably formed in the uppermost portion of the side base walls. Thus, as will be readily appreciated by those skilled in the injection-molding arts, the corresponding mold structures used to form groove 302 in the side case walls 103*a* and 104*a* of the base 120*a* will not interfere with the removal of the base 120*a* from the mold. It is to be understood, however, that the grooves 302 can be formed entirely within the side case walls. Similar to the molding situation applicable to forming the snap holes 132*a*, when the grooves 302 are formed within the side case walls, the base 120*a* can be removed from the corresponding mold structures forming the grooves 302 by slightly bending the opposed side walls of the finished base 120*a* apart from one another, thereby pulling the grooves 302 away from the mold structures used to form the base 120*a*. Thus, it can be desirable, but not necessary, that the grooves 302 be formed along a top, outer edge of the side base walls 103*a* and 104*a*.

The base 120*a* of the case 100 preferably includes a pivot pin 402, which will hereinafter be described in detail with respect to the structure for selectively releasing disc media from the case, such a structure generally identified in the drawing by the reference number 400. The pivot pin 402 preferably has a height of about 0.095 inches and a diameter of about 0.120 inches. In addition, the pivot pin 402 functions as another standoff structure, like the standoff pegs 124 and 126 and the standoff wall 128, which structures help maintain the internal spacing between the bottom case wall 101 and top case wall 102.

Continuing to refer to FIG. 6, the base 120*a* preferably also includes left-side and right-side lower guide ramps 142*a* and 144*a* in the cavity 110 positioned on either side of the cavity 110 near the opening 112. Each of the lower guide ramps 142*a* and 144*a* defines a surface that slopes from inside of the cavity 110 upward toward the left side and right side, respectively, of the base 120*a*. Preferably, the lower guide ramps 142*a* and 144*a* have a width of only about 0.100 inches and a rise of about 0.010 inches. Preferably, the lower guide ramps 142*a* and 144*a* are elongated along the edges of a path 114 communicating between the cavity 110 and the opening 112. In the example of this preferred embodiment, the ramps 142*a* and 144*a* are adapted to engage only portions of the circumferential edge of a standard disc media 20. Thus, lower guide ramps 142*a* and 144*a* can assist in positioning a disc media 20 (not shown in FIG. 6) such at a lower or downwardly-oriented surface of the disc media 20 positioned in the cavity 110 is retained spaced apart from the inner surface of the bottom base wall 101*a*. Furthermore, as will hereinafter be described in detail, the lower guide ramps 142*a* and 144*a* on the base 120*a* cooperate with corresponding upper guide ramps to define a track for engaging opposite portions of the circumferential edge of a disc media as the diameter of the disc media is moved in the path 114 communicating between the opening 112 and the cavity 110. Another function and benefit of the lower guide ramp 142*a* is to strengthen the adjoining bottom base wall 110*a* and the standoff wall 128, and, similarly, the lower guide ramp 144*a* strengthens the adjoining bottom base wall 110*a* and right-side base wall 105*a*.

The forward end of the base 120*a* preferably also includes a shallow, recessed area 150*a* in the bottom base wall 101*a* and near the front side 106' along the length of the opening 112. The recessed area 150*a* is adapted for positioning a piece of soft material (not shown in FIG. 6). For example, the recessed area 150*a* can have a width of about 0.375 inches and a depth of about 0.020 inches. Referring briefly to FIG. 5 of the drawing, the width of the recess 150*a* is primarily adapted for ease of handling and installing a strip of soft material 152*a*. Such a piece of soft material can be positioned and glued with a suitable adhesive layer 154*a* in the recessed area 150*a*. A particularly suitable material is velour with a pressure sensitive adhesive backing for ease of installing in the recess 150*a*. The overall thickness of such a soft material including such an adhesive backing is preferably about 0.030 inches, thus it would project a height of about 0.010 inches above the inwardly facing surface of the bottom base wall 101*a*.

Such a soft material positioned near the opening 112 can both help position and wipe the lower or downwardly-oriented surface of a disc media 20 as it is moved through the opening 112 into or out of the cavity 110. For example, if the disc media 20 is not inserted perfectly centered into the opening 112, a rearward portion 22*d* of the circumferential edge 22 that touches or slides across the inner surface of the bottom case wall 101 or the inner surface of the top case wall 102 defining the cavity 110. The wipe material 152*a* helps position the rest of the top or bottom surfaces of the disc media 20 away from the inner surfaces of the bottom and top case walls 101 and 102, respectively, defining the cavity 110, both as the disc media is inserted or removed from the cavity 110 and as the disc media rests entirely within the cavity 110 where only the forward portion 22c of the circumferential edge 22 is adjacent the opening 112. Furthermore, the wipe 152a helps prevent scratching of any recording surface area against the upwardly and forward facing bottom opening edge 112a of the opening 112 and also helps clean and maintain any such recording surface of the disc media 20. The wipe material 152a can also help position the disc media 20 in the cavity 110 between the bottom case wall 101 and the top case wall 102.

Figure 7:
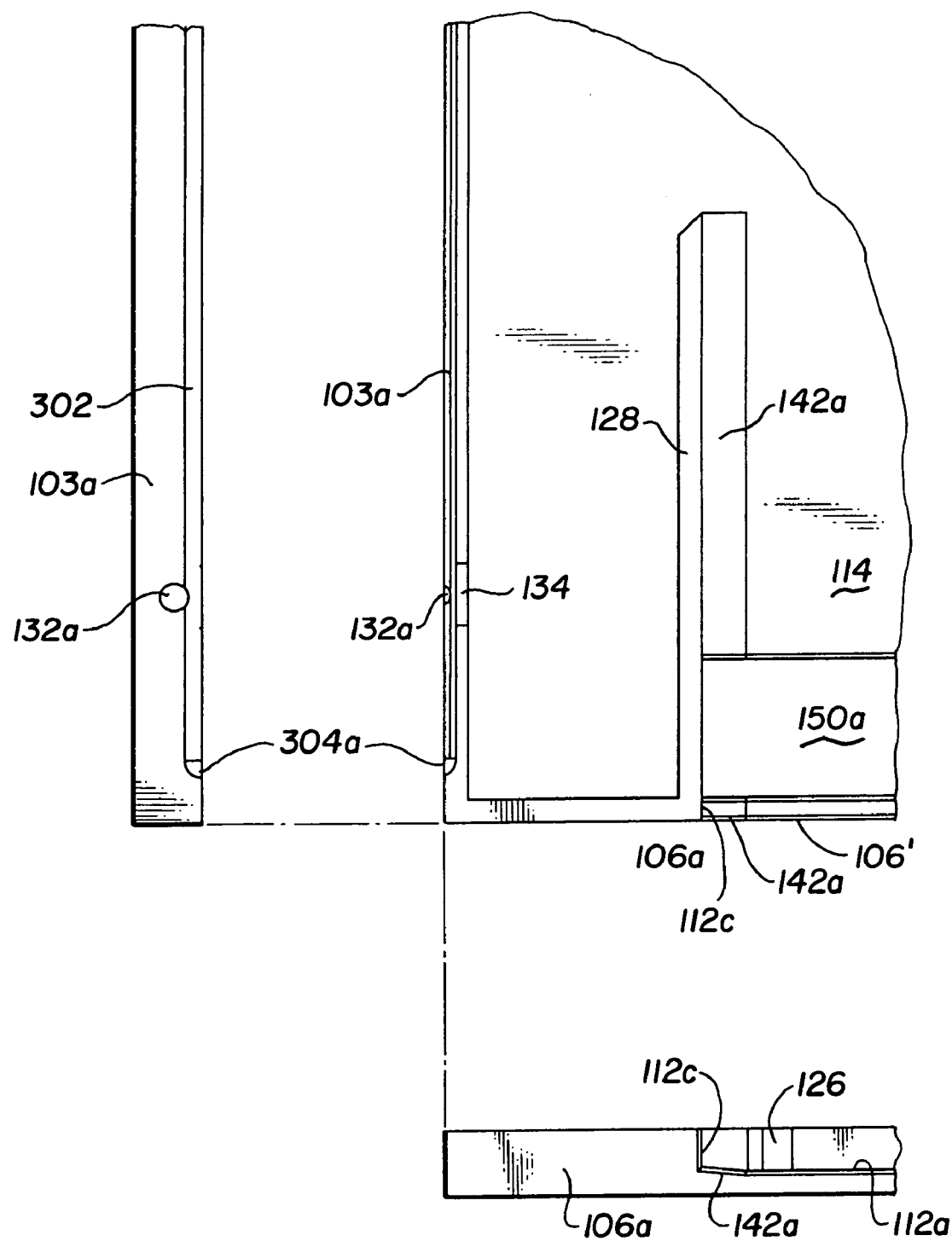
FIG. 7 is a detail top elevation view of the front, left-side corner of the base, together with front and left-side elevation views projected from the top elevation view.
Figure 8:
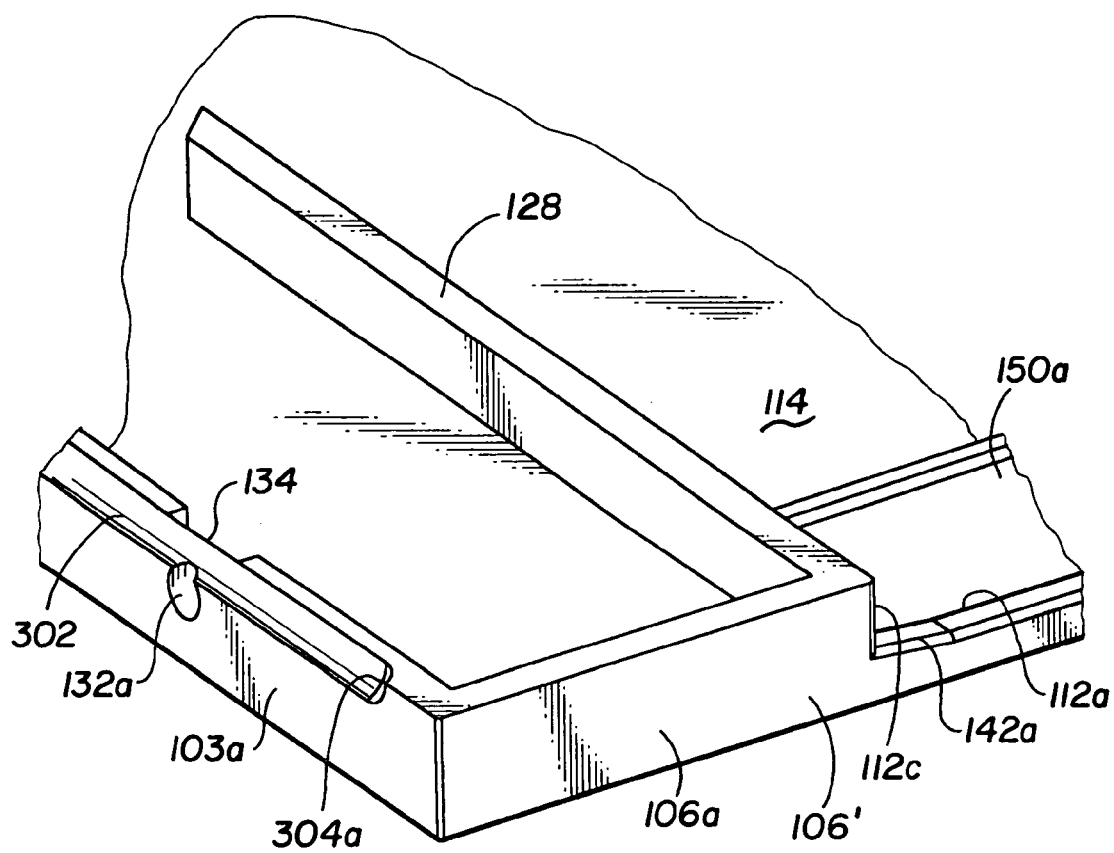
FIG. 8 is a detail isometric view from the top, front, and left side of the top, front, and left-side corner of the base.
Figure 9:
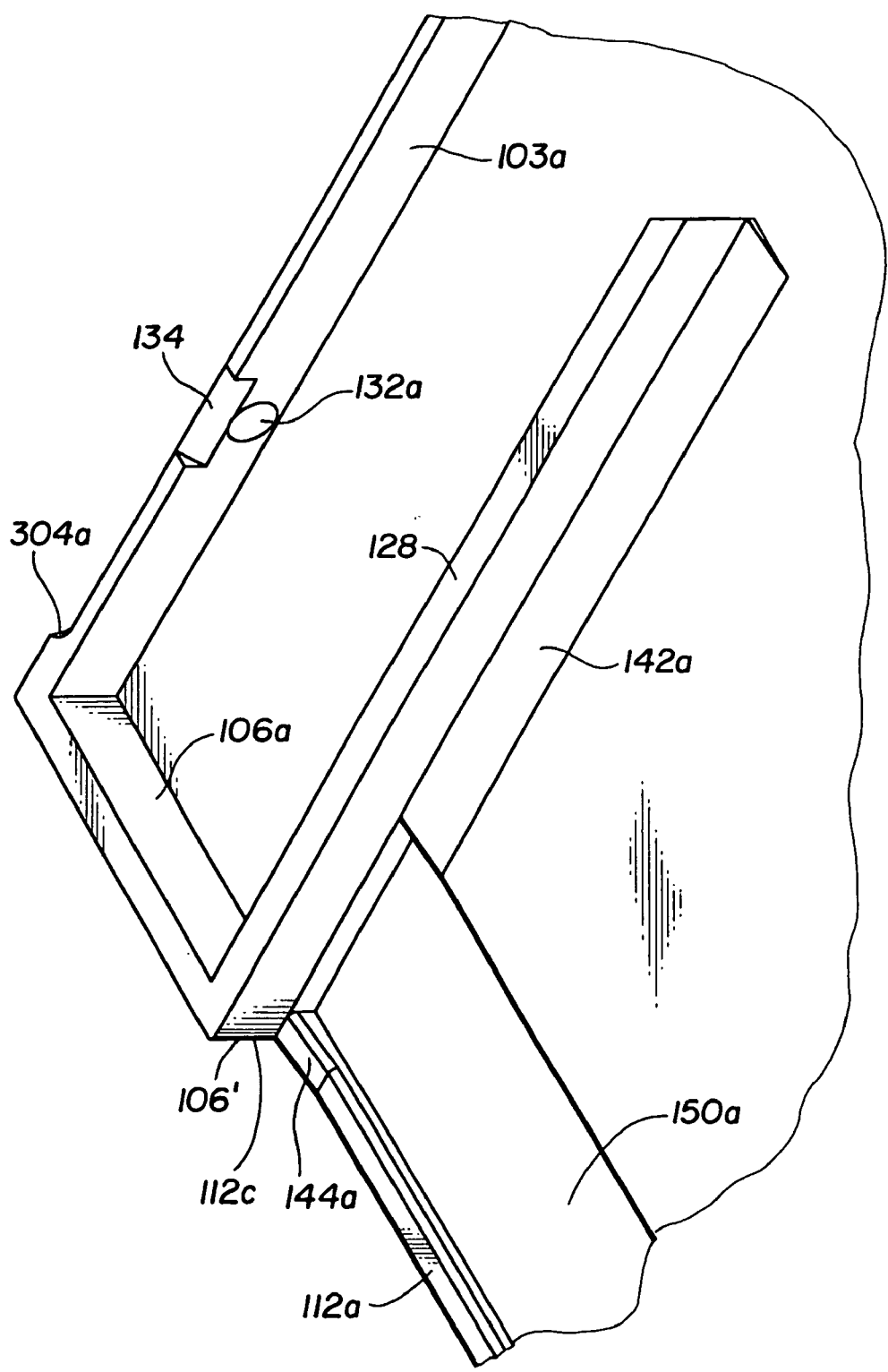
FIG. 9 is a detail isometric view from the top, back, and right side of the top, front, and left-side corner of the base.

Finally, although too small to be shown even in the detail of FIG. 7, by referring to FIGS. 1–2 and particularly the detail cross-section view of FIG. 5, it can be the upper surface of the bottom base wall 102a of the base 120a preferably includes a plurality of scuff rails 180a, which are most preferably located around the peripheral edges of the lower surface of the bottom base wall 102a. These scuff rails 180a have, for example, an overall height of only about 0.005 inches above the lower surface of the bottom base wall 102a of the base 120a and have, for example, a thickness of about 0.050 inches from the peripheral edges of the bottom base wall 102b, which is about the thickness of the base walls. The scuff rails 180a help slightly raise the lowermost surface of the bottom case wall 101 such that the rest of the surface is less likely to be scratched when the case 100 is moved across another object, such as a table top or the sides of a shelving unit. It is to be understood, however, that the scuff rails 180a are optional and they can have any suitable configuration. For example, the scuff rails 180a need not extend completely around the peripheral edges of the bottom case wall 101 and the same function could be provided, for example, by a plurality of shorter rail portions or a plurality of small dome structures.

The Lid

Referring now to FIGS. 10–12, the lid 120b of the case 100 will be described in detail. Referring first to FIG. 10, the lid 120b of the case 100 preferably includes a top lid wall 102b, a left-side lid wall 103b, a right-side lid wall 104b, and a back-side lid wall 105b. (In this preferred embodiment, the lid 120b does not have a front lid wall.) The lid walls 103b, 104b, and 105b are preferably formed spaced-apart from the outermost edges of the top lid wall 102b by at least the thickness of the side base walls 103a, 104a, and 105a, respectively.

The top lid wall 102b and each of the side lid walls 103b, 104b, and 105b is preferably about 0.050 inches thick. The top lid wall 102b preferably has a rectangular shape that is slightly greater in length than the bottom base wall 101a, the top lid wall 102a having a length of about 5.600 inches and an overall width of about 4.900 inches. As will hereinafter be described in detail, the slightly greater length of the top lid wall 102a in this embodiment is adapted to overlap the left-side and right-side tray walls of a tray 200. Each of the left-side, right-side, and back-side lid walls 103b, 104b, and 105b preferably has an overall height of about 0.095 inches below the inner or lower surface of the top lid wall 102b.

One function of the left-side, right-side, and back-side lid walls 103b, 104b, and 105b is to position the lid 120b within the left-side, right-side, back-side case walls 103a, 104a, and 105a, respectively, on the base 120a. Another function of the side lid walls 103b, 104b, and 105b is to reinforce the left-side, right-side, and back-side base walls 103a, 104a, and 105a on the base 120a.

Again, the base 120a and the lid 120b preferably include corresponding structural features that help assemble and hold the base 120a and the lid 120b together. Continuing to refer to FIG. 10, and also referring to the more-detailed views of a representative corner portion of the lid 120b shown in FIGS. 11–12, the left-side and right-side lid walls 103b and 104b each preferably have at least two snap pins 132b formed therein. The snap pins 132b are spaced apart along the side lid walls 103b and 104b, and positioned to be aligned with the corresponding snap holes 132a when the lid is positioned on the base 120a. The snap pins 132b each have an external diameter of about 0.062 inches and a length of about 0.040 inches.

Thus, the snap pins 132b do not extend all the way through the snap holes 132a in the left-side and right-side base walls 103a and 104b. As previously mentioned above, the snap holes 132a are adapted to cooperate with snap pins 132b formed on the lid 120b, whereby the base 120a and the lid 120b can be snapped together.

According to the presently most-preferred embodiment of the storage device 10, the bottom portion of each of the snap pins 132b has a mold release ramp 136, as best shown in FIGS. 11 and 12. This mold release ramp 136 slopes downward and outward. This ramp 136 is on the side of the snap pin 132b that is opposite to the side of the snap pin 132b that provides most of the retaining action or interference with the snap hole 132a that is used to hold the base 120a and the lid 120b together. Furthermore, relief gaps 138 are preferably formed in the side walls 103b and 104b on either side of each of the snap pins 132b. As those skilled in the injection-molding art will appreciate, this will facilitate removal of the snap pins 132b from the corresponding holes in the mold. Thus, the size and shape of the pins 132b allows the removal of the lid 120b from a mold without requiring any special sideways pull, which facilitates manufacture of the part by injection molding. Furthermore, these relief gaps 136 also allow the portion of the side wall having the snap pin 132b formed thereon to flex inward as the snap pin 132b is guided on a snap pin guide ramp 134 formed in the base side wall toward a snap hole 132a.

Based on the foregoing, it can be seen that the bottom base wall 101a, left-side base wall 103a, right-side base wall 104a, back-side base wall 105a, and front-side base wall 106a of the base 120a cooperate with the top lid wall 102b, left-side lid wall 103b, right-side lid wall 104b, back-side lid wall 105b of the lid 120b to form the bottom case wall 101, top case wall 102, left-side case wall 103, right-side case wall 104, back-side case wall 105, and front-side case wall 106 of the case 100. The snap pins 132b are guided and deflected by the snap pin guide ramps 134 on the lid 120b toward snap holes 132a, and, when the snap pins 132b reach the snap holes 132a, they snap into the snap holes 132a.

Continuing to refer to FIG. 10, the lid 120b preferably also includes left-side and right-side upper guide ramps 142b and 144b in the cavity 110 positioned on either side of the cavity 110 near the opening 112. Each of the upper guide ramps 142b and 144b defines a surface that slopes from inside of the cavity 110 downward toward the left side and right side, respectively, of the lid 120b. Preferably, the upper guide ramps 142b and 144b have a width of only about 0.100 inches and a rise of about 0.010 inches. Preferably, the upper guide ramps 142b and 144b are elongated along the edges of a path 114 communicating between the cavity 110 and the opening 112. In the example of this preferred embodiment, the ramps 142b and 144b are adapted to engage only portions of the circumferential edge of a standard disc media 20. Thus, upper guide ramps 142b and 144b can assist in positioning a disc media 20 (not shown in FIG. 10) such that an upper or upwardly-oriented surface of the disc media 20 positioned in the cavity 110 is retained spaced apart from the inner surface of the top case wall 102. As previously mentioned, the upper guide ramps 142b and 144b on the lid 120b cooperate with the corresponding lower guide ramps 142a and 144a, respectively, formed on the base 120a to define left-side and right-side tracks for engaging and guiding diametrically opposite portions of the circumferential edge of a disc media as the diameter of the disc media is moved in the path 114 communicating between the opening 112 and the cavity 110. It is to be understood, however, that this function of the guide ramps could be performed by other structures such as a plurality of small domes positioned on the inwardly facing surfaces of the bottom case wall 101 and the top case wall 102 to engage the circumferential edge of a disc media 20 and position the disc media away from the wall surfaces. Another function and benefit of the upper guide ramp 142b, however, is to strengthen the adjoining top lid wall 102b, and, similarly, the upper guide ramp 144b strengthens the adjoining top lid wall 102b and right-side base wall 105b.

The forward end of the lid 120b preferably also includes a shallow, recessed area 150b in the top case wall 102 and near the front side 106' along the length of the opening 112. The recessed area 150b is adapted to for positioning a piece of soft material (not shown in FIG. 10). Such a piece of soft material can be positioned and glued with a suitable adhesive in the recessed area 150b. For example, the recessed area 150b can have a width of about 0.375 inches and a depth of about 0.020 inches. Referring briefly to FIG. 5 of the drawing, the width of the recess 150b is primarily adapted for ease of handling and installing a strip of the soft material. Such a piece of soft material 152b can be positioned and glued with a suitable adhesive layer 154b in the recessed area 150b. A particularly suitable material is velour with a pressure sensitive adhesive backing for ease of installing in the recess 150b. The overall thickness of such a soft material including such an adhesive backing is preferably about 0.030 inches, thus it would project a height of about 0.010 inches above the inwardly facing surface of the top lid wall 102b.

Such a soft material positioned near the opening 112 can both help position and wipe the upper or upwardly-oriented surface of a disc media 20 as it is moved through the opening 112 into or out of the cavity 110. For example, if the disc media 20 is not inserted perfectly centered into the opening 112, a rearward portion 22d of the circumferential edge 22 that touches or slides across the inner surface of the bottom case wall 101 or the inner surface of the top case wall 102 defining the cavity 110. The wipe-material 152b helps position the rest of the top or bottom surfaces of the disc media 20 away from the inner surfaces of the bottom and top case walls 101 and 102, respectively, defining the cavity 110, both as the disc media is inserted or removed from the cavity 110 and as the disc media rests entirely within the cavity 110 where only the forward portion 22c of the circumferential edge is adjacent the opening 112. Furthermore, the wipe 152b helps prevent scratching of any recording surface area of the disc media 20 against an downwardly and forward facing top opening edge 112b of the opening 112 and also helps clean and maintain any such recording surface of the disc media 20. The wipe material 152b can also help position the disc media 20 in the cavity 110 between the bottom case wall 101 and the top case wall 102.

In addition, the lid 120b also preferably includes an actuator access opening 404, defined in the top lid wall 102b. The actuator access opening 404 will hereinafter be described in detail with respect to the structure for selectively releasing disc media from the case, such a structure generally identified in the drawing by the reference number 400.

The left-side lid wall 103b preferably has a relief portion 401 between the two end portions thereof. As will hereinafter become clear with the description of the actuator 414 and FIGS. 16–22, this relief portion 401 in the left-side lid wall 103b can help provide a space for the actuator 414 to reside when it is moved to the release position shown in FIG. 17.

Furthermore, the back-side lid wall 105b preferably has a relief portion 451 between the two end portions thereof. As will hereinafter be described in detail with reference to the separate ejector spring 450 and FIGS. 14–15, this relief portion 451 can provide a central portion of the separate ejector spring 450 a space to reside between the back-side wall 105a of the base 120a and the cavity 110 for a disc media 20.

Finally, although too small to be shown even in the detail of FIG. 11, by referring to FIGS. 1–2 and particularly the detail view of FIG. 5, it can be the upper surface of the top lid wall 102b of the lid 120b preferably includes a plurality of scuff rails 180b, which are most preferably located around the peripheral edges of the upper surface of the top lid wall 102b. The scuff rails 180b have, for example, an overall height of only about 0.005 inches above the upper surface of the top lid wall 102b of the lid 120b and have, for example, a thickness of about 0.050 inches from the peripheral edges of the top lid wall 102b, which is about the thickness of the lid walls. The scuff rails 180b help slightly raise the uppermost surface of the top case wall 102 such that the rest of the surface is less likely to be scratched when the case 100 is moved across another object, such as a table top or the sides of a shelving unit. It is to be understood, however, that the scuff rails 180b are optional and they can have any suitable configuration. For example, the scuff rails 180b need not extend completely around the peripheral edges of the top case wall 102 and the same function could be provided, for example, by a plurality of shorter rail portions or a plurality of small dome structures.

Thus, a storage device 10 including the case 100 without the tray 200 has an overall length of 5.600 inches and an overall width of 4.900 inches (the dimensions of the lid 120b). Furthermore, the assembled case 100 has an overall height of about 0.200 inches, plus or minus about 0.015 inches, that is, the sum of: (a) the height of the scuff rails 180a on the bottom base wall 101a, (b) the height (thickness) of the bottom base wall 101a, (c) the height of the side base walls 103a–106a above the inner or upper surface of the bottom base wall 101a (which is the same for the standoff pegs 124 and 126 and the standoff wall 128), (d) the height (thickness) of the top lid wall 102b, and (e) the height of the scuff rails 180b on the upper surface of the top lid wall 102b. Although not critical to the practice of various aspects of the invention, it is particularly advantageous to provide a case 100 that is the same length and width but one-half the height of a standard CD case. Thus, two of the cases 100 can fit in the space of a conventional shelving unit or storage box that is designed to accommodate a single standard CD case, or twice as many of the cases 100 can fit in the space of a conventional shelving unit or storage box that is designed to accommodate a plurality of conventional CD cases.

Selectively Controlling the Release of the Disc Media from the Case

According to a simple example or embodiment of the invention, the disc media 20 can be released from the cavity 110 simply by tilting the opening 112 of the case downward toward the ground, such that the relatively small force of gravity acting on the disc media 20 causes it to fall out of the cavity 110 through the opening 112. As the disc media falls out of the opening 112, a person's hand can catch and hold the disc media 20 by its circumferential edge 22. However, it would generally be preferable to be able to selectively control the release of the disc media from the cavity 110 to prevent accidentally or unintentionally spilling from the case 100.

Referring now to FIG. 13, a first example of a structure for selectively releasing disc media from the case is shown, where such a disc-controlling structure is generally identified in the drawing by the reference number 400. For presenting a better view of a disc media in the cavity 110 and the disc-controlling structure 400, the lid 120b is not shown in FIG. 13. But it should be appreciated that when assembled with the lid 120b, the right-side lid wall 104b of the lid 120b would be positioned along the inner side of right-side base wall 104a of the base 120a, thereby defining a slightly narrower cavity 110 than indicated in FIG. 13.

As shown in FIG. 13, the opening 112 is at least as long as the diameter D of the disc media 20 to be positioned in the cavity 110. A path 114 for the full diameter of the diameter D of the disc media 20 communicates between the opening 112 and the cavity 110, which path 114 can be partially defined by the lower guide ramps 142a and 144a of the base 120a. For example, the upper guide ramps 148b and 144b on the lid 120b (not shown in FIG. 13) cooperate with the corresponding lower guide ramps 142a and 144a, respectively, formed on the base 120a to define left-side and right-side tracks for engaging and guiding diametrically opposite left-side and right-side oriented portions 22a and 22b, respectively, of the circumferential edge 22 of a disc media 20 as the diameter of the disc media is moved in the path 114 communicating between the opening 112 and the cavity 110.

Preferably, the selective retention and release of the disc media 20 in the cavity 110 of the case 100 is controlled by a tab 406 adjacent the cavity 110 that can be moved between a locking position that prevents the passage of the diameter D of the disc media 20 through the cavity 110 toward the opening 112, and a release position that permits the passage of the diameter D of the disc media 20 through the cavity 110 toward the opening 112. The tab 406 is shown in FIG. 13 in such a locking position.

It is to be understood that the tab 406 can be almost any structural body that can be positioned to protrude into the path 114 of a disc media 20 that communicates between the cavity 110 and the opening 112 in the front side 106' of the case. As shown in FIG. 13, the tab 406 preferably has a rounded shape such that the circumferential edge 22 of a disc media 20 can deflect the tab 406 when a sufficient force is exerted to move the disc media 20 between the cavity 110 and the opening 112. Alternatively, for example, the tab 406 could have ramped surfaces instead of rounded surfaces.

The tab 406 can optionally include a horizontally-oriented groove 406a therein (which groove is better shown in FIGS. 3 and 4), which engages a portion 22a of the circumferential edge 22 of the disc media 20 and helps center the position of the disc media 20 in the cavity 110 away from the bottom case wall 101 and the top case wall 102. In the alternative, ramped surfaces can be formed in the inwardly-facing surfaces of the bottom case wall 101 and the top case wall 102 (not shown), similar to the ramped surfaces 142a and 142b.

Continuing to refer primarily to FIG. 13, according to a presently preferred embodiment, the tab 406 is operatively connected through a pivot arm 408 to the pivot pin 402 formed on the base 120a. More preferably, the tab 406 is integrally formed with the pivot arm 408. The pivot arm 408 is operatively connected to the case, for example, by a hole 410 formed therein that is spaced apart from the tab 406. The hole 410 in the pivot arm 408 is positioned over the corresponding pivot pin 402 of the base 120a. Thus, the tab 406 can be moved on the pivot arm 408 about the pivot pin 402 into the locking position shown in FIG. 13 or the tab 406 can be moved on the pivot arm 408 about the pivot pin 402 outwardly from the path 114 of the disc media 20 (which position is not shown in FIG. 13). When the tab 406 is positioned in the locking position shown in FIG. 13, the tab 406 is positioned such that the length E between the tab 406 and the opposite case wall 104 formed by right-side base wall 104a and right-side lid wall 104b (not shown in FIG. 13) is less than the diameter D of the disc media 20, which prevents the passage of the diameter D of the disc media 20 from the cavity 110 toward the opening 112.

The pivot pin 402 is preferably positioned forward of the diameter D of the disc media 20 when the disc media is fully inserted into the cavity 110, as shown in FIG. 13. Thus, the pivot axis of the pivot arm 408 about the pivot pin 402 is set forward of the center of the disc media 20, when it is fully inserted into the cavity 110, which provides an over center cam effect to work with the positioning of the tab spring 412 to help provide the biasing force against the tab 406.

The tab 406 and pivot arm 408 preferably have an overall height of about 0.085 inches, which is slightly less than the internal spacing between the bottom case wall 101 and the top case wall 102, and slightly less than the height of the standoff pegs 124 and 126, standoff wall 128, and pivot pin 402. The slightly smaller height of the tab 406 and the pivot arm 408 provide clearance for movement between the bottom case wall 101 and top case wall 102 of the case 100. Furthermore, the hole 410 of the pivot arm 408 preferably has an internal diameter of about 0.130 inches, which is slightly larger than the diameter of the pivot pin 402. This difference or clearance allows the hole 410 of the pivot arm 408 to pivot about the pivot pin 402 without binding or interference.

The tab 406 is preferably normally biased in the locking position. For example, a tab spring 412 is operatively connected between the case 100 and the tab 406 so that the tab spring 412 is relatively relaxed when the tab 406 is in the locking position and the tab spring 412 is relatively compressed when the tab 406 is in the release position. In other words, the tab spring 412 is adapted and positioned to help hold the tab 406 against a portion 22a of the circumferential edge 22 of the disc media 20 to prevent the disc media 20 from unintentionally falling out of the case 100. More particularly, as shown in FIG. 13, the tab spring 412 is preferably a length of resilient plastic operatively connected to the tab 406. More particularly still, the tab spring 412 is most preferably formed of the same plastic as the tab 406 and pivot arm 408, and, furthermore, the tab 406, the pivot arm 408, and the tab spring 412 are integrally formed into a single piece of injected molded plastic. The structure of the tab spring 412 is positioned next to the wall 103 (formed by left-side base wall 103a and left-side lid wall 103b (not shown in FIG. 13), and such that when the tab 406 is in the locking position shown in FIG. 13, the tab spring 412 is relatively relaxed. Thus, in the example shown in FIG. 13, the tab spring 412 is adapted and positioned such that to move the tab 406 about the pivot pin 402 requires compressing the tab spring 412 against an inner surface of the left-side wall 103 of the case 100.

An action against the tab 406 that forces the tab 406 out of the path 114 of a disc media 20 between the cavity 110 and the opening 112 also forces a compression of the tab spring 410, which stores potential or strain energy in the tab spring 412 that can be used to move the tab 406 back into the locking position.

Thus, according to an aspect of the invention, a disc media 20 is inserted edgewise through the opening 112 toward the cavity 110, for example by pushing against a forward oriented portion 22c of the circumferential edge 22 of the disc media 20. Gently pushing the diameter D of the disc media 20 toward the tab 406 in the locking position shown in FIG. 13, the left-side and right-side oriented portions 22a and 22b, respectively, of the circumferential edge 22 of the disc media 20 engage the tab 406 and the opposed inner surface of the right-side case wall 104. The rounded shape of the tab 406 acts like a cam to facilitate transferring some of the rearward pushing force on the disc media 20 laterally to act on the tab 406. Thus, the pushing force is transferred through left-side and right-side portions 22a and 22b, respectively, of the circumferential edge 22 to act between the right-side case wall 104 and the tab 406. When the pushing force is sufficient to overcome the tab spring 412, the tab spring 412 is compressed as the tab 406 is moved on the pivot arm 408 about the pivot pin 402 outwardly from the path 114 of the disc media 20 (which position not shown in FIG. 13). Once the diameter D of the disc media 20 is pushed inwardly past the deflected tab 406 and the opposed portion of right-side case wall 104, the stored energy in the compressed tab spring 412 is used to move the tab 406 on the pivot arm 408 about the pivot pin 402 inwardly and back into the locking position shown in FIG. 13.

As will be appreciated, according to another aspect of the invention illustrated in FIG. 13, when a disc media 20 is in the cavity 110, the tab spring 410 can be overcome by gently jerking the case 100 in a forward and then a backward direction, such that the disc media 20 tends to move forward toward the opening 112 relative to the backward motion of the case 100, which relative momentum causes the disc media 20 to move against the tab 406 and overcomes the biasing of the tab spring 412.

Actuator for Manually Overcoming Biasing of Tab

According to a still further, different aspect of the invention, a structure is provided that can be used to manually overcome the structure for selectively releasing the disc media. For example, an actuator 414 can be operatively connected to the tab 406 for manually overcoming the biasing of the tab 406 in the locking position, thereby selectively allowing the disc media 20 to easily move past the tab 406. According to the presently most-preferred embodiment of the invention, the actuator 414 is connected to the pivot arm 408. More particularly still, the tab 406, the pivot arm 408, the tab spring 412, and the actuator 414 are all integrally formed into a single piece of injected molded plastic. The actuator 414 is movable between a locking position and a release position, which correspond to the locking position and release position of the tab 406, respectively. The actuator 414 is manually accessible through the actuator access opening 404 in the top lid wall 102b of the lid 120b, which defines the top wall 102 of the case 100 (which opening 404 was previously described and shown, for example, in FIGS. 10–12). Most preferably, the opening 404 does not extend into either the left-side case wall 103 or right-side case wall 104, which leaves the left side 103' and the right side 104' of the case 100 fully available for use with any printed media or for other labeling purposes, such as a space for placing and adhering a pressure sensitive label.

Continuing to refer to FIG. 13, according to the presently most-preferred embodiment of the invention, the actuator 414 preferably includes a pad 416 that extends into the actuator access opening 404. The pad 416 can be moved between two positions in the actuator access opening 404. Thus, the pad 416 of the actuator 414 can be easily manipulated by a finger or thumb of a person's hand. Most preferably, the pad 416 of the actuator 414 has a plurality of roughening structures, such as grooves 418, formed in the upper exposed surface thereof, which assist in providing a rough surface for moving the pad with a finger or thumb. Some of the grooves 418 can define the shape of an arrow, as shown, which can further help indicate the direction for moving the pad 416 from the normal locking position to the release position. The exposed surface of the pad 416 of the actuator 414 preferably has, for example, a length of about 0.375 inches and a width of about 0.250 inches. According to the presently most-preferred embodiment of the invention, the actuator access opening 404 is larger than the area of the pad 416 of the actuator 414, which allows the pad 416 to be moved in the actuator access opening, preferably by sliding from one position to another. According to the presently most-preferred embodiment of the invention, the actuator access opening is about 0.050 inches wider than the width of the pad 416, which allows for movement of the pad 416 of the actuator 414 within the opening between the locking position and the release position.

According to an additional aspect of the invention, the pad 416 of the actuator 414 preferably does not extend through the actuator access opening 404 beyond an outermost profile of the case wall or case walls in which the actuator access opening 404 is located. For example, the pad 416 preferably has a height of about 0.050 inches above the pivot arm 408, which height is the thickness of the top lid wall 102b.

According to still another aspect of the invention, the actuator 414 preferably additionally includes a dust cover that protects against dust and debris from entering through the actuator access opening 404 regardless of the position of the actuator 414. For example, the dust cover can be provided by left-side and right-side dust cover portions 420a and 420b, respectively, on either side of the actuator 414. Thus, when the actuator 414 is in the locking position, the left-side dust cover portion 420a prevents dust from entering into the case through the open portion of the actuator access opening 404 that is to the left of the actuator 414, and when the actuator 414 is moved left to the release position, the right-side dust cover portion 420b prevents dust from entering into the case through the open portion of the actuator access opening 404 that is to the right of the actuator, i.e., where the actuator 414 normally resides when it is in the locking position. This aspect of the invention will become more clear by referring back to FIGS. 1 and 2 of the drawing, which shows the actuator 414 in the opening 404, the actuator 414 in the locking position where a portion of the actuator access opening 404 to the left of the actuator 414 is not closed by the actuator 414.

A Separate Ejector Spring

Referring now to FIGS. 14–15, another aspect of the invention is shown that is substantially the same as the embodiment shown in FIG. 13 but additionally includes an ejector spring 450 for assisting in the ejection of a disc media 20 from the cavity 110 upon release of the tab 406. According to this example embodiment of the invention, the ejector spring 450 is a separate, curved structure of resilient material, such as a plastic, that is positioned between the back-side case wall 105 (defined by the back-side base wall 105a of the base 120a and the back-side lid wall 105b of the lid 105b, where back-side lid wall 105b is not shown in FIGS. 14–15). The ejector spring 450 preferably includes a central portion 452 that is positioned, when in the relatively relaxed condition shown in FIG. 14, to extend into the cavity 110, substantially as shown. The ejector spring 450 also preferably includes curved end portions 454 and 456 that are preferably curved oppositely from the curved portion 452. The curved end portions 454 and 456 prevent the ejector spring 450 from falling out of the cavity by being able to catch on the standoff pegs 124 that are located near the back-side base wall 105a of the base 120a. FIGS. 14 and 15 further illustrate that cylindrically-shaped standoff pegs 124 can be used, for example, instead of the semi-cylindrical standoff pegs 126 shown in FIG. 13. The particular shape and location of the standoff pegs 124 and 126 is not necessarily critical to the practice of the invention.

The ejector spring 450 preferably has a thickness of about 0.050 inches. The ejector spring 450 has a height of about 0.085 inches, which is slightly less than the internal spacing between the bottom case wall 101 and the top case wall 102, and slightly less than the height of the standoff pegs 124. The slightly smaller height of the ejector spring 450 provides clearance for movement between the bottom case wall 101 and top case wall 102 of the case 100.

Referring now to FIG. 15, when a disc media 20 is pushed completely into the cavity 110, a rearward oriented portion 22d of the circumferential edge 22 of the disc media transfers some of the pushing action against the central portion 452 of the ejector spring 450, in turn pushing the central portion 452 backward against the back-side case wall 105 (defined by the back-side base wall 105a of the base 120a and the back-side lid wall 105b of the lid 105b, where back-side lid wall 105b is not shown in FIGS. 14–15). Referring briefly back to FIG. 10, it can be seen that, in the presently most-preferred embodiment, the back-side lid wall 105b does not extend all the way across the back side of the lid 120b, but rather includes a relief portion 451. Recalling that the thickness of the ejector spring 450 is preferably about the same as the thickness of the back-side lid wall 105b, this provides a space for the thickness of the ejector spring 450 next to but outside of the cavity 110. Thus, at least the middlemost portion of the central portion 452 of the ejector spring 450 to be distorted backward into a substantially linear condition and even to bend slightly backward all the way against the back-side base wall 105a, thereby extending at least partially into the relief portion 451 in the back-side lid wall 105b (shown in FIG. 10).

Forcing the ejector spring 450 from its relatively relaxed condition shown in FIG. 14 to the relatively strained condition shown in FIG. 15 stores potential or strain energy in the ejector spring 450 that can be used to help eject the disc media 20 from the cavity 110. The strain energy stored in the ejector spring 450 is insufficient, by itself, to act on the disc media 20 to overcome the tab spring 412 biasing the tab 406 in the locking position. Upon manually overcoming the tab spring 412, however, the strain energy stored in the ejector spring 450 is designed to be sufficient to kick or eject the disc media at least partially out of the cavity and at least partially through the opening 112, that is, back to the condition shown in FIG. 14.

A First Example of an Integrally-Formed Ejector Spring

Referring now to FIGS. 16–22, another aspect of the invention is shown that is substantially the same as the embodiment shown in FIG. 13 but additionally includes an ejector spring 450a that is integrally formed with the tab 406, pivot arm 408, tab spring 412, and actuator 414. This reduces the total number of parts required to make the case 100. Most preferably, this embodiment also is adapted to further increase the strain on the ejector spring 450a when the actuator 414 is manually moved toward the release position as described above, thereby further assisting in ejecting the disc media 20 from the cavity 110 of the case 100.

In this embodiment, the ejector spring 450a is a curved structure of resilient material, such as a plastic, that is positioned to generally curve from about the tab 406 along a left-side oriented portion of the periphery of the cavity 110 (about where a left-side oriented portion 22a of a circumferential edge 22 of a disc media 20 would be located if fully inserted into the cavity 110) and toward the back-side base wall 105a of the base 120a. The ejector spring 450a preferably includes a central portion 452a that is operatively connected to the tab 406, pivot arm 408, or actuator 414 at a connecting end 454a, and curves around to a terminal portion 456a. When in a relatively relaxed condition, the ejector spring 450a has a tighter or smaller radius of curvature than the radius of the disc media 20 and is positioned to curve around and extend into the cavity 110, as shown FIGS. 16 and 17. When the ejector spring 450a is in the relatively strained position, it is deflected outward to curve around the circumferential edge 22 of a disc media 20, as shown in FIG. 18.

The terminal end 456a can optionally include a terminal nub 458a that has a horizontally-oriented groove formed therein (which groove is better shown in FIGS. 3 and 4), which engages a portion 22a of the circumferential edge 22 of the disc media 20 and helps center the position of the disc media 20 in the cavity 110 away from the bottom case wall 101 and the top case wall 102. In the alternative, ramped surfaces can be formed in the inwardly-facing surfaces of the bottom case wall 101 and the top case wall 102 (not shown), similar to the ramped surfaces 142a and 142b.

The structure of the integrally-formed tab 406, pivot arm 408, actuator 414, and spring ejector 450a shown in more detail in FIGS. 19–22. The particular embodiment shown in FIGS. 19–22 also illustrate that the tab groove in the tab 406 and, further, that the entire terminal nub 458a are both optional structural features, in that they are not included in the illustrated minor variation of an integrally-formed structure shown in FIGS. 19–22 and are not required for the basic functions of either the tab 406 or the ejector spring 450a.

The ejector spring 450a preferably has a thickness in the range of about 0.0150 to about 0.050 inches. The ejector spring 450a has a height of about 0.085 inches, which is slightly less than the internal spacing between the bottom case wall 101 and the top case wall 102, and slightly less than the height of the standoff pegs 124 and 126. The slightly smaller height of the ejector spring 450a provides clearance for movement between the bottom case wall 101 and top case wall 102 of the case 100.

Figure 16:
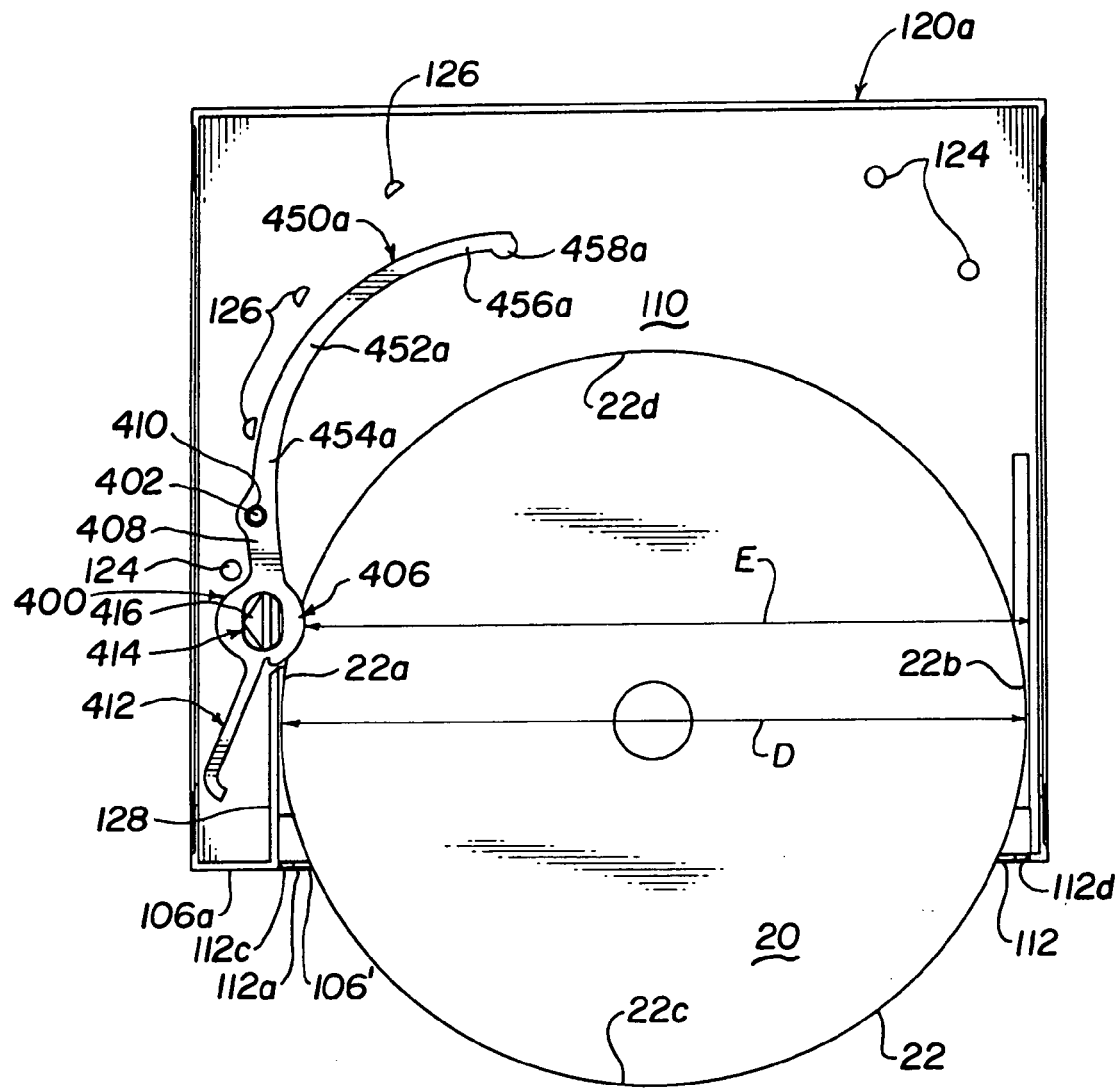
FIG. 16 is a top elevation view of a first example of a release with an ejector spring integrally formed thereon shown positioned on the base and illustrating the diameter of a CD being moved through the opening in the front side of the CD.

Referring now to FIG. 16, a disc media 20 is inserted through the opening 112 toward the cavity 110, for example by pushing against a forward oriented portion 22c of the circumferential edge 22 of the disc media 20. Gently pushing the diameter D of the disc media 20 toward the tab 406 in the locking position shown in FIG. 16, the left-side and right-side oriented portions 22a and 22b, respectively, of the circumferential edge 22 of the disc media engage the tab 406 and the opposed inner surface of the right-side case wall 104. The rounded shape of the tab spring 412 acts like a cam to facilitate transferring some of the rearward pushing force on the disc media 20 laterally to act on the tab 406. Thus, the pushing force is transferred through left-side and right-side portions 22a and 22b, respectively, of the circumferential edge 22 to act between the right-side case wall 104 and the tab 406.

Figure 17:
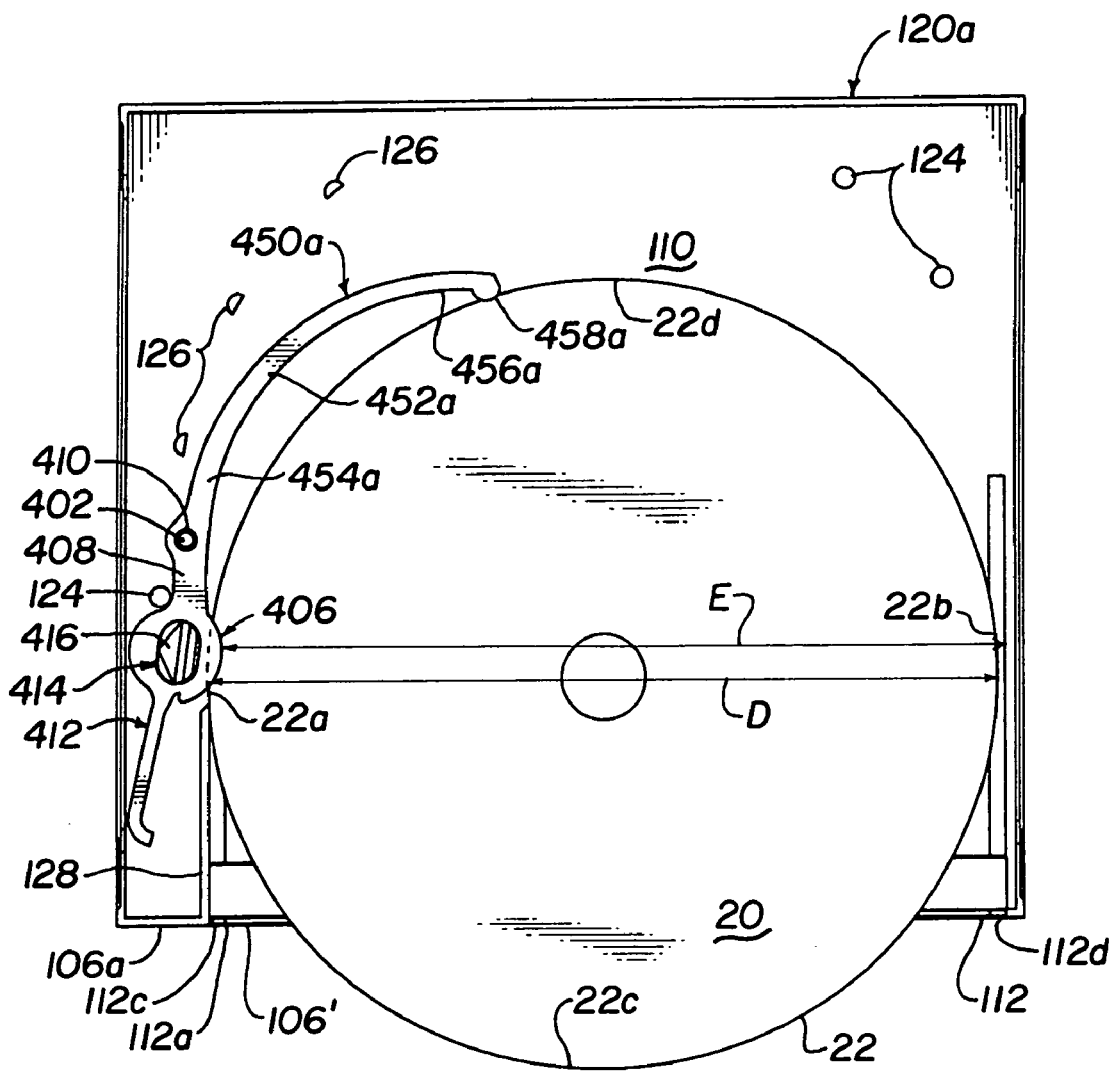
FIG. 17 is a top elevation view of the first example of a release with an ejector spring integrally formed thereon shown positioned on the base and illustrating the diameter of a CD passing the release, wherein the release is either pushed out of way by the CD being pushed into the cavity or pulled out of the way by an external manipulation of the release.
Figure 18:
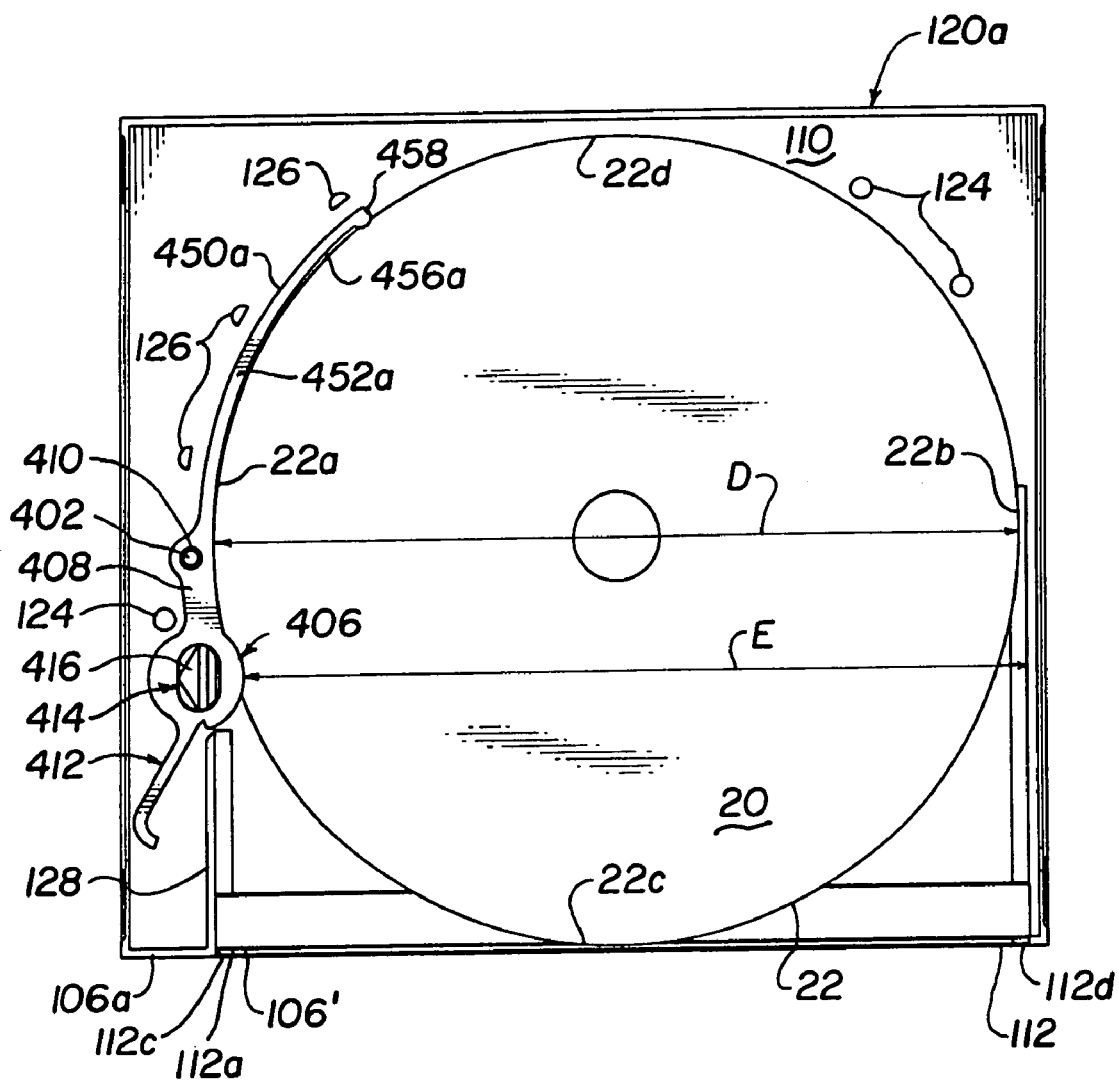
FIG. 18 is a top elevation view of the first example of a release with an ejector spring integrally formed thereon shown positioned on the base and illustrating a CD being completely inserted into the CD case and retained inside the cavity of the case by the release.
Figure 19:
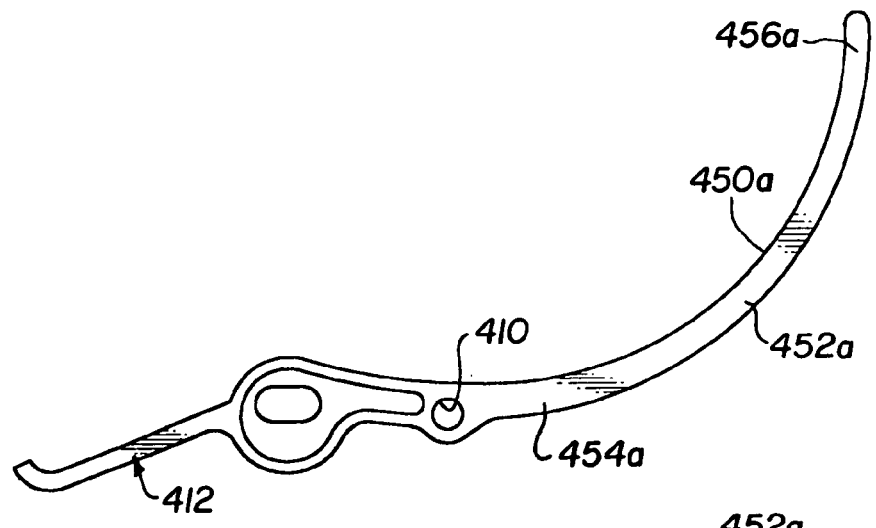
FIGS. 19–22 are a series of four projected elevation views of the first example of a release with an ejector spring integrally formed thereon but without having a groove formed in the ejector portion thereof, the four projected views being from the bottom, right side, top, and left side, respectively.
Figure 20:
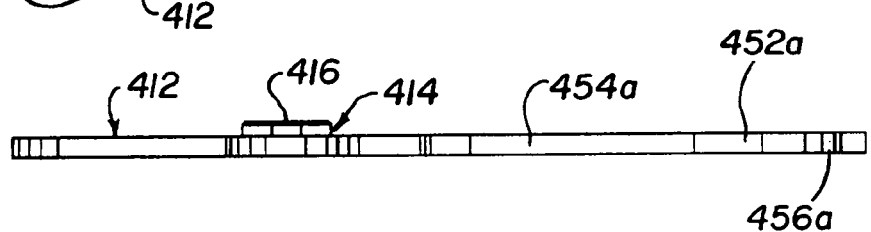
Figure 21:
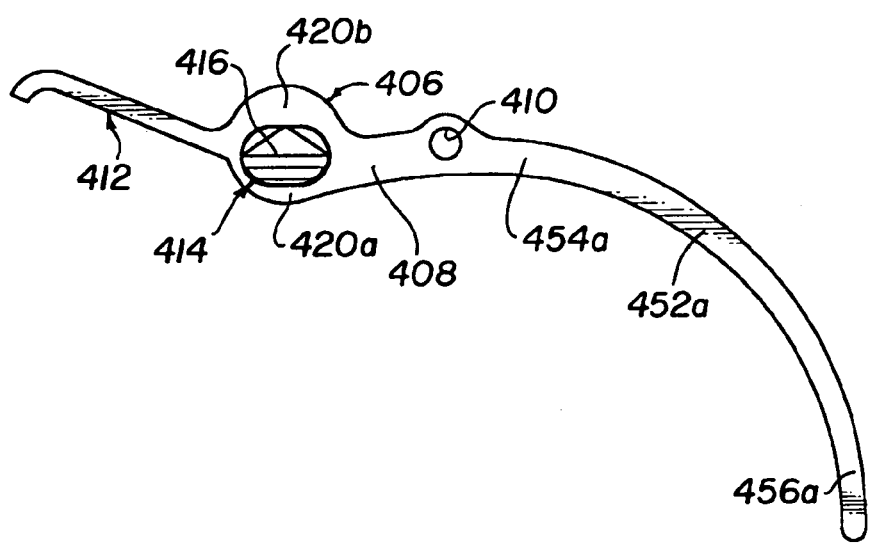
Figure 22:
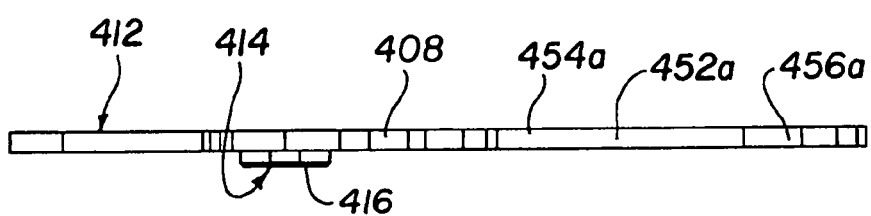

As shown in FIG. 17, when the pushing force is sufficient to overcome the tab spring 412, the tab spring 412 is compressed as the tab 406 is moved on the pivot arm 408 about the pivot pin 402 outwardly from the path 114 of the disc media 20, which creates an increased length E' between the tab 406 and the right-side case wall 104 that is at least the diameter D of the disc media 20. This allows the diameter D of the disc media to move across the increased length E' and pass the tab 406. In the presently most preferred embodiment adapted for a standard size CD or DVD, the tab 406 needs to be moved only a distance of about 0.050 inches. In other words, that is the small difference the locking position and the release position is only about 0.050 inches or the difference between the length E and the increased length E'.

Referring to FIG. 18, once the diameter D of the disc media 20 is pushed inwardly past the length E between the tab 406 and the right-side case wall 104, the stored energy in the compressed tab spring 412 is used to move the tab 406 on the pivot arm 408 about the pivot pin 402 inwardly and back into the locking position shown in FIG. 16 or 18. Furthermore, when the disc media 20 is pushed completely into the cavity 110, a rearward oriented portion 22d of the circumferential edge 22 of the disc media 20 transfers some of the pushing action against at least the terminal portion 456a of the ejector spring 450a, in turn deflecting the curvature of the central portion 452a of the ejector spring 450a leftward and backward. The position of the connected end 454a is substantially fixed on the tab 406 or tab spring 412, therefore, the pushing of the disc media into the cavity 110 engages the ejector spring 450a and distorts the radius of curvature of the ejector spring 450a to be at least as large as the radius of the disc media 20. Forcing the ejector spring 450a from its relatively relaxed condition shown in FIGS. 16 and 17 to the relatively strained condition shown in FIG. 18 stores potential or strain energy in the ejector spring 450a that can be used to help eject the disc media 20 from the cavity 110. The strain energy stored in the ejector spring 450a is insufficient, by itself, to act on the disc media 20 to overcome the tab spring 412 biasing the tab 406 in the locking position. Upon manually overcoming the tab spring 412, however, the strain energy stored in the ejector spring 450a is designed to be sufficient to kick or eject the disc media at least partially out of the cavity 110 and at least partially through the opening 112, that is, back to the condition shown in FIG. 16. Furthermore, this embodiment is also most preferably adapted to further increase the strain on the ejector spring 450a when the actuator 414 is manually moved toward the release position as described above, thereby further assisting in ejecting the disc media 20 from the cavity 110 of the case 100.

This aspect of the invention recognizes that the structure of an ejector spring is not required to be positioned directly between a portion of the circumferential edge 22 of the disc media 20 and any particular one of the side case walls 103–106 of the case 100. In other words, the ejecting force can be applied against a rearward portion of the circumferential edge 22 of the disc 20 that is behind the line E if a sufficient component of the ejecting force is applied in the forward direction. More preferably, the ejecting force is applied against the rearward quadrant of the circumferential edge 22 so that at least half the ejecting force is applied as a forward direction component.

Considering the dimensions of a standard CD case, this aspect of the invention recognizes that the structure for applying an ejecting force to the disc media can be located along one of the shorter side case walls of a standard size CD case and the opening for ejecting the CD can be advantageously located in one of the longer side case walls. Thus, the shorter side case walls can still be available for use for labeling material, especially a conventionally sized and oriented spine graphics label. According to this particular aspect of the invention, the left side and the right side of the case can be shorter than the back side and front side of the case and the opening is defined in the front side of the case.

As will hereinafter be described in detail with reference to FIGS. 25–27, a tray 200 (not shown in FIGS. 16–18) is provided that can optionally be used with such an improved case, wherein the tray 200 includes left-side and right-side tray walls being sufficiently spaced apart such that the left-side and right-side case walls 103 and 104 of the case 100 can be positioned between the left-side and right-side tray walls and with at least sufficient clearance such that sheet label material can be positioned between the left-side tray wall and the left-side case wall and between the right-side tray wall and the right-side case wall.

A Second Example of an Integrally-Formed Ejector Spring

Referring now to FIGS. 23–24, another aspect of the invention is shown that is substantially the same as the embodiment shown in FIGS. 16–22, but omits the tab spring 412. This embodiment recognizes that the integrally-formed ejector spring 450a can also provide the function of biasing the tab 406 in the locking position, at least when a disc media 20 is fully inserted into the cavity 110 of the case 10, thereby eliminating the tab spring 412 as a portion of the disc controlling structure 400 (which tab spring 412 was previously described and shown in detail with reference to the embodiments shown in FIGS. 14–15 and FIGS. 16–22). As shown in FIG. 23, in this embodiment of the invention, the tab 406 is free to be in the release position, even during the edgewise insertion of a disc media 20 into the cavity 110.

In this embodiment, the ejector spring 450a is operatively connected to the tab 406 such that when a disc media 20 is fully inserted into the cavity 110 of the case 10 the ejector spring 450a is distorted and strained, thereby biasing the tab 406 in the locking position against the disc media 20. In other words, the ejector spring 450a is adapted and positioned to help hold the tab 406 against a portion 22a of the circumferential edge 22 of the disc media 20 to prevent the disc media 20 from unintentionally falling out of the case 100. The structure of the ejector spring 450a is such that when no disc media 20 is in the cavity 110 the ejector spring 450*a* is relatively relaxed and the tab 406 is relatively free to move between the release and locking positions.

According to another variation of the invention illustrated in this embodiment, with the elimination of the tab spring 412, the standoff wall 128 has been extended with standoff wall portion 128*a* to provide further standoff function between the bottom case wall 101 and top case wall 102 from being squeezed together. Furthermore, the standoff pegs 124 and 126 previously described with reference to the embodiments illustrated in FIG. 13, FIGS. 14–15, and FIGS. 16–22 have been replaced with standoff walls 128*b–d*. Of course, the standoff walls 128*a–d* all have the same height as the standoff pegs 124 and 126. This further illustrates that various structures can be used to help prevent the bottom case wall 101 and top case wall 102 from being squeezed together.

In addition, according to still another variation of the invention shown in this embodiment, the base 120*a* most preferably includes a lower arcuate rib 146*a*. Preferably, the arc of this lower arcuate rib 146*a* corresponds to the arc defined by the circumferential edge 22 of the disc media 20. The height of the lower arcuate rib 146*a* is preferably about 0.010 inches. In the example of this preferred embodiment, the lower arcuate rib 146*a* is adapted to engage a portion of the circumferential edge 22 of a standard disc media 20. As will be easily appreciated, a corresponding upper arcuate rib (not shown in the figures of the drawing) is preferably formed on the lid 120*b*. Thus, the lower arcuate rib 146*a* on the inner surface of the bottom case wall 101 defining the cavity 110 can assist in positioning a disc media 20 such that a lower or downwardly-oriented surface of the disc media 20 positioned in the cavity 110 is retained spaced apart from the inner surface of the bottom case wall 101. Similarly, a corresponding upper arcuate rib on the inner surface of the top case wall 102 defining the cavity 110 can assist in positioning a disc media 20 such that an upper or upwardly-oriented surface of the disc media 20 positioned in the cavity 110 is retained spaced apart from the inner surface of the top case wall 102. Another function and benefit of the lower and upper arcuate ribs is to strengthen the bottom base wall 110*a* and the top lid wall 102*b*.

Furthermore, continuing to refer to FIGS. 23–24, and as will hereinafter be described in more detail, the tray 200 is shown positioned on the base 120*a*.

Thus, as can be appreciated from the example shown in FIGS. 23–24, a disc media 20 is inserted edgewise through the opening 112 toward the cavity 110, for example by pushing against a forward-oriented portion 22*c* of the circumferential edge 22 of the disc media 20. At this point, the ejector spring 450*a* is relatively relaxed, and the tab 406 is not biased toward a locking position. Gently pushing the diameter D of the disc media 20 toward the tab 406, the left-side and right-side oriented portions 22*a* and 22*b*, respectively, of the circumferential edge 22 of the disc media 20 engage the tab 406 and the opposed inner surface of the right-side case wall 104. Thus, the pushing force is transferred through left-side and right-side portions 22*a* and 22*b*, respectively, of the circumferential edge 22 to act between the right-side case wall 104 and the tab 406. The pushing deflects the tab 406 on the pivot arm 408 about the pivot pin 402 outwardly from the path 114 of the disc media 20. As the diameter D of the disc media 20 is pushed inwardly past the deflected tab 406 and the opposed portion of right-side case wall 104, the rearward portion 22*d* of the circumferential edge 22 engages and pushes rearwardly against the ejector spring 450*a*. This causes the ejector spring 450*a* and the tab 406 to be pivoted about the pivot pin 402 until the tab 406 is in the locking position. Furthermore, as the ejector spring 450*a* is distorted from its normally relaxed condition, the ejector spring 450*a* biases the tab 406 toward the locking position.

As previously described, a structure such as actuator 414 is provided that can be used to manually overcome the biasing of the ejector spring 450*a* and move the tab 406 to the release position for selectively releasing the disc media. The stored potential energy in the distorted ejector spring 450*a* can be used to assist in ejecting the disc media 20 from the cavity 110, as previously described in detail.

The Tray

Figure 25:
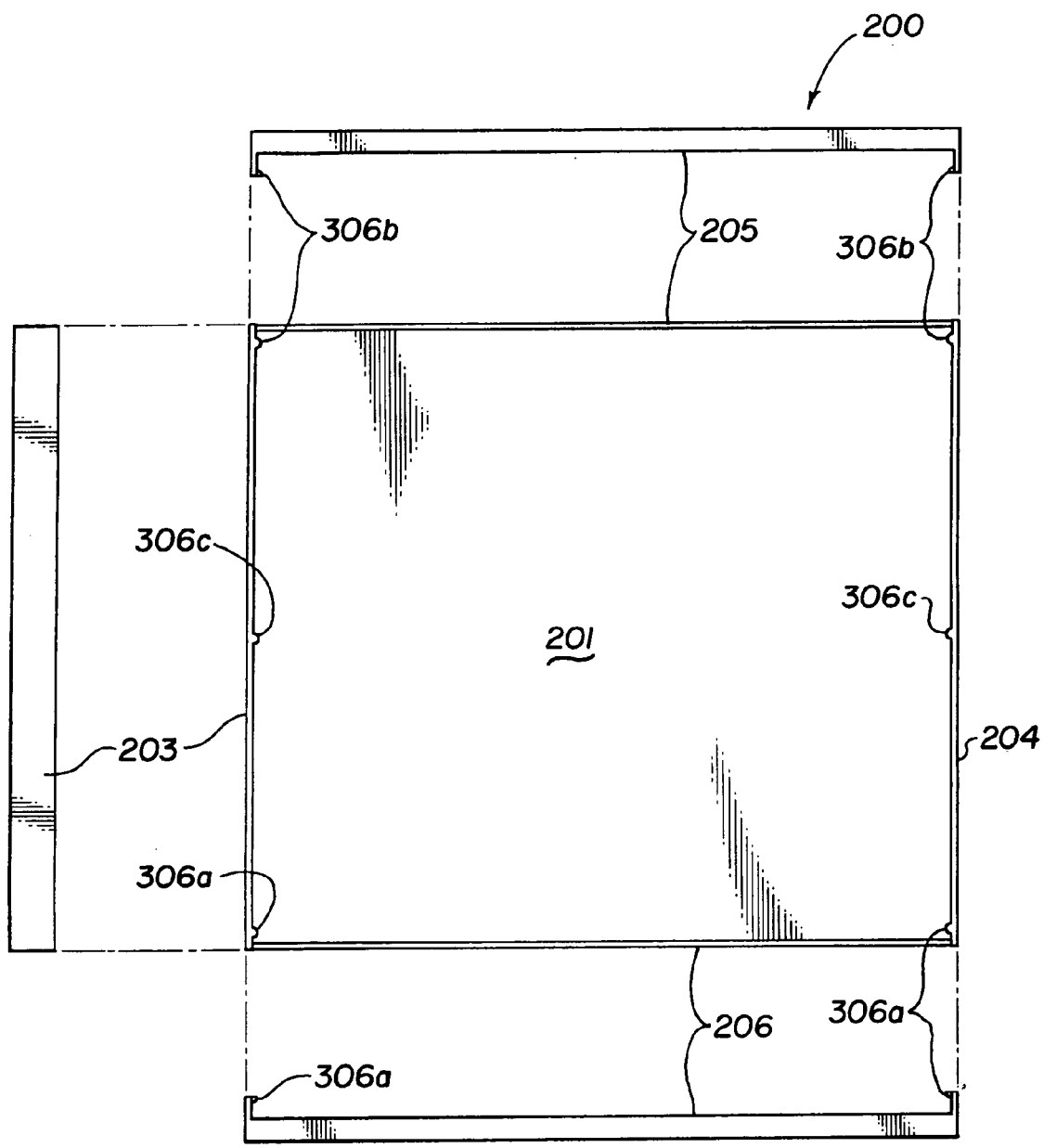
FIG. 25 is a top elevation view of the tray together with front, left side, and back elevation views projected from the top elevation view.
Figure 26:
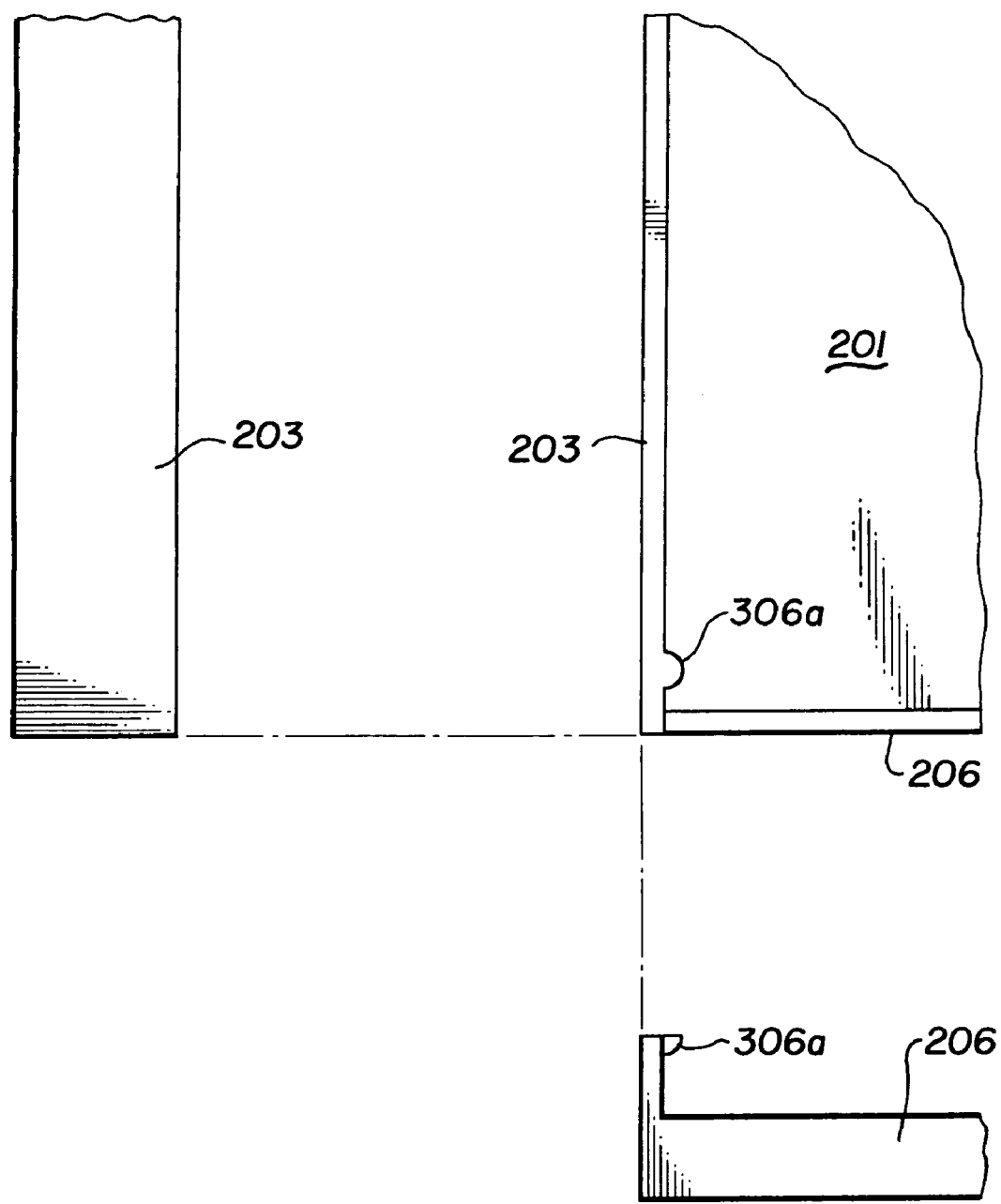
FIG. 26 is a detail top elevation view of the top, front, and left-side corner of the tray together with side elevation views projected from the top elevation view.
Figure 27:
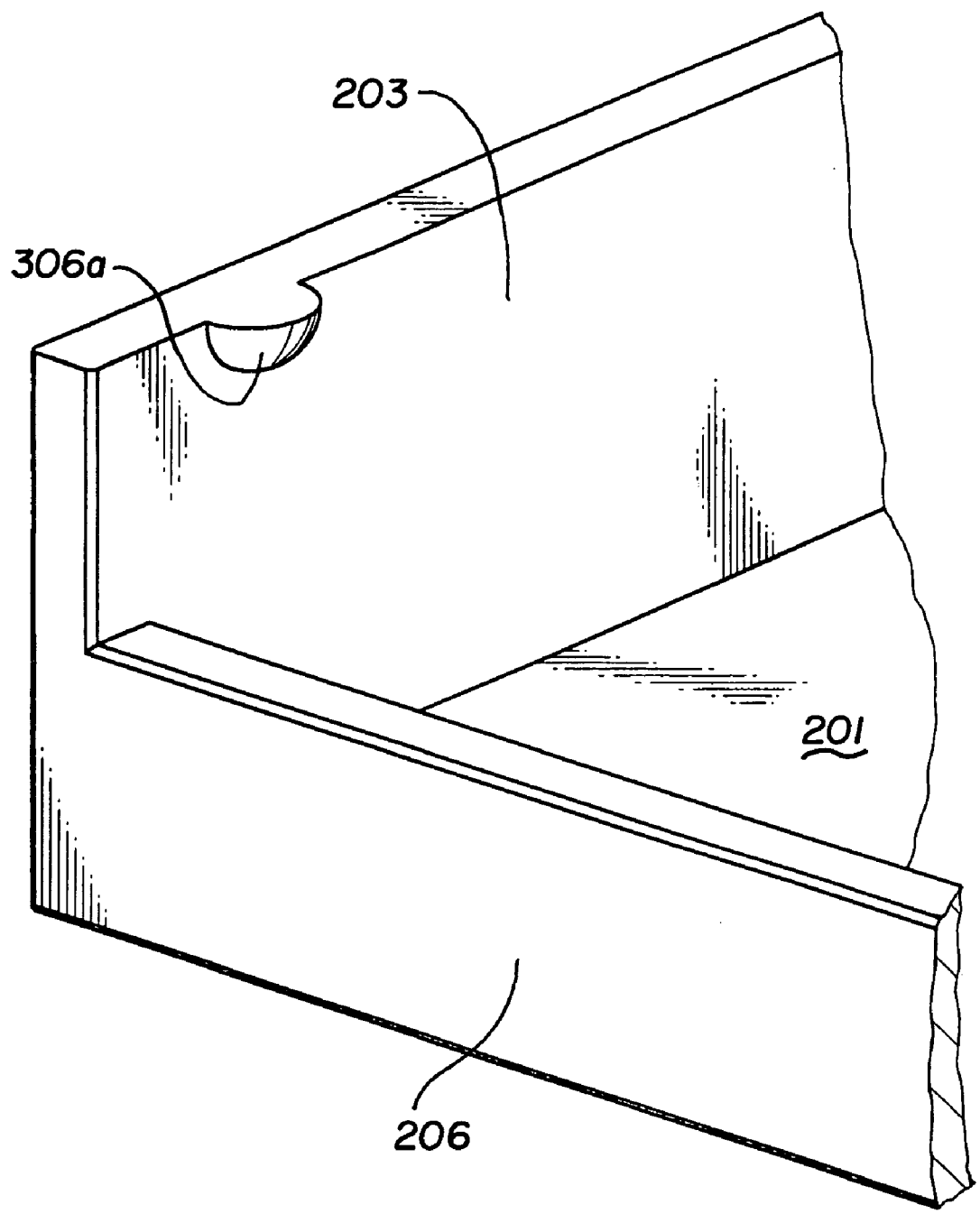
FIG. 27 is a detail isometric view from the top, front, and left side of the top, front, and left-side corner of the tray.

Referring to FIGS. 25–27, the presently most-preferred embodiment of a tray 200 is illustrated. Referring first to FIG. 25, the tray 200 preferably includes a central tray wall 201, a left-side tray wall 203, a right-side tray wall 204, a back-side tray wall 205, and a front-side tray wall 206. (It is to be understood, however, that the back-side tray wall 205 and the front-side tray wall 206, while preferably included, are not necessary to the practice of the invention.) The side tray walls 203–206 are preferably formed along the outermost edges of the central tray wall 201.

The left-side and right-side tray walls 203 and 204 are sufficiently spaced apart such that the left-side and right-side case walls 103 and 104 of the case 100 can be positioned between the left-side and right-side tray walls 203 and 204 and with at least sufficient clearance such that sheet label material can be positioned between the left-side tray wall 203 and the left-side case wall 103 and between the right-side tray 204 wall and the right-side case wall 104. At least a portion of each of the left-side and right-side tray walls 203 and 204 is at least sufficiently transparent to see sheet label material therethrough.

As hereinafter described in detail with respect to FIGS. 29–33, the sheet label material can be a standard sized graphics label 30. It is to be understood, however, that the sheet label material is not required to be a standard graphics label 30, or even a single piece of sheet material. For example, the sheet label material could be only the size of the right side 103' or left side 104' of the case 10, and optionally used on only one of the right side 103' or left side 104' of the case 10. Alternatively, two pieces of such sheet material can be used for each of the right side 103' and left side 104' of the case 10.

More preferably, at least a portion of the central tray wall also is at least sufficiently transparent to see printed media therethrough. Most preferably, the entirety of at least the central, left-side, and right-side tray walls 201, 203, and 204 of the tray 200 is transparent, which facilitates viewing of any printed material placed between the case 100 and the tray 200.

According to a further aspect of the invention, when the tray 200 is positioned on the case 100, the tray 200 does not prevent inserting the disc media 20 into the cavity 110 through the opening 112 in the front side 106' of the case 100.

According to a still further, more particular aspect of the invention, when the tray 200 is retained on the case 100, the central tray wall 201 is spaced apart from the bottom case wall and a printed media, such as a graphics label or booklet, can be retained between the bottom case wall 101 and central tray wall 201 by the left-side, right-side, front-side, and back-side tray walls 203–206. More particularly still, the front-side tray wall 206 does not prevent inserting the disc media 20 into the cavity 110 through the opening 112 in the front side 106' of the case 100. For example, the combined height of the back-side tray wall 205 with the back-side case wall 105 is preferably about the same as the height of the left-side and right-side tray walls 203 and 204. Furthermore, the left-side and right-side tray walls 203 and 204 are the same length as the left-side and right-side case walls 103 and 104 and are at least the same height as the left-side and right-side case walls 103 and 104.

According to the presently most-preferred embodiment of the invention, the central tray wall 201 and each of the side tray walls 203–206 is preferably about 0.050 inches thick. The central tray wall 201 preferably has a rectangular shape with an overall length of about 5.600 inches and an overall width of about 4.900 inches. Note that this length is fully the overall length of the standard CD case. Each of the left-side and right-side tray walls 203 and 204, respectively, preferably stands an overall height of about 0.290 inches above the inner or upper surface of the central tray wall 201. Each of the back-side and front-side tray walls 205 and 206, respectively, has an overall height of about 0.145 inches above the inner or upper surface of the central tray wall 201.

As previously mentioned, the base 102a and the tray 200 preferably include a tray-retaining structure 300 that helps assemble and hold the base 120a and the tray 200 together. Referring briefly back to FIG. 6, and also referring to the more detailed views of a representative corner portion of the base 120a shown in FIGS. 7–9, the left-side and right-side base walls 103a and 104a of the base 120a each preferably includes an elongated groove 302 defined therein. The groove 302 preferably has a quarter-round radius of about 0.040 inches, and at each of the forward and rearward ends 304a and 304b, respectively, of the groove 302 preferably terminates with a quarter-spherical radius of about 0.040 inches.

Referring again to FIGS. 25–27, the left-side and right-side tray walls 203 and 204 of the tray 200 preferably each include at least one projecting structure that can be inserted into the groove 302. According to the presently most-preferred embodiment of the invention, at least three quarter balls 306a–c are positioned along the inwardly facing surface of each of the left-side and right-side tray walls 203 and 204. The quarter balls 306a–c are preferably equally spaced apart along the length of side tray walls 203 and 204, and such that the quarter balls 306a and 306c are spaced apart the length of the groove 302 formed in each of the side case walls 103 and 104. As those skilled in the injection-molding art will appreciate, the size and shape of the quarter balls 306a–c allows the removal of the tray 200 from a mold without requiring any special sideways pull, which facilitates manufacture of the part by injection molding.

Figure 28:
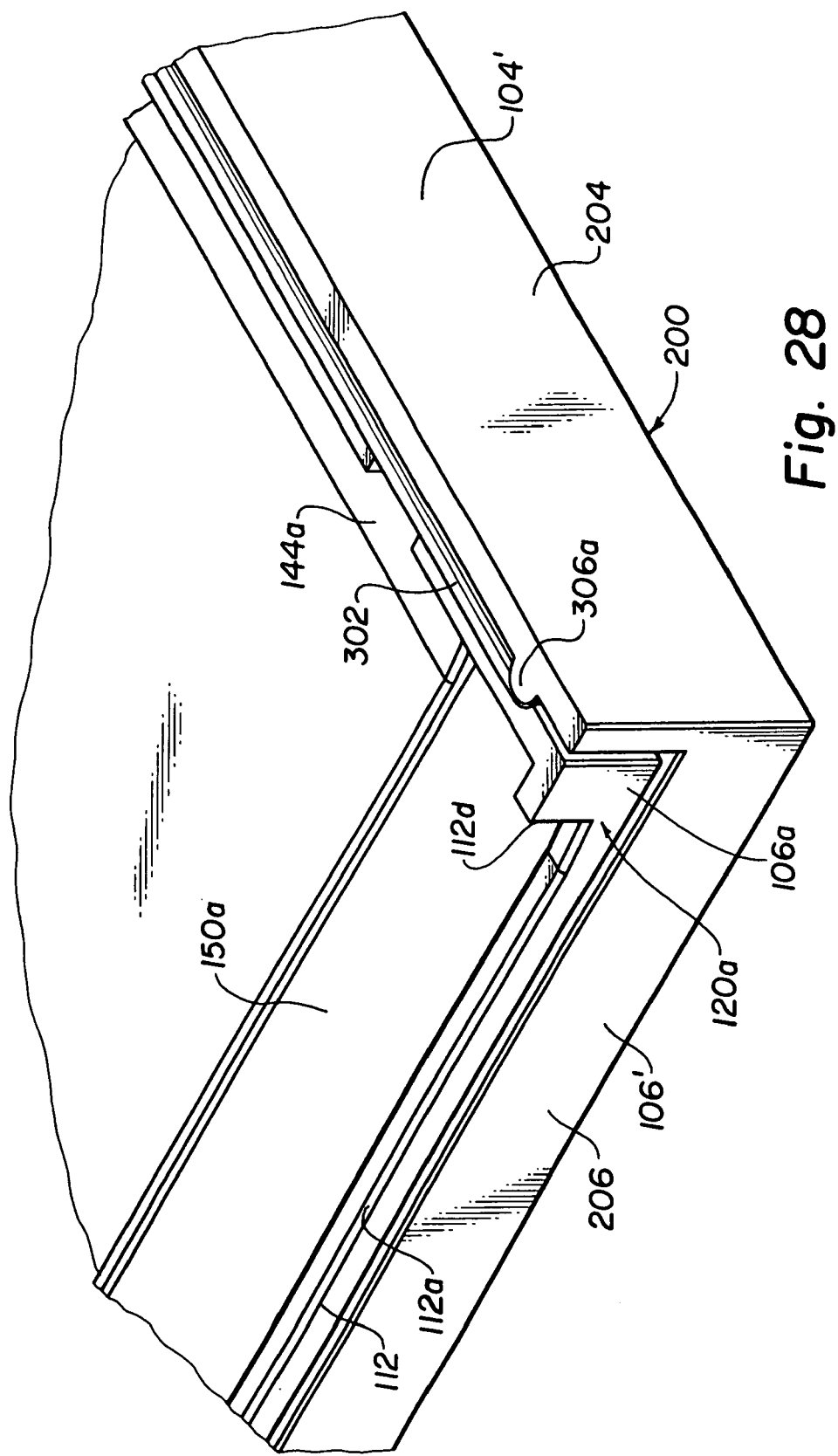
FIG. 28 is a detail isometric view from the top, front, and right side of the top, front, and right-side corner of the assembled base and the tray showing how the tray is positioned and retained on the base.
Figure 29:
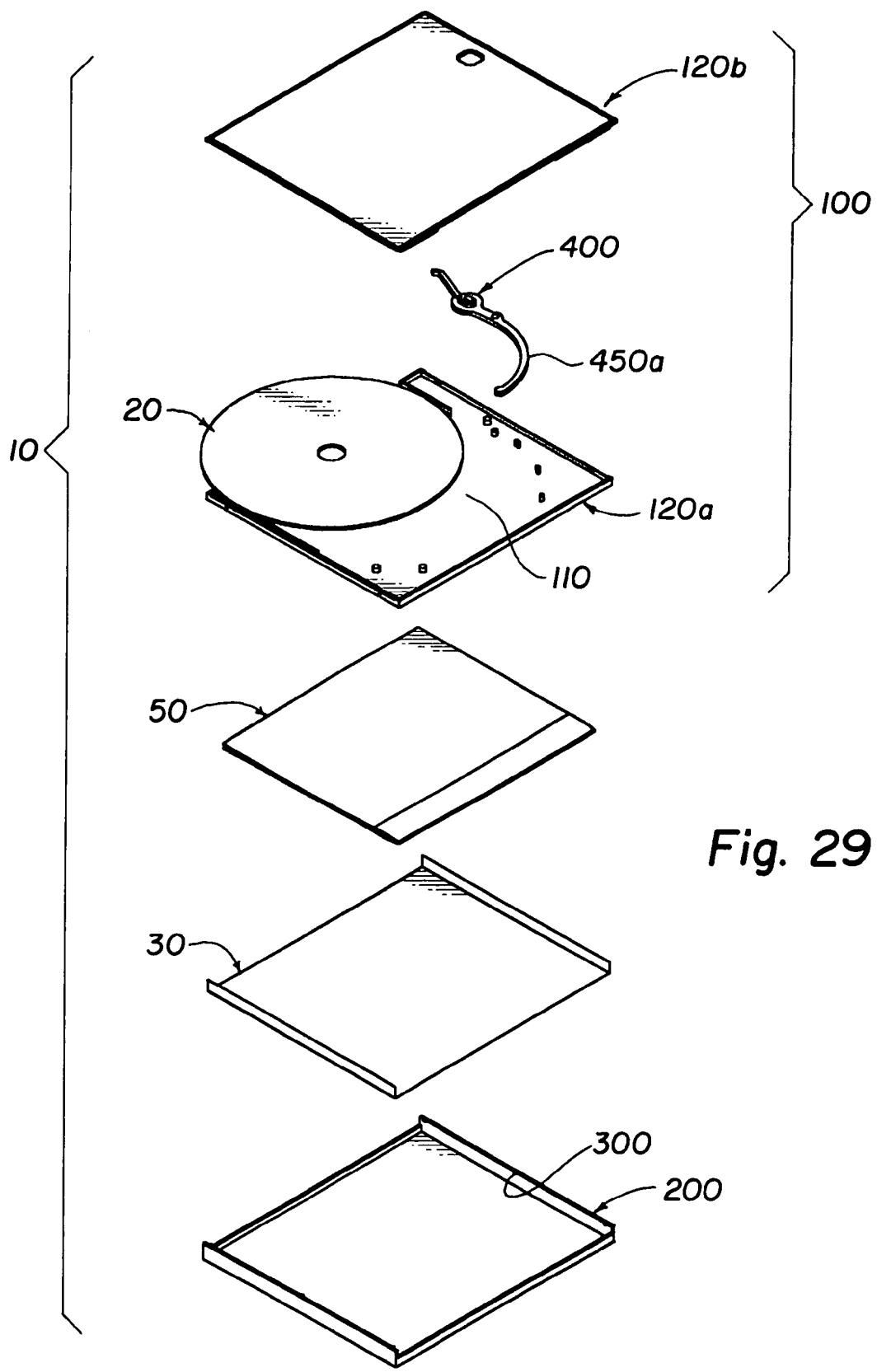
FIG. 29 is an exploded isometric view from the top, back, and right side of the storage device together with a CD, a booklet, and a spine graphics label.
Figure 30:
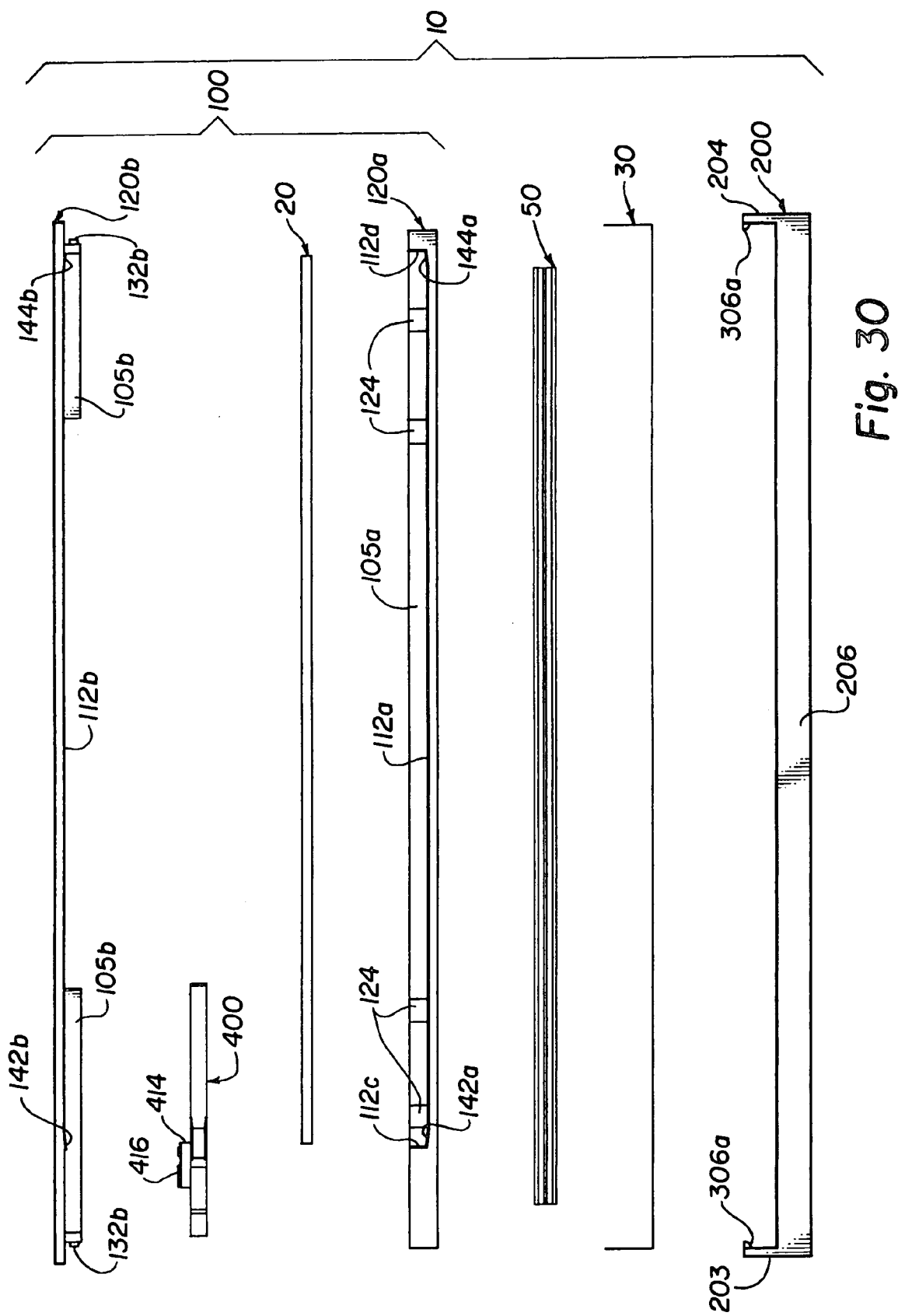
FIG. 30 is an exploded elevation view from the front side of the storage device together with a CD, a booklet, and a spine graphics label.
Figure 31:
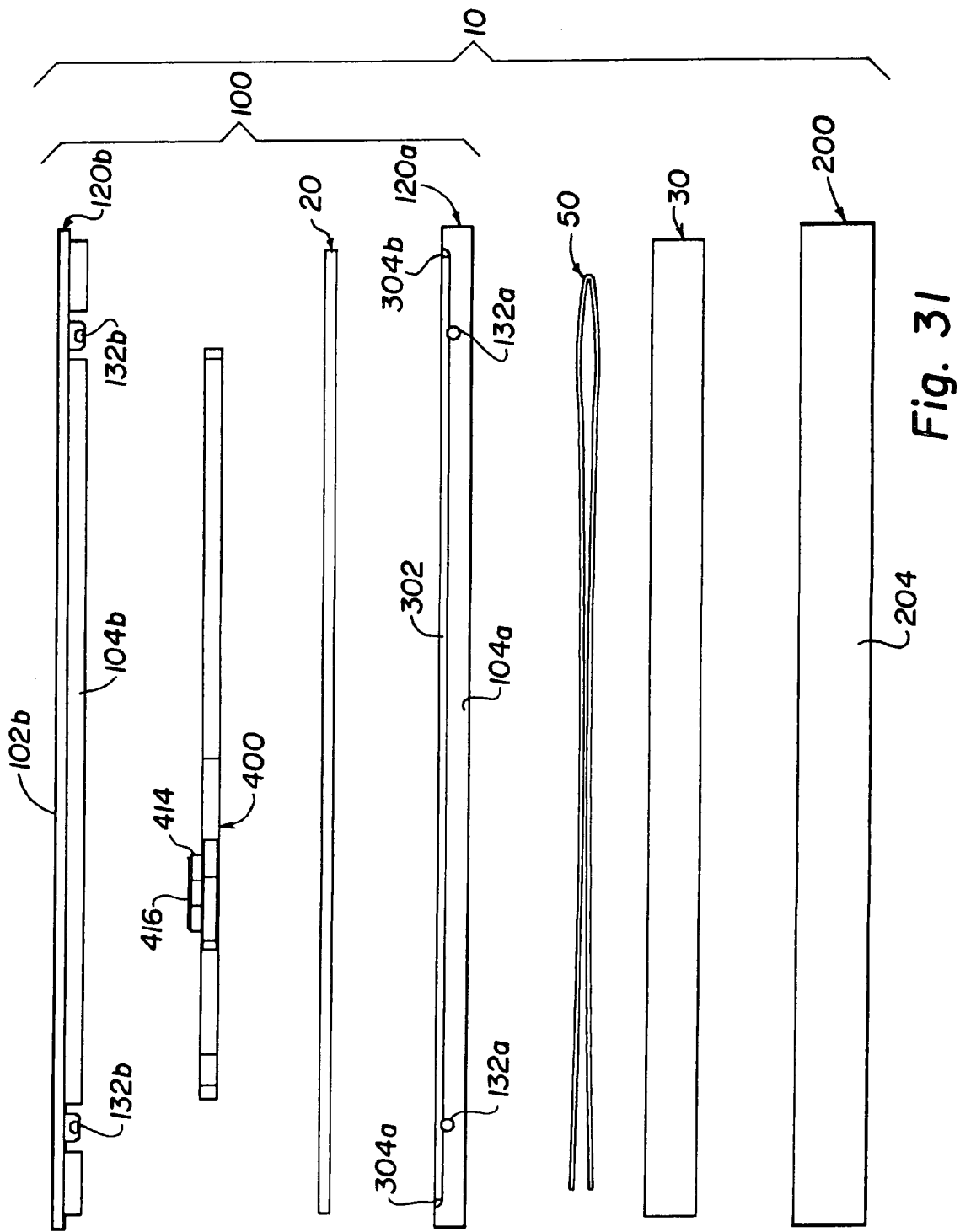
FIG. 31 is an exploded elevation view from the right side of the storage device together with a CD, a booklet, and a spine graphics label.
Figure 32:
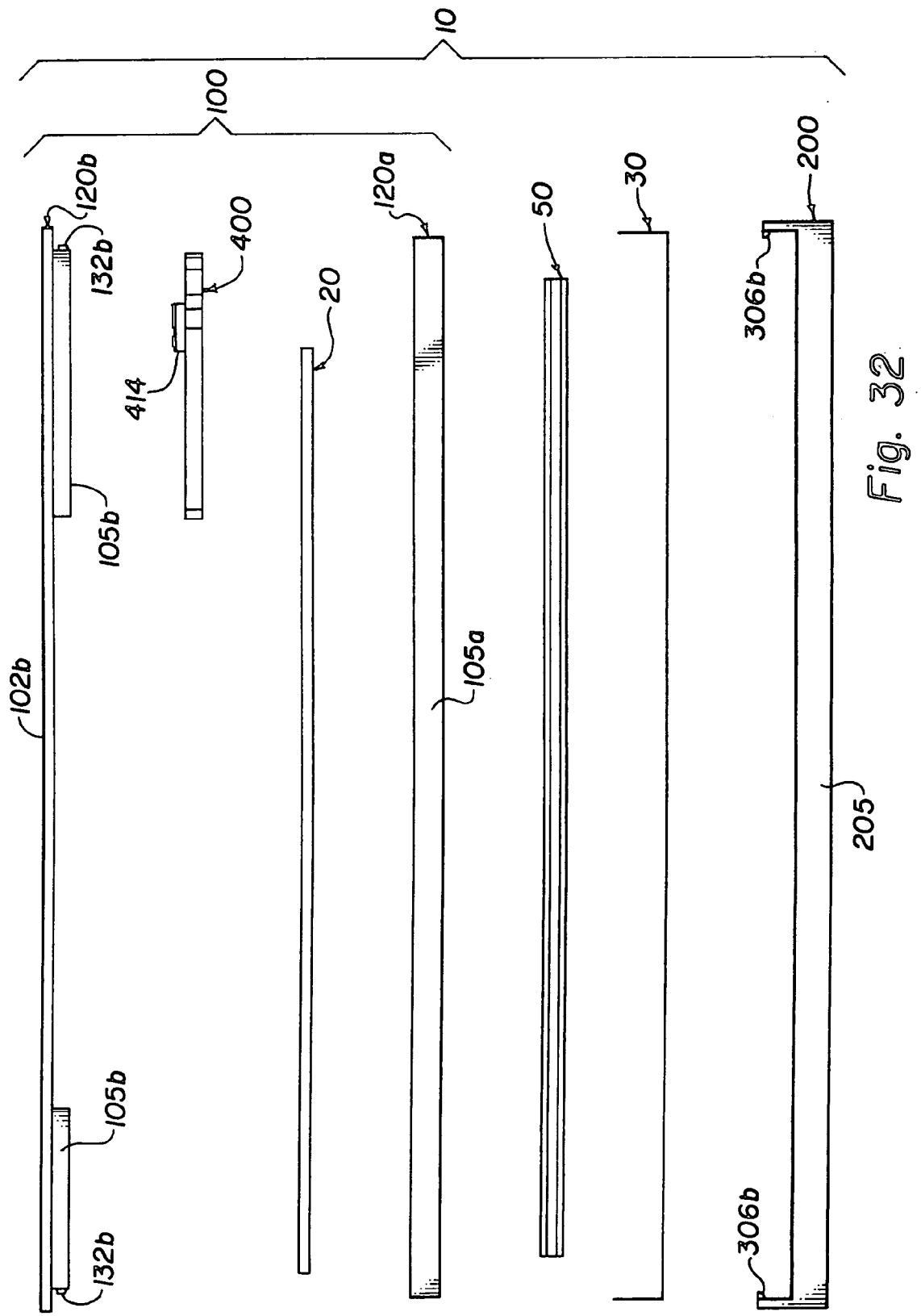
FIG. 32 is an exploded elevation view from the back side of the storage device together with a CD, a booklet, and a spine graphics label.

Referring now to FIG. 28, the interaction of the groove 302 on the base 120a and a quarter ball 306a of the tray 200 is shown in detail. Thus, it can be appreciated from the various figures of the drawing that when the tray 200 is positioned fully on the base 120a of the case 100, any portion of the groove 302 limits the quarter balls 306a–c from moving upward or downward relative to the groove 302, the forward end 304a of the groove 302 limits the forward quarter ball 306a from moving forward, and the end 304b of the groove 302 limits the rearward quarter ball 306b from moving backward. Thus, when the tray 200 is assembled onto the base 120a of the case 100, all the quarter balls 306a–306c assist in retaining the tray 200 on the case in a vertical direction, while the forward and rearward quarter balls 306a and 306b, respectively, assist in retaining the tray 200 on the base of the case 100 in a forward and backward direction, respectively.

The cooperating groove 302 and quarter balls 306a–c on each side provide a sufficient structural interaction to retain the tray 200 on the case 100 during normal handling of the storage device 10. However, this interaction can be overcome by manually prying the case 100 and tray 200 apart from one another.

Furthermore, the interaction between the forward end 304a of the groove 302 and the forward quarter ball 306a can also be easily overcome by sliding the case 100 backward and/or the tray 200 forward relative to one another. This can leave the remaining quarter balls 306b and 306c still positioned in the groove 302, which is still sufficient to retain the case 100 and the tray 200 together but moved apart as shown back in FIG. 1. In this position, an opening is created between the case 100 and the tray 200 such that printed material, such as a graphics label and/or booklet can be inserted therebetween.

Thus, the storage device 10 including the case 100 with the tray 200 has an overall length of 5.600 inches and an overall width of 4.900 inches (the dimensions of the lid 120b and the dimensions of the tray 200). Furthermore, the assembled storage device 10 has an overall height of about 0.410 inches, that if, the sum of: (a) the height (or thickness) of the scuff rails 280 on the lower surface of the central tray wall 201, (b) the height (or thickness) of the central tray wall 201, (c) the height of the left-side and right-side tray walls 203 and 204, respectively, above the inner or upper surface of the central tray wall 201, (d) the height (or thickness) of the top lid wall 102b of the lid 120b, and (e) the height of the scuff rails 180 on the upper surface of the top lid wall 102b. Although not critical to the practice of various aspects of the invention, it is particularly advantageous to provide a storage device 10 that is about the same length and width and height of a standard CD case. Thus, the storage device 10 including both the case 100 with the tray 200 can fit in the space of a conventional shelving unit that is designed to standard CD cases.

Assembly and Method of Using Storage Device

Referring now to FIGS. 29–32, the assembly and use of a storage device 10 according to the invention is illustrated. The exploded views show the base 120a and the lid 120b of the case 100 with a release structure 400 shown positioned therein. A disc media 20, such as a CD or DVD, is also shown positioned in a cavity space defined between the base 120a and the lid 120b of the case 100. Furthermore, a tray 200 is shown positioned such that a standard sized graphics label 30 and booklet 50 can be positioned between the case 100 and the tray 200. The tray 200 does not interfere with the opening 112 in the front side 106' of the storage device 10. Furthermore, the ends of the graphics label 30 are positioned so that they can be visually observed through the transparent left-side and right-side tray walls 203 and 204, respectively, of the tray 200.

Referring to FIG. 33, the detail and cut-away view of the assembled storage device 10 according to the invention is illustrated, which shows an end of the graphics label 30 positioned in the clearance space between the right-side case wall 104 and the right-side tray wall 204. As illustrated in this figure, words or other graphics, such as "XYZ BAND", can be read through the transparent right-side tray wall 204. The detail also shows the central portion of the graphics label and a booklet 50 positioned in the space defined between the bottom case wall 101 and the central tray wall 201.

Alternative Embodiment of Flat-Sided Case and Tray

Referring to FIGS. 34–36, another embodiment of the storage device, generally referred to by the reference number 10a, is illustrated wherein the modified case 10a presents substantially flat sides, such as top side 102', right-side 104', and front side 106' illustrated in FIG. 34. The modified case 100a is otherwise the same as the case 100 previously described herein, and like structures are indicated by like numbers.

Referring now to FIG. 35, a modified tray 200a is shown attached to the base 120a of a modified case 100a. One difference between the modified tray 200a and the previously described tray 200 is that the modified tray 200a has higher left-side and right-side tray walls. As shown in FIG. 35, another difference is that the quarter balls, such as illustrated quarter ball 306a, are positioned below the top edge of the right-side tray wall 204a. Thus, the left-side and right-side tray walls complete overlap the height of the left-side and right-side case walls. Referring now to FIG. 36, the assembled storage device 10 with a modified case 100a and including the optional, modified tray 200a also presents flat sides, as shown in this figure for the sides 102', 103', and 106'.

Dual Disc-Media Embodiment of Storage Device

Figure 37:
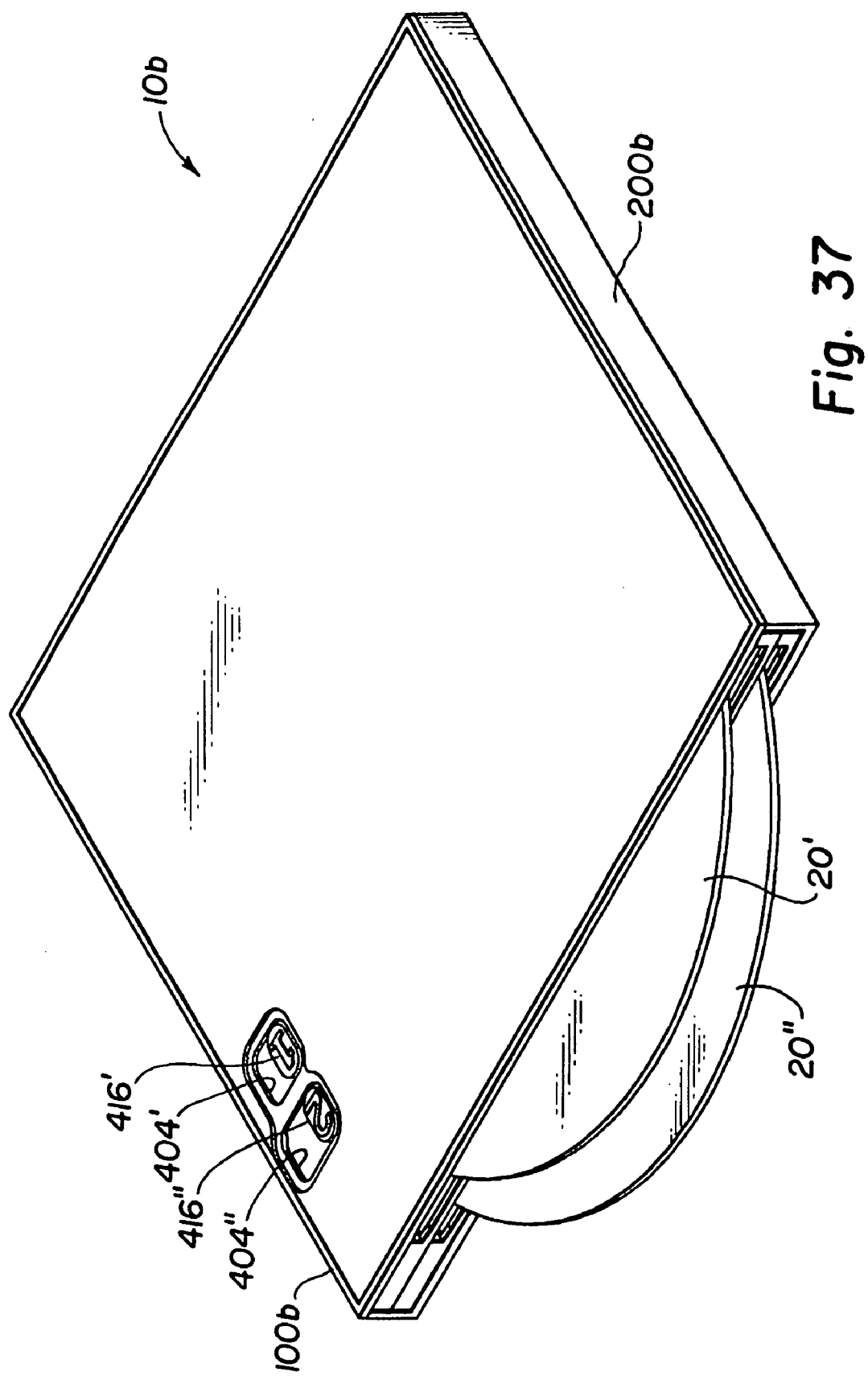
FIG. 37 is an isometric view from a top, front, and right-side perspective of a presently most-preferred embodiment of a dual disc-media storage device according to the invention that includes the capacity for two disc media and includes a tray for printed media, where the tray is shown fully positioned on the case.

Referring now to FIGS. 37–40, and first particularly to FIG. 37, another embodiment of a storage device 10b is illustrated wherein a modified case 100b is adapted for storing two disc media in separate storage cavities. The two disc media are arbitrarily referred to as a first disc media 20' and a second disc media 20". The storage device 10b also has a modified tray 200b, which is adapted to accommodate the modified dimensions of the case 10b. As will be readily appreciated, the design and structure of the storage device 10b are substantially the same as the design and structure of the above-described embodiment of the storage device 10 according to the invention, except as noted or shown in FIGS. 37–40 of the drawing. For example, the lid 120b' of the modified case 100b has a larger opening or two openings, a first actuator access opening 414' and a second actuator access opening 404". These actuator access openings allow for separate operation of the first and second disc-controlling structures, respectively, for the separate disc media storage cavities, as hereinafter described and shown in detail.

Figure 38:
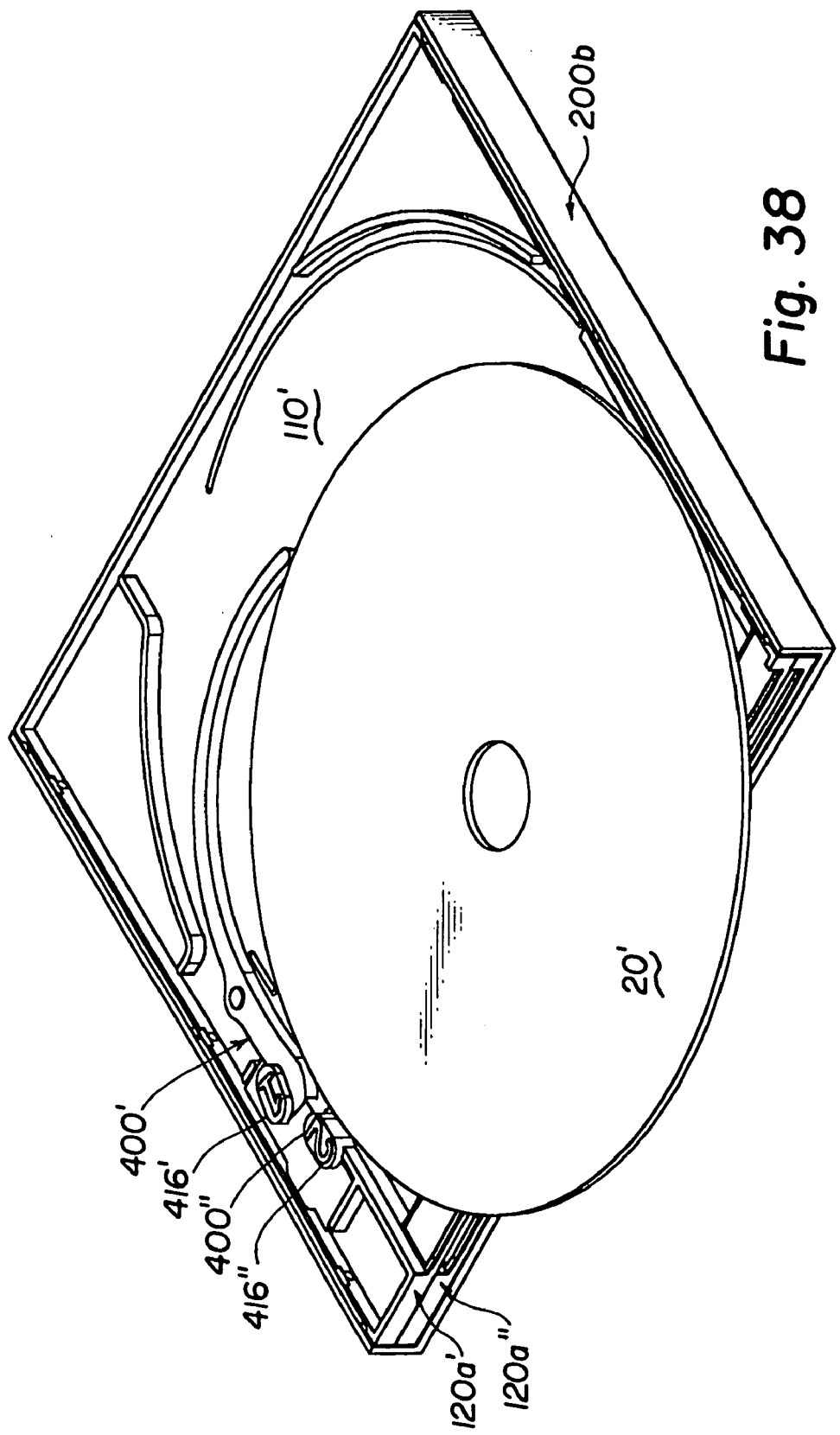
FIG. 38 is an isometric view from a top, front, and right-side perspective of the dual disc-media storage device wherein the lid portion of the case is removed, showing an interior of a first cavity for a first disc media.

Referring particularly to FIG. 38, a first cavity 110' is shown, which first cavity 110' is defined by a first base 120a' and a lid 120b' (not shown in FIG. 38). Except as specifically noted or shown in this FIG. 38, the first base 120a' is substantially the same as previously described with reference to the embodiment of the base 120a and the disc-controlling structure 400 shown in FIGS. 23 and 24. For example, one difference is that the first pad 416' of the first actuator 414' of the first disc-controlling structure 400' is preferably formed to have an indication of being for controlling the release of the first disc 20' stored in the first cavity 110'.

Figure 39:
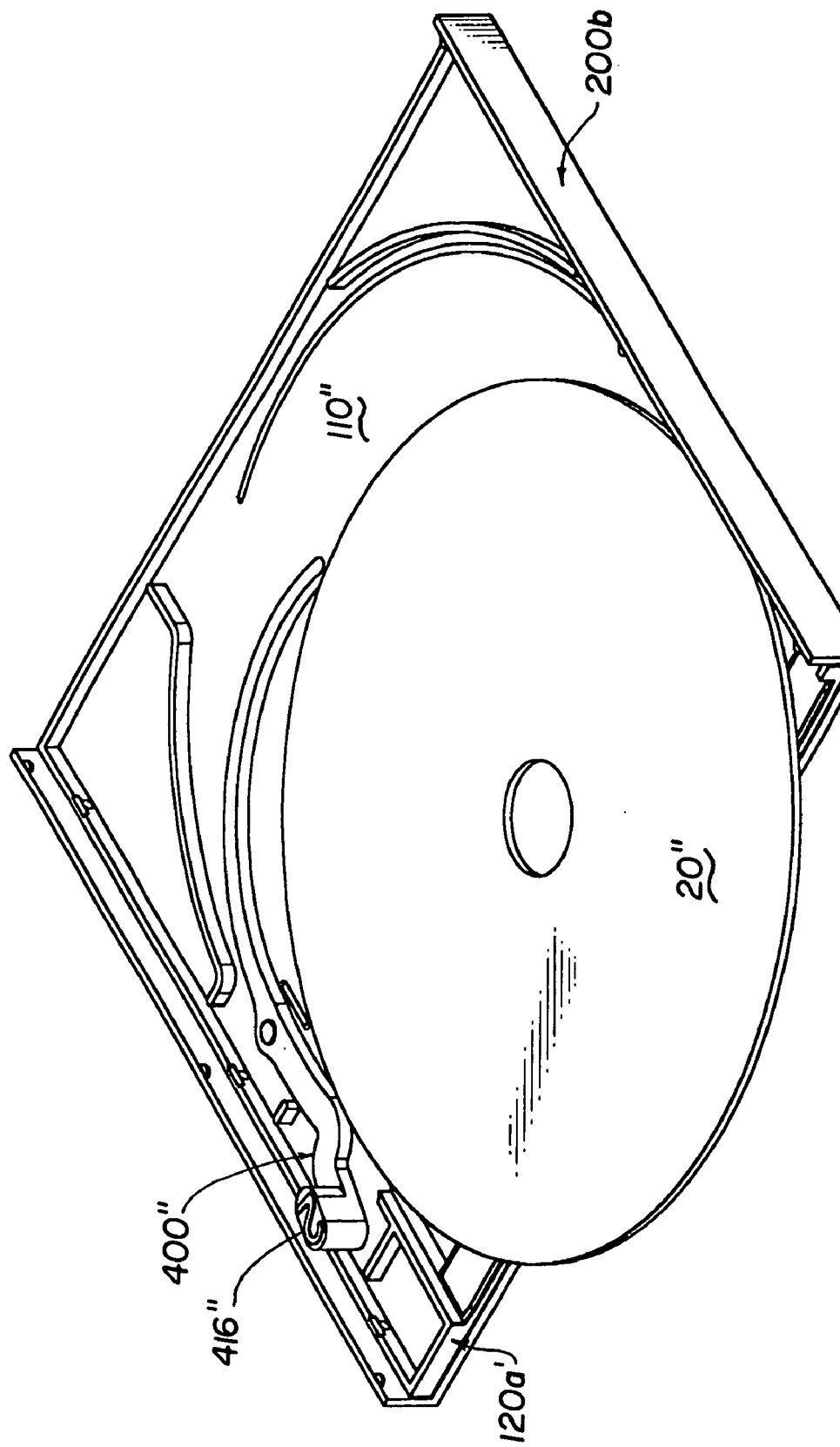
FIG. 39 is an isometric view from a top, front, and right-side perspective of the dual disc-media storage device wherein the first base portion of the first cavity is removed (which also serves as the lid portion of a second cavity, showing an interior of the second cavity for a second disc media.

Referring now particularly to FIG. 39, a second cavity 110" is shown, which second cavity 110" is defined by a second base 120a" and the bottom wall of the first base 120a'. Again, except as specifically noted or shown in this FIG. 39, the second base 120a" is substantially the same as previously described with reference to the embodiment of the base 120a and the disc-controlling structure 400 shown in FIGS. 23 and 24. For example, one difference is that the second pad 416" of the second actuator 414" of the second disc-controlling structure 400" is preferably formed to have an indication of being for controlling the release of the second disc 20" stored in the second cavity 110". Furthermore, the actuator 414" has sufficient height to position the second pad 416" in the top case wall 102a'of the lid 120b'. As will be readily appreciated by those skilled in the art, the second base 120a" can be adapted to mate with the bottom of the first base 120a' in a similar fashion as the first base 120a' is adapted to mate with the lid 120b'. This eliminates the need for a separate lid structure between the first cavity 110' and the second cavity 110". For example, the lower surface of the first base 120a' preferably has the same structural features formed thereon as the lower surface of the lid 120b previously described with reference to FIGS. 10–12.

Figure 40:
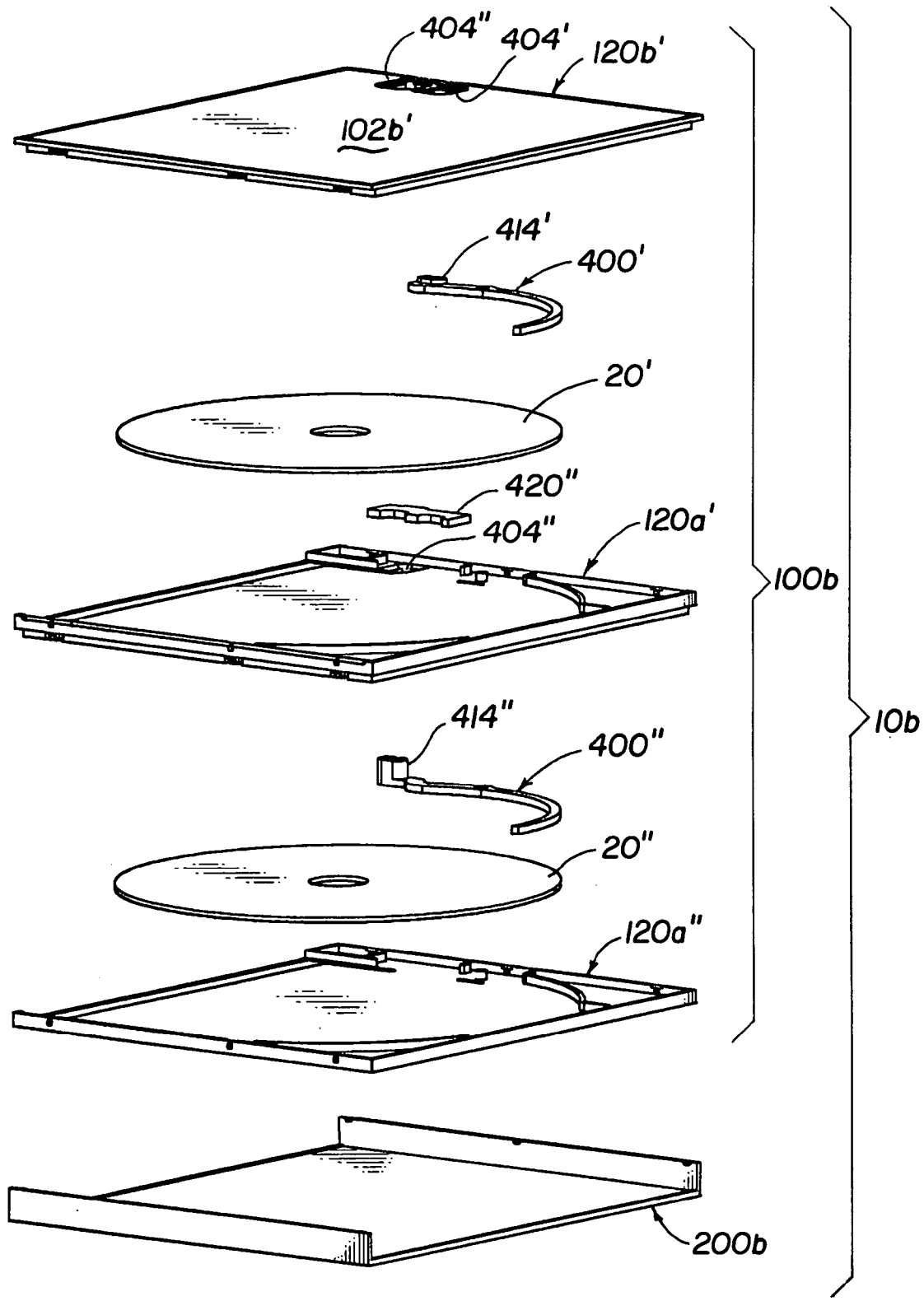
FIG. 40 is an exploded isometric view from the top, back, and right side of the dual disc-media storage device together with two CDs (but not showing a spine graphics label).

Referring now particularly to FIG. 40, the assembly of the embodiment of the disc storage device 10b is illustrated. As shown now in FIG. 40, another difference in this embodiment relative to the previously-described embodiments is that the bottom wall of the first base 120a' preferably has a second actuator access opening 404" formed therein, preferably corresponding to the second actuator access opening 404" in the lid 120b', and for the same purpose of allowing the second actuator 414" to extend upwardly therethrough.

Furthermore, a separate dust cover 420" is preferably provided to prevent dust from entering the second cavity 110". This separate dust cover 420" is preferably formed of a soft, closed-cell foam material. This type of a dust cover 420" can be easily compressed and moved out of the way when the second actuator 414" is moved from the locking position to the release position.

Scope of Invention not Limited to Preferred Embodiments

The invention is described with respect to presently preferred embodiments, but is not intended to be limited to the described embodiments. It will be readily apparent to those of ordinary skill in the art that numerous modifications may be made to the invention without departing from the scope and spirit of the invention.

Having described the invention, what is claimed is:

1. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side,
      (ii) a cavity defined inside the case that is at least sufficient to accommodate the disc media, and
      (iii) an opening defined in the front side of the case, the opening being at least sufficient for inserting the disc media edgewise into the cavity;
   (b) a tray, the tray comprising:
      (i) central, left-side, and right-side tray walls defining a generally rectangular, tray-like shape,
      (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and
      (iii) at least a portion of each of the left-side and right-side tray walls being at least sufficiently transparent to see sheet label material therethrough; and (c) at least one set of projecting and recess structures on the left-side tray wall and left-side case wall and at least one set of projecting and recess structures on each of the right-side tray wall and right-side case wall, the structures cooperating to retain the tray on the case.

2. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side,
      (ii) a cavity defined inside the case that is at least sufficient to accommodate the disc media, and
      (iii) an opening defined in the front side of the case, the opening being at least sufficient for inserting the disc media edgewise into the cavity;
   (b) a tray, the tray comprising:
      (i) central, left-side, and right-side tray walls defining a generally rectangular, tray-like shape,
      (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and
      (iii) at least a portion of each of the left-side and right-side tray walls being at least sufficiently transparent to see sheet label material therethrough; and
   (c) a groove having closed ends along each of the left-side and right-side case walls, and at least three spaced-apart projecting structures on each of the left-side and right-side tray walls adapted to be positioned in the groove of each of the left-side and right-side case walls, respectively, wherein two of the three spaced-apart projecting structures on each of the left-side and right-side walls are sufficient to retain the tray on the case and guide the tray to slide forward or backward on the left-side and right-side walls of the case.

3. The storage device according to claim 2, wherein the three spaced-apart projections are quarter-spherical in shape.

4. The storage device according to any one of claims 1–3, wherein the left side and the right side of the case are shorter than the back side and front side of the case.

5. The storage device according to any one of claims 1–3, wherein the tray further comprises: front-side and back-side tray walls, such that, when the tray is retained on the case, the central tray wall can be spaced apart from the bottom case wall and a printed media can be retained between the bottom case wall and central tray wall by the left-side, right-side, front-side, and back-side tray walls.

6. The storage device according to claim 5, wherein the height of the front-side tray wall does not prevent inserting the disc media into the cavity through the opening in the front side of the case.

7. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side,
      (ii) a cavity defined inside the case walls that is at least sufficient to accommodate the disc media, and
      (iii) an opening defined in the front side of the case, the opening being at least sufficient for inserting the disc media edgewise into the cavity;
   (b) a tray, the tray comprising:
      (i) central, left-side, and right-side tray walls defining a generally rectangular, tray-like shape,
      (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall,
      (iii) at least a portion of each of the left-side and right-side tray walls being at least sufficiently transparent to see sheet label material therethrough,
      (iv) front-side and back-side tray walls, such that, when the tray is retained on the case, the central tray wall can be spaced apart from the bottom case wall and a printed media can be retained between the bottom case wall and central tray wall by the left-side, right-side, front-side, and back-side tray walls; and
   (c) a means for retaining the tray on the case.

8. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side,
      (ii) a cavity defined inside the case walls that is at least sufficient to accommodate the disc media, and
      (iii) an opening defined in the front side of the case, the opening being at least sufficient for inserting the disc media edgewise into the cavity;
   (b) a tray, the tray comprising:
      (i) central, left-side, and right-side tray walls defining a generally rectangular, tray-like shape wherein when the tray is positioned on the case, the tray does not prevent inserting the disc media into the cavity through the opening in the front side of the case,
      (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall,
      (iii) at least a portion of each of the left-side and right-side tray walls being at least sufficiently transparent to see sheet label material therethrough,
      (iv) front-side and back-side tray walls, such that, when the tray is retained on the case, the central tray wall can be spaced apart from the bottom case wall and a printed media can be retained between the bottom case wall and central tray wall by the left-side, right-side, front-side, and back-side tray walls; and
   (c) a means for retaining the tray on the case.

9. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side, (ii) a cavity defined inside the case walls that is at least sufficient to accommodate the disc media, (iii) an opening defined in the front side of the case, the opening being at least sufficient for inserting the disc media edgewise into the cavity;

(b) a tray, the tray comprising:

(i) central, left-side, and right-side tray walls defining a generally rectangular, tray-like shape, wherein when the tray is positioned on hte, (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, (iii) at least a portion of each of the left-side and right-side tray walls being at least sufficiently transparent to see sheet label material therethrough, (iv) front-side and back-side tray walls, such that, when the tray is retained on the case, the central tray wall can be spaced apart from the bottom case wall and a printed media can be retained between the bottom case wall and central tray wall by the left-side, right-side, front-side, and back-side tray walls; and (c) a means for retaining the tray on the case.

10. The storage device according to any one of claims 7–9, wherein the height of the front-side tray wall does not prevent inserting the disc media into the cavity through the opening in the front side of the case.

11. A storage device for a disc media, the storage device comprising:

(a) a case, the case comprising:

(i) bottom, top, left-side, right-side, and back-side case walls defining a generally rectangular, box-like shape having a bottom, top, left side, right side, back side, and front side, (ii) a cavity defined inside the case walls that is at least sufficient to accommodate the disc media, and (iii) an opening defined in the front side of the case, the opening being at least sufficient for inserting the disc media edgewise into the cavity;

(b) a tray, the tray comprising:

(i) central, left-side, and right-side tray walls defining a generally rectangular, tray-like shape, wherein when the tray is positioned on the case, the tray does not prevent inserting the disc media into the cavity through the opening in the front side of the case, (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and (iii) at least a portion of each of the left-side and right-side tray walls being at least sufficiently transparent to see sheet label material therethrough; and (c) a means for retaining the tray on the case comprising at least one set of projecting and recess structures on the left-side tray wall and left-side case wall and at least one set of projecting and recess structures on each of the right-side tray wall and right-side case wall, the structures cooperating to retain the tray on the case.

12. A storage device for a disc media, the storage device comprising:

(a) a case, the case comprising:

(i) bottom, top, left-side, right-side, and back-side case walls defining a generally rectangular, box-like shape having a bottom, top, left side, right side, back side, and front side, wherein the left side and the right side of the case are shorter than the back side and front side of the case, (ii) a cavity defined inside the case walls that is at least sufficient to accommodate the disc media, and (iii) an opening defined in the front side of the case, the opening being at least sufficient for inserting the disc media edgewise into the cavity;

(b) a tray, the tray comprising:

(i) central, left-side, and right-side tray walls defining a generally rectangular, tray-like shape, (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and (iii) at least a portion of each of the left-side and right-side tray walls being at least sufficiently transparent to see sheet label material therethrough; and (c) a means for retaining the tray on the case comprising at least one set of projecting and recess structures on the left-side tray wall and left-side case wall and at least one set of projecting and recess structures on each of the right-side tray wall and right-side case wall, the structures cooperating to retain the tray on the case.

13. A storage device for a disc media, the storage device comprising:

(a) a case, the case comprising:

(i) bottom, top, left-side, right-side, and back-side case walls defining a generally rectangular, box-like shape having a bottom, top, left side, right side, back side, and front side, (ii) a cavity defined inside the case walls that is at least sufficient to accommodate the disc media, and (iii) an opening defined in the front side of the case, the opening being at least sufficient for inserting the disc media edgewise into the cavity;

(b) a tray, the tray comprising:

(i) central, left-side, and right-side tray walls defining a generally rectangular, tray-like shape, (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and (iii) at least a portion of each of the left-side and right-side tray walls being at least sufficiently transparent to see sheet label material therethrough; and (c) a means for retaining the tray on the case, wherein the means for retaining the tray on the case further comprises: a means for selectively moving the tray between a closed position on the case and an open position, such that when the tray is in the open position, printed media can be selectively inserted or removed from between the case and the tray, wherein the means for selectively moving the tray on the case further comprises: a means for sliding the tray relative to the case between the closed position and the open position, and wherein the means for retaining the tray on the case further comprises: at least one set of projecting and groove structures on the left-side tray wall and left-side case wall and at least one set of projecting and groove structures on each of the right-side tray wall and right-side case wall, the structures cooperating to retain the tray on the case.

14. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side,
      (ii) a cavity defined inside the case walls that is at least sufficient to accommodate the disc media, and
      (iii) an opening defined in the front side of the case, the opening being at least sufficient for inserting the disc media edgewise into the cavity;
   (b) a tray, the tray comprising:
      (i) central, left-side, and right-side tray walls defining a generally rectangular, tray-like shape, wherein when the tray is positioned on the case, the tray does not prevent inserting the disc media into the cavity through the opening in the front side of the case,
      (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and
      (iii) at least a portion of each of the left-side and right-side tray walls being at least sufficiently transparent to see sheet label material therethrough; and
   (c) a means for retaining the tray on the case,
   wherein the means for retaining the tray on the case further comprises: a means for selectively moving the tray between a closed position on the case and an open position, such that when the tray is in the open position, printed media can be selectively inserted or removed from between the case and the tray,
   wherein the means for selectively moving the tray on the case further comprises: a means for sliding the tray relative to the case between the closed position and the open position, and
   wherein the means for retaining the tray on the case further comprises: at least one set of projecting and groove structures on the left-side tray wall and left-side case wall and at least one set of projecting and groove structures on each of the right-side tray wall and right-side case wall, the structures cooperating to retain the tray on the case.

15. A storage device for a disc media, the storage device comprising:
   (a) a case, the case comprising:
      (i) bottom, top, left-side, right-side, and back-side case walls defining a generally rectangular, box-like shape having a bottom, top, left side, right side, back side, and front side, wherein the left side and the right side of the case are shorter than the back side and front side of the case,
      (ii) a cavity defined inside the case walls that is at least sufficient to accommodate the disc media, and
      (iii) an opening defined in the front side of the case, the opening being at least sufficient for inserting the disc media edgewise into the cavity;
   (b) a tray, the tray comprising:
      (i) central, left-side, and right-side tray walls defining a generally rectangular, tray-like shape,
      (ii) the left-side and right-side tray walls being sufficiently spaced apart such that the left-side and right-side case walls of the case can be positioned between the left-side and right-side tray walls and with at least sufficient clearance such that sheet label material can optionally be positioned between the left-side tray wall and the left-side case wall and between the right-side tray wall and the right-side case wall, and
      (iii) at least a portion of each of the left-side and right-side tray walls being at least sufficiently transparent to see sheet label material therethrough; and
   (c) a means for retaining the tray on the case,
   wherein the means for retaining the tray on the case further comprises: a means for selectively moving the tray between a closed position on the case and an open position, such that when the tray is in the open position, printed media can be selectively inserted or removed from between the case and the tray,
   wherein the means for selectively moving the tray on the case further comprises: a means for sliding the tray relative to the case between the closed position and the open position, and
   wherein the means for retaining the tray on the case further comprises: at least one set of projecting and groove structures on the left-side tray wall and left-side case wall and at least one set of projecting and groove structures on each of the right-side tray wall and right-side case wall, the structures cooperating to retain the tray on the case.

16. The storage device according to any one of claims 13–15, wherein the groove structures are parallel to the left-side and right-side case walls.

* * * * *